(12) United States Patent
Katschinski et al.

(10) Patent No.: US 11,270,380 B1
(45) Date of Patent: Mar. 8, 2022

(54) METHODS, SYSTEMS, AND DEVICES FOR MANAGING AND PROCESSING TRADING ACTIVITY AND TRADING INFORMATION

(71) Applicant: Sphere Innovations Limited, London (GB)

(72) Inventors: Amnon Katschinski, London (GB); Vladimir Ignatov, Surrey (GB); Anthony Whitehouse, London (GB)

(73) Assignee: SPHERE INNOVATIONS LIMITED, London (GB)

( * ) Notice: Subject to any disclaimer, the term of this patent is extended or adjusted under 35 U.S.C. 154(b) by 0 days.

(21) Appl. No.: 17/083,073

(22) Filed: Oct. 28, 2020

(51) Int. Cl.
*G06Q 40/04* (2012.01)
(52) U.S. Cl.
CPC .................... *G06Q 40/04* (2013.01)
(58) Field of Classification Search
CPC .................................................. G06Q 40/04
USPC .................................................... 705/37
See application file for complete search history.

(56) References Cited

U.S. PATENT DOCUMENTS

| | | | | |
|---|---|---|---|---|
| 10,600,121 B1* | 3/2020 | Malamut | ............... | G06Q 40/04 |
| 2006/0009997 A1* | 1/2006 | Felix | ............... | G06Q 10/10 |
| | | | | 705/37 |
| 2020/0327544 A1* | 10/2020 | Slavin | ............... | G06Q 40/06 |

* cited by examiner

Primary Examiner — Jessica Lemieux
(74) *Attorney, Agent, or Firm* — Baker & McKenzie LLP

(57) ABSTRACT

Embodiments relate to methods, systems, and devices for managing trading information. The method includes receiving non-indicative price information and indicative price information from communications between a representative user and customer users. The method includes categorizing indicative and non-indicative price information. The method includes generating candidate trading records, including indicative price candidate trading records and non-indicative price candidate trading records. The method includes generating a confidence indicia for each indicative price candidate trading record and non-indicative price candidate trading record. The method includes ranking the candidate trading records, including ranking non-indicative price candidate trading records higher than indicative price candidate trading records when certain conditions are met, ranking indicative price candidate trading records higher than non-indicative price candidate trading records when certain conditions are met, ranking indicative price candidate trading records based on confidence indicia, and ranking non-indicative price candidate trading records based on confidence indicia.

30 Claims, 9 Drawing Sheets

FIG. 9

Colour Legend

Yellow - indicative, voice source
Orange - indicative, textual source
Green - non-indicative, live
White - external prices
Red - implied prices ID# METHODS, SYSTEMS, AND DEVICES FOR MANAGING AND PROCESSING TRADING ACTIVITY AND TRADING INFORMATION

TECHNICAL FIELD

The present disclosure relates generally to managing of trading activity, and more specifically, to methods, systems, devices, and logic for managing trades, trading activity, and trading information between a plurality of users, including processing of communications between users.

BACKGROUND

There are various markets available today for buyers and sellers (referred to herein as "customer users") to trade or exchange value. In more complex markets, the buying, selling, bidding, and asking of such value exchanges by customer users are facilitated by brokers, traders, intermediaries, etc. (referred to herein as "representative users").

BRIEF SUMMARY

Various different markets around the world that allow for value exchanges between customer users have continued to evolve over the years, with many markets moving from traditionally decentralized and/or manual processes and activities, such as voice and instant messaging, to more electronic and/or automated solutions on centralized trading platforms. For example, whereas many markets and/or exchanges traditionally operated via physical trading floors where traders would communicate trades and trading information between one another, many such markets have now replaced such physical trading floors with centralized electronic versions that maximize efficient and anonymity for matching buyers and sellers in highly liquid contracts.

There are still, however, many markets (in e.g., energy, commodities, credit derivatives, and interest rate swaps markets to name a few) where liquidity is more challenged, far less centralized, that therefore continue to function in largely the same traditional, decentralized, and/or fragmented ways and with considerably less technology penetration. For example, many customer users in such decentralized markets continue to receive trading information from representative users (e.g., bid prices, ask prices, recent buy orders, sell orders, prices for contracts, quantities/volume, relevant trading dates, concluded trades etc.) and/or conduct trades with representative users (e.g., brokers, traders, etc.) via dedicated audio and/or video channels (e.g., 1-to-1 audio and/or video channel, a 1-to-many audio and/or video channel, a many-to-1 audio and/or video channel, a broadcast audio and/or video channel, etc.). In such an example, each customer user may send an interest or instruction to buy, sell, bid, ask, etc. in one or more ways. For example, the customer user may use the same audio and/or video channel if the audio and/or video channel allows for the customer user to communicate back to the representative user. Alternatively, the customer user may use another/separate audio and/or video channel (e.g., a mobile phone call, a landline call, a VoIP call, a video call, etc.) to communicate interest, orders and/or instructions. Alternatively, the customer user and representative user may communicate trading information, orders and/or instructions via text (e.g., a text message/chat via a messaging service such as WhatsApp, Line, Telegram, WeChat, ICE IM, Bloomberg IB Chat, Symphony, etc.; an email message; an SMS message; etc.) or via other electronic means such as sending electronic prices via so called hybrid platforms or Request For Quote (RFQ) electronic tools, and/or an alternating mixture of voice and text and electronic means.

In this regard, it is recognized in the present disclosure that such decentralized and/or fragmented markets and trading workflows pose various problems and/or inefficiencies to participants of these markets. For example, trading activity and/or pertinent trading information in such decentralized markets are fragmented across multiple channels, multiple trading venues, electronic systems and a variety of trading workflows (which may include voice trading, messaging/chat trading, and/or electronic trading), making it difficult for customer users and representative users to see true market conditions and also leading to missed trading opportunities and subsequent financial loses.

The fragmentation of pertinent trading data across these various channels/tools, can make it incredibly hard for customer users to keep track of what is fair market price in real-time. It also makes it almost impossible for both customer users and their employers as well as representative users and their employers to retroactively create a clear and complete view and an accurate timeline of employee actions versus market conditions for the purposes of auditing, compliance and market abuse data analytics. In many cases in breach of prevailing regulatory requirements that firms maintain and demonstrate adequate controls and monitoring of their employees trading, communications and pricing activities in the markets. Additionally, the same fragmentation prevents the development of effective tools for historical trading data analysis (in contrast to tools often available to customer users operating in electronic markets such as in e.g. some equity markets). This in turn increases risk, costs and in some cases losses for customer users.

Present example embodiments relate generally to and/or include systems, subsystems, processors, devices, logic, methods, and processes for addressing conventional problems, including those described above and in the present disclosure, and more specifically, example embodiments relate to systems, subsystems, processors, devices, logic, methods, and processes for managing trades and trading information.

In an exemplary embodiment, a method of managing trading information is described. The method includes receiving indicative price information from communications between a representative user and one or more customer users. The method includes receiving non-indicative price information from an information source. The method further includes processing the indicative price information. The processing of the indicative price information includes generating textual representations of the indicative price information. The method further includes categorizing the textual representations of the indicative price information based on at least one or more of the following categories: source, trading action, trading price, trading quantity, and/or timestamp. The method further includes categorizing the non-indicative price information based on at least one or more of the following categories: source, trading action, trading price, trading quantity, and timestamp. The method further includes generating a plurality of candidate trading records. The generating of the plurality of candidate trading records includes generating one or more indicative price candidate trading records. The one or more indicative price candidate trading records are generated based on the categorizing of the textual representations of the indicative price information. The generating of the plurality of candidate trading records further includes generating one or more non-indicative price candidate trading records. The one or more non-indicative price candidate trading records are generated based on the categorizing of the non-indicative pricing information. The method further includes performing a confidence level processing. The confidence level processing includes generating a confidence indicia for each of the one or more indicative price candidate trading records. Each confidence indicia for each of the one or more indicative price candidate trading records represents a level of confidence and/or score of an accuracy, completeness, source, price, and/or temporal nature of the indicative price candidate trading record. The confidence level processing includes generating a confidence indicia for each of the one or more non-indicative price candidate trading records. Each confidence indicia for each of the one or more non-indicative price candidate trading records represents a level of confidence and/or score of an accuracy, completeness, source, price, and/or temporal nature of the indicative price candidate trading record. The method further includes ranking the plurality of candidate trading records. The ranking is based on one or more of the following conditions: the one or more non-indicative price candidate trading records are ranked higher than the one or more indicative price candidate trading records when a trading price of the non-indicative price candidate trading record is equal to or better than a trading price of the indicative price candidate trading record; and/or the one or more indicative price candidate trading records are ranked higher than the one or more non-indicative price candidate trading records when a trading price of the indicative price candidate trading record is better than a trading price of the non-indicative price candidate trading record; and/or when ranking the one or more indicative price candidate trading records, the one or more indicative price candidate trading records are ranked based on the confidence indicia generated for the indicative price candidate trading record; and/or when ranking the one or more non-indicative price candidate trading records, the one or more non-indicative price candidate trading records are ranked based on the confidence indicia generated for the non-indicative price candidate trading record.

In another exemplary embodiment, a method of managing trading information is described. The method includes identifying a first communication channel. The first communication channel is configured to facilitate communication of indicative pricing information between a representative user and one or more customer users. The method further includes identifying a second communication channel. The second communication channel is configured to receive non-indicative price information from an information source. The method further includes receiving and processing the indicative pricing information communicated through the first communication channel. The processing of the indicative pricing information includes generating, from the indicative pricing information communicated through the first communication channel, a textual representation of the indicative pricing information. The method further includes categorizing the textual representations of the indicative pricing information based on at least one or more of the following categories: source, trading action, trading price, trading quantity, and/or timestamp. The method further includes receiving and categorizing the non-indicative price information from the second communication channel based on at least one or more of the following categories: source, trading action, trading price, trading quantity, and/or timestamp. The method further includes generating a plurality of candidate trading records. The generating of the plurality of candidate trading records includes generating one or more indicative price candidate trading records, including a first indicative price candidate trading record. The one or more indicative price candidate trading records are generated based on the categorizing of the textual representations of the indicative price information. Each indicative price candidate trading record includes categorized textual representations pertaining to a source, trading action, trading price, trading quantity, and/or timestamp. The generating of the plurality of candidate trading records further includes generating one or more non-indicative price candidate trading records, including a first non-indicative price candidate trading record. The one or more non-indicative price candidate trading records are generated based on the categorizing of the indicative price information received from the second communication channel. Each non-indicative price candidate trading record includes categorized textual representations pertaining to a source, trading action, trading price, trading quantity, and timestamp of the non-indicative price candidate trading record. The method further includes performing a confidence level processing. The confidence level processing includes generating a confidence indicia for each of the plurality of candidate trading records, including a first confidence indicia for the first indicative price candidate trading record and a second confidence indicia for the first non-indicative price candidate trading record. Each confidence indicia represents a level of confidence and/or score of an accuracy, completeness, source, and/or temporal nature of the candidate trading record. The method further includes creating one or more groups for the plurality of candidate trading records. Each of the one or more groups includes one or more of the plurality of candidate trading records. The one or more groups are created based on trading instrument and/or relevant trading date. The method further includes, for each of the one or more groups, performing a ranking of the one or more candidate trading records in the group. The ranking is based on one or more of the following conditions: the first non-indicative price candidate trading record is ranked higher than the first indicative price candidate trading record when a trading price of the first non-indicative price candidate trading record is equal to or better than a trading price of the first indicative price candidate trading record; and/or the first indicative price candidate trading record is ranked higher than the first non-indicative price candidate trading record when a trading price of the first indicative price candidate trading record is better than a trading price of the first non-indicative price candidate trading record; and/or when a plurality of indicative price candidate trading records are generated, the plurality of indicative price candidate trading records are ranked based on the confidence indicia generated for each of the plurality of indicative price candidate trading records; and/or when a plurality of non-indicative price candidate trading records are generated, the plurality of non-indicative price candidate trading records are ranked based on the confidence indicia generated for each of the plurality of non-indicative price candidate trading records.

In another exemplary embodiment, a method of managing trading information is described. The method includes identifying a first communication channel. The first communication channel is configured to facilitate voice communications between a representative user (e.g., a broker, trader, etc.), a first customer user, and a second customer user. The method also includes performing a voice signature processing. The voice signature processing includes obtaining a representative user voice signature for the representative user (i.e., a voice signature for the representative user). The representative user voice signature is for use in identifying, from among all voice communications passing through the first communication channel, representative user voice communications. The representative user voice communications are voice communications made by the representative user. The voice signature processing further includes obtaining a first customer user voice signature for the first customer user (e.g., a voice signature for the first customer user). The first customer user voice signature is for use in identifying, from among all voice communications passing through the first communication channel, first customer user voice communications. The first customer user voice communications are voice communications made by the first customer user. The voice signature processing further includes obtaining a second customer user voice signature for the second customer user (e.g., a voice signature for the second customer). The second customer user voice signature is for use in identifying, from among all voice communications passing through the first communication channel, second customer user voice communications. The second customer user voice communications are voice communications made by the second customer user. The method further includes performing a category processing. The category processing includes, for the representative user voice communications, generating a first representative user payload. The first representative user payload includes a textual representation of a first set of words from the representative user voice communications pertaining to trading actions (e.g., generating a textual representation of representative user voice communications, selecting words that match or fall in the category of "trading actions", and inserting such words in the first representative user payload). The category processing also includes, for the representative user voice communications, generating a second representative user payload. The second representative user payload includes a textual representation of a second set of words from the representative user voice communications pertaining to trading prices (e.g., generating a textual representation of representative user voice communications, selecting words that match or fall in the category of "trading prices", and inserting such words in the second representative user payload). The category processing also includes, for the first customer user voice communications, generating a first first customer user payload. The first first customer user payload includes a textual representation of a first set of words from the first customer user voice communications pertaining to trading actions (e.g., generating a textual representation of first customer user voice communications, selecting words that match or fall in the category of "trading actions", and inserting such words in the first first customer user payload). The category processing also includes, for the first customer user voice communications, generating a second first customer user payload. The second first customer user payload includes a textual representation of a second set of words from the first customer user voice communications pertaining to trading prices (e.g., generating a textual representation of first customer user voice communications, selecting words that match or fall in the category of "trading prices", and inserting such words in the second first customer user payload). The category processing also includes, for the second customer user voice communications, generating a first second customer user payload. The first second customer user payload includes a textual representation of a first set of words from the second customer user voice communications pertaining to trading actions (e.g., generating a textual representation of second customer user voice communications, selecting words that match or fall in the category of "trading actions", and inserting such words in the first second customer user payload). The category processing also includes, for the second customer user voice communications, generating a second second customer user payload. The second second customer user payload includes a textual representation of a second set of words from the second customer user voice communications pertaining to trading prices (e.g., generating a textual representation of second customer user voice communications, selecting words that match or fall in the category of "trading prices", and inserting such words in the second second customer user payload). The method further includes performing a candidate trading record processing. The candidate trading record processing includes generating a plurality of candidate trading records. The generating of the plurality of candidate trading records includes generating a first candidate trading record. The first candidate trading record is generated based on a selection of one or more words from the first representative user payload and/or a selection of one or more words from the second representative user payload. The generating of the plurality of candidate trading records further includes generating a second candidate trading record. The second candidate trading record is generated based on a selection of one or more words from the first first customer user payload and/or a selection of one or more words from the second first customer user payload. The generating of the plurality of candidate trading records further includes generating a third candidate trading record. The third candidate trading record is generated based on a selection of one or more words from the first second customer user payload and/or a selection of one or more words from the second second customer user payload. The candidate trading record processing further includes generating a confidence indicia for each of the plurality of candidate trading records. The generating of the confidence indicia for each of the plurality of candidate trading records includes generating a first confidence indicia for the first candidate trading record. The first confidence indicia represents a level of confidence of an accuracy of the first candidate trading record. The generating of the confidence indicia for each of the plurality of candidate trading records also includes generating a second confidence indicia for the second candidate trading record. The second confidence indicia represents a level of confidence of an accuracy of the second candidate trading record. The generating of the confidence indicia for each of the plurality of candidate trading records also includes generating a third confidence indicia for the third candidate trading record. The third confidence indicia represents a level of confidence of an accuracy of the third candidate trading record. The method further includes ranking the plurality of candidate trading records based on the generated confidence indicias. The ranking of the plurality of candidate trading records includes ranking the first, second, and third candidate trading records based on the first, second, and third confidence indicias.

In another exemplary embodiment, a method of managing trading information is described. The method includes identifying a first communication channel. The first communication channel is configured to facilitate voice communications between a representative user, a first customer user, and a second customer user. The method further includes performing a voice signature processing. The voice signature processing includes obtaining a representative user voice signature for the representative user. The representative user voice signature is for use in identifying, from among all voice communications passing through the first communication channel, representative user voice communications. The representative user voice communications are voice communications made by the representative user. The voice signature processing also includes obtaining a first customer user voice signature for the first customer user. The first customer user voice signature is for use in identifying, from among all voice communications passing through the first communication channel, first customer user voice communications. The first customer user voice communications are voice communications made by the first customer user. The voice signature processing also includes obtaining a second customer user voice signature for the second customer user. The second customer user voice signature is for use in identifying, from among all voice communications passing through the first communication channel, second customer user voice communications. The second customer user voice communications are voice communications made by the second customer user. The method further includes performing a category processing. The category processing includes, for the representative user voice communications, generating a first representative user payload. The first representative user payload includes a textual representation of a first set of words from the representative user voice communications pertaining to trading actions. The category processing also includes, for the representative user voice communications, generating a third representative user payload. The third representative user payload includes a textual representation of a third set of words from the representative user voice communications that pertaining to trading prices. The category processing includes, for the first customer user voice communications, generating a first first customer user payload. The first first customer user payload includes a textual representation of a first set of words from the first customer user voice communications pertaining to trading actions. The category processing includes, for the first customer user voice communications, generating a second first customer user payload. The second first customer user payload includes a textual representation of a second set of words from the first customer user voice communications pertaining to trading quantities. The category processing includes, for the second customer user voice communications, generating a first second customer user payload. The first second customer user payload includes a textual representation of a first set of words from the second customer user voice communications pertaining to trading actions. The category processing includes, for the second customer user voice communications, generating a second second customer user payload. The second second customer user payload includes a textual representation of a second set of words from the second customer user voice communications pertaining to trading quantities. The method further includes performing a candidate trading record processing. The candidate trading record processing includes generating a plurality of candidate trading records. The generating of the plurality of candidate trading records includes generating a first candidate trading record. The first candidate trading record is generated based on a selection of one or more words from the first representative user payload and/or a selection of one or more words from the second representative user payload. The generating of the plurality of candidate trading records further includes generating a second candidate trading record. The second candidate trading record is generated based on a selection of one or more words from the first first customer user payload and/or a selection of one or more words from the second first customer user payload. The generating of the plurality of candidate trading records includes generating a third candidate trading record. The third candidate trading record is generated based on a selection of one or more words from the first second customer user payload and/or a selection of one or more words from the second second customer user payload. The candidate trading record processing further includes generating a confidence indicia for each of the plurality of candidate trading records. The generating of the confidence indicia for each of the plurality of candidate trading records includes generating a first confidence indicia for the first candidate trading record. The first confidence indicia represents a measure of accuracy and/or completeness of the first candidate trading record. The generating of the confidence indicia for each of the plurality of candidate trading records further includes generating a second confidence indicia for the second candidate trading record. The second confidence indicia represents a measure of accuracy and/or completeness of the second candidate trading record. The generating of the confidence indicia for each of the plurality of candidate trading records further includes generating a third confidence indicia for the third candidate trading record. The third confidence indicia represents a measure of accuracy and/or completeness of the third candidate trading record. The method further includes performing a candidate trading record tuning process (e.g., displaying candidate trading records to users to allow users to amend the candidate trading record). The candidate trading record tuning process includes comparing the first confidence indicia for the first candidate trading record with a first threshold confidence indicia. The candidate trading record tuning process further includes, responsive to a determination that the first confidence indicia for the first candidate trading record is less than (or equal to) the first threshold confidence indicia, displaying the first candidate trading record to one or more users. The displayed first candidate trading record is configured to allow the one or more users to edit the first candidate trading record (or tune the candidate trading record). The candidate trading record tuning process further includes, responsive to a determination that the first confidence indicia for the first candidate trading record is less than (or equal to) the first threshold confidence indicia and responsive to a determination that the first candidate trading record has been edited by one or more of the users, generating an adjusted first confidence indicia for the first candidate trading record based on the editing. The candidate trading record tuning process further includes comparing the second confidence indicia for the second candidate trading record with a second threshold confidence indicia. The candidate trading record tuning process further includes, responsive to a determination that the second confidence indicia for the second candidate trading record is less than (or equal to) the second threshold confidence indicia, displaying the second candidate trading record to the one or more users. The displayed second candidate trading record is configured to allow the one or more users to edit the second candidate trading record. The candidate trading record tuning process further includes, responsive to a determination that the second confidence indicia for the second candidate trading record is less than (or equal to) the second threshold confidence indicia and responsive to a determination that the second candidate trading record has been edited by one or more of the users, generating an adjusted second confidence indicia for the second candidate trading record. The candidate trading record tuning process further includes comparing the third confidence indicia for the third candidate trading record with a third threshold confidence indicia. The candidate trading record tuning process further includes, responsive to a determination that the third confidence indicia for the third candidate trading record is less than (or equal to) the third threshold confidence indicia, displaying the third candidate trading record to the one or more users. The displayed third candidate trading record is configured to allow the one or more users to edit the third candidate trading record. The candidate trading record tuning process further includes, responsive to a determination that the third confidence indicia for the third candidate trading record is less than (or equal to) the third threshold confidence indicia and responsive to a determination that the third candidate trading record has been edited by one or more of the users, generating an adjusted third confidence indicia for the third candidate trading record.

In another exemplary embodiment, a method of managing trading information is described. The method includes identifying a first communication channel. The first communication channel is configured to facilitate voice communications between a representative user and a first customer user. The method further includes processing the voice communications through the first communication channel. The processing of the voice communications communicated through the first communication channel includes generating, from among all voice communications passing through the first communication channel, a textual representation of representative user voice communications. The representative user voice communications are voice communications made by the representative user. The processing of the voice communications communicated through the first communication channel further includes generating, from among all voice communications passing through the first communication channel, a textual representation of first customer user voice communications. The first customer user voice communications are voice communications made by the first customer user. The method further includes categorizing the processed voice communications. The categorizing includes categorizing words of the representative user voice communications. The categorizing also includes categorizing words of the first customer user voice communications. The method further includes generating a plurality of candidate trading records based on the categorizing of the words of the representative user voice communications and/or the categorizing of the words of the first customer user voice communications. The method further includes performing a confidence level processing. The confidence level processing includes generating a confidence indicia for each of the plurality of candidate trading records. The confidence indicia of each candidate trading record represents a level of confidence of an accuracy of the candidate trading record. The method further includes ranking the plurality of candidate trading records based on the confidence level processing. The ranking of the plurality of candidate trading records includes ranking the plurality of candidate trading records based on the generated confidence indicias of the plurality of candidate trading records.

In another exemplary embodiment, a method of managing trading information is described. The method includes identifying a first communication channel. The first communication channel is configured to facilitate voice communications between a representative user and a first customer user. The method further includes processing the voice communications through the first communication channel. The processing of the voice communications includes generating, from among all voice communications passing through the first communication channel, a textual representation of representative user voice communications. The representative user voice communications are voice communications made by the representative user. The processing of the voice communications further includes generating, from among all voice communications passing through the first communication channel, a textual representation of first customer user voice communications. The first customer user voice communications are voice communications made by the first customer user. The method further includes categorizing the processed voice communications. The categorizing includes categorizing words of the representative user voice communications. The categorizing further includes categorizing words of the first customer user voice communications. The method further includes generating a plurality of candidate trading records based on the categorizing of the words of the representative user voice communications and/or the categorizing of the words of the first customer user voice communications. The method further includes performing a confidence level processing. The confidence level processing includes generating a confidence indicia for each of the plurality of candidate trading records. The confidence indicia of each candidate trading record represents a level of confidence of a completeness of the candidate trading record. The method further includes ranking the plurality of candidate trading records based on the confidence level processing. The ranking of the plurality of candidate trading records includes ranking the plurality of candidate trading records based on the confidence indicias of the plurality of candidate trading records.

In another exemplary embodiment, a method of managing trading information is described. The method may include identifying a first communication channel. The first communication channel is configured to facilitate voice communications between a representative user and a first customer user. The method further includes processing the voice communications through the first communication channel. The processing of the voice communications includes obtaining, from among all voice communications passing through the first communication channel, a textual representation of representative user voice communications. The representative user voice communications are voice communications made by the representative user. The processing of the voice communications further includes obtaining, from among all voice communications passing through the first communication channel, a textual representation of first customer user voice communications. The first customer user voice communications are voice communications made by the first customer user. The method further includes categorizing the processed voice communications. The categorizing includes categorizing words of the representative user voice communications. The categorizing further includes categorizing words of the first customer user voice communications. The method further includes generating a plurality of candidate trading records based on the categorizing of the words of the representative user voice communications and/or the categorizing of the words of the first customer user voice communications. The method further includes performing a confidence level processing. The confidence level processing includes generating a confidence indicia for each of the plurality of candidate trading records. The confidence indicia of each candidate trading record represents a level of confidence of an accuracy and/or completeness of the candidate trading record. The method further includes performing a candidate trading record tuning process. The candidate trading record tuning process includes comparing the confidence indicia for each of the plurality of candidate trading records with a threshold confidence indicia. The candidate trading record tuning process further includes, for each candidate trading record and responsive to a determination that the confidence indicia for the candidate trading record is less than the threshold confidence indicia, displaying the candidate trading record to one or more users. The displayed candidate trading record configured to allow the one or more users to edit the candidate trading record. The candidate trading record tuning process further includes, for each candidate trading record and responsive to a determination that the candidate trading record has been edited by one or more of the users, generating an adjusted confidence indicia for the candidate trading record based on the editing.

In another exemplary embodiment, a method of managing trading information is described. The method includes identifying a first communication channel. The first communication channel is configured to facilitate voice communications between a representative user and a first customer user. The method further includes processing the voice communications through the first communication channel. The processing of the voice communications includes generating, from among all voice communications passing through the first communication channel, a textual representation of representative user voice communications. The representative user voice communications are voice communications made by the representative user. The method further includes categorizing the processed voice communications, including categorizing words of the representative user voice communications. The method further includes generating a plurality of candidate trading records based on the categorizing of the words of the representative user voice communications. The method further includes performing a confidence level processing. The confidence level processing includes generating a confidence indicia for each of the plurality of candidate trading records. The confidence indicia of each candidate trading record represents a level of confidence of an accuracy and/or completeness of the candidate trading record. The method further includes ranking (and/or grouping) the plurality of candidate trading records based on the confidence level processing. The ranking (and/or grouping) of the plurality of candidate trading records includes ranking the plurality of candidate trading records based on the generated confidence indicias of the plurality of candidate trading records.

In another exemplary embodiment, a method of managing trading information is described. The method includes identifying a first communication channel. The first communication channel is configured to facilitate voice communications between a representative user and a first customer user. The method further includes processing the voice communications through the first communication channel. The processing of the voice communications includes obtaining, from among all voice communications passing through the first communication channel, a textual representation of representative user voice communications. The representative user voice communications are voice communications made by the representative user. The method further includes categorizing the processed voice communications, including categorizing words of the representative user voice communications. The method further includes generating a plurality of candidate trading records based on the categorizing of the words of the representative user voice communications. The method further includes performing a confidence level processing. The confidence level processing includes generating a confidence indicia for each of the plurality of candidate trading records. The method further includes performing a candidate trading record tuning process. The candidate trading record tuning process includes comparing the confidence indicia for each of the plurality of candidate trading records with a threshold confidence indicia. The candidate trading record tuning process further includes, for each candidate trading record and responsive to a determination that the confidence indicia for the candidate trading record is greater than the threshold confidence indicia, displaying the candidate trading record to one or more users. The candidate trading record displayed to the one or more users are displayed as an uneditable trading record (e.g., displayed without allowing users to edit the trading record). The candidate trading record tuning process further includes, for each candidate trading record and responsive to a determination that the confidence indicia for the candidate trading record is less than the threshold confidence indicia, displaying the candidate trading record to one or more users. The candidate trading record displayed to the one or more users are displayed as an editable trading record. The candidate trading record tuning process further includes, for each candidate trading record and responsive to a determination that the candidate trading record has been edited by one or more of the users, displaying the edited candidate trading record to the one or more users as an uneditable trading record.

BRIEF DESCRIPTION OF THE FIGURES

For a more complete understanding of the present disclosure, example embodiments, and their advantages, reference is now made to the following description taken in conjunction with the accompanying figures, in which like reference numbers indicate like features, and:

FIG. 9 is an illustration of an example embodiment of a main screen displaying selected trading records.

Although similar reference numbers may be used to refer to similar elements in the figures for convenience, it can be appreciated that each of the various example embodiments may be considered to be distinct variations.

Figure 1:
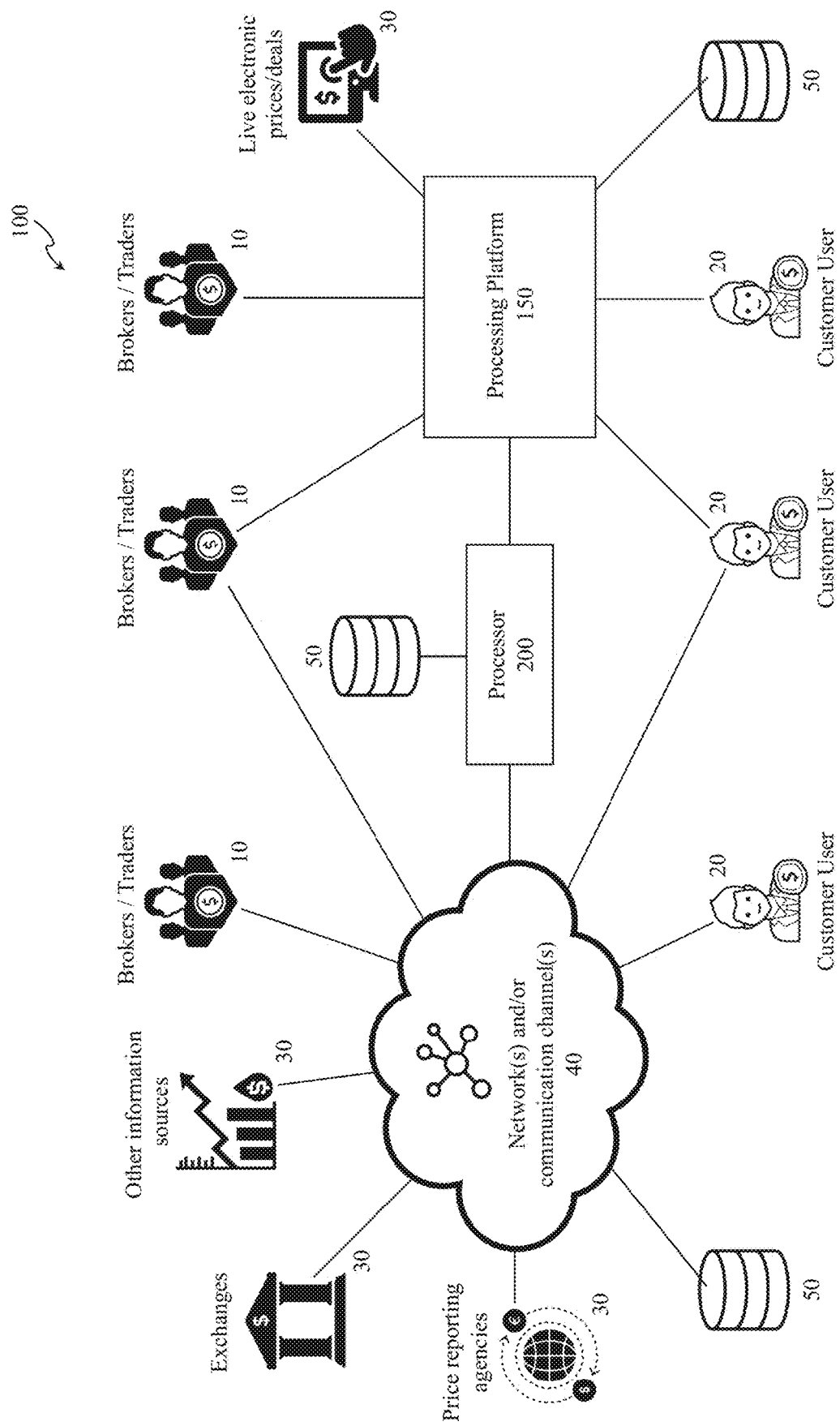
FIG. 1 is an illustration of an example embodiment of a system for managing trading information.

Example embodiments will now be described with reference to the accompanying figures, which form a part of the present disclosure and which illustrate example embodiments which may be practiced. As used in the present disclosure and the appended claims, the terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and the appended claims, the words "and/or" may refer to and encompass any and all possible combinations of one or more of the associated listed items.

DETAILED DESCRIPTION

It is recognized in the present disclosure that customer users and representative users alike encounter problems and/or disadvantages when participating in trades in decentralized/defragmented financial securities and physical instruments markets, such as the energy, commodities, currencies, bonds/fixed income, credit, and interest rates derivatives markets. For example, trading information in such markets are fragmented across multiple venues, data/information sources and trading workflows (which may include voice trading, messaging/chat trading, and/or electronic trading), making it difficult for customer users and representative users to see true market conditions, thereby hindering their ability to hedge effectively and resulting in missed trading opportunities.

Present example embodiments relate generally to and/or include systems, subsystems, processors, devices, logic, methods, and processes for addressing conventional problems, including those described above and in the present disclosure, and more specifically, example embodiments relate to systems, subsystems, processors, devices, logic, methods, and processes for managing trades and trading information, including, but not limited to, one or more of the following: managing of voice and/or textual communications received from one or more communication channels; processing of voice, audio from video, textual, and/or other forms of multi-media communications from the one or more communication channels; processing of voice signatures for users; identifying of user voice and/or textual communications; generating textual representations of user voice and/or textual communications; categorizing one or more words in user voice and/or textual communications; generating information payloads based on the categorizing; generating candidate trading records; selecting candidate trading records as selected candidate trading records (or selected trading records); generating confidence indicias for selected candidate trading records; generating threshold confidence indicias; ranking and/or grouping selected candidate trading records; displaying inadequate trading records in a user-editable section (e.g., a "Confirm to Screen" section, as further described in the present disclosure); and/or displaying selected trading records in a main section (as further described in the present disclosure; which may also be displayed based on the ranking, grouping, and/or confidence indicias). It is to be understood in the present disclosure that one or more elements, actions, and/or aspects of example embodiments may include and/or implement, in part or in whole, solely and/or in cooperation with other elements, using, for example, networking technologies, cloud computing, distributed ledger technology (DLT) (e.g., blockchain), artificial intelligence (AI), machine learning, deep learning, etc. Furthermore, although example embodiments described in the present disclosure may be directed to receiving and/or processing of voice, audio, and/or video based communications so as to generate textual representations of such communications (followed by generating candidate trading records, generating confidence indicias, etc.), it is to be understood in the present disclosure that example embodiments may receive and/or process textual and/or text-based communications instead of (or in addition to) such voice, audio, and/or video based communications without departing from the teachings of the present disclosure. Accordingly, all references to receiving and/or processing of voice, audio, and/or video based communications in the present disclosure may equally apply to, equivalently apply to, similarly apply to, substantively apply to, substantially apply to, and/or be replaced by receiving and/or processing of textual and/or text-based communications without departing from the teachings of the present disclosure.

As used in the present disclosure, a "representative user" 10, "first representative user" 10, "second representative user" 10, "service provider" 10, "broker" 10, "trader" 10, or the like, includes, but is not limited to, a person or entity who provides and/or is available to provide services pertaining to trading of value including, but not limited to, physical commodities, commodities, securities, currencies, digital assets, financial derivatives, bonds, equities and treasuries and/or the like. A representative user 10 may include a broker, a trader, a brokerage firm, a market maker, a price reporter, benchmark provider or any other person who facilitates or helps to facilitate trading and trading related activities between counterparties or who supplies customer users with market data and/or analytics, etc. Furthermore, as used in the present disclosure, a "customer user" 20, a "first customer user" 20, a "second customer user" 20, a "candidate customer user" 20, or the like, includes, but is not limited to, a person or entity who takes a position, has traded, is presently trading, would like to trade, and/or is interested in trading, taking a position and/or to support trading activity as an assistant, an analyst and/or a risk manager through the services of one or more representative users 10. Furthermore, as used in the present disclosure, a "user" 10, 20 may include a representative user 10 and/or a customer user 20. A customer user 20 may also be a representative user 10, and vice versa. Furthermore, as used in the present disclosure, a "trade", "trading", "first trade", "second trade", "trading activity", "deal", or the like, includes, but is not limited to, intending to and/or creating legal or contractual obligations and/or agreeing to contracts for the buying, selling, exchanging physical assets or cash flows, and/or obtaining of a form of value (e.g., commodities, securities, currencies, digital assets, financial derivatives, bonds and treasuries, etc.) in exchange for payment of another form of value (e.g., fiat currency such as US Dollars, British Pound Sterling, Singapore Dollar, etc.). Furthermore, as used in the present disclosure, a "processing platform" (e.g., processing platform 150) includes one or more platforms, systems, or the like, operated, controlled, and/or managed by an example embodiment of the processor 200 that, among other things: connects to and/or communicates with, either centrally or in a distributed manner, traditional, decentralized, and/or fragmented markets; receives, aggregates, and/or processes trading-related information (including selectively filtering, ranking, grouping, subgrouping, and/or displaying, as further described in the present disclosure), either centrally or in a distributed manner, from traditional, decentralized, and/or fragmented markets; allows users 10, 20 to initiate and display bids, offers (or indications of interest to trade), and/or trading information for other users 10, 20 of the processing platform 150 to view and enter into agreed trades directly via the processing platform 150; and/or allows users 10, 20 to enter into agreed trades with bids, offers, and/or trading information initiated on the processing platform 150 by other users 10, 20. Such traditional, decentralized, and/or fragmented markets may include, but are not limited to: those markets in which representative users 10 communicate trading-related information via voice communications/channels (e.g., 1-to-1 voice channel, a 1-to-many voice channel, a many-to-1 voice channel, a broadcast channel, etc.); those markets in which customer users 20 communicate trades, trade interests or trade instructions via voice and/or textual communications/channels (e.g., dedicated physical or software based voice trading communications lines and networks, voice trading turrets, software voice trading turrets, internal voice trading lines, multi company voice trading lines, a mobile phone call, a landline call, a VoIP call, video call such as Skype, Zoom, text message/chat via a messaging service such as Symphony, Slack, Apple iMessage, Telegram, WeChat, Bloomberg Chat, ICE IM, Yahoo Chat, WhatsApp, Line, etc.; an email message; an SMS message; etc.); those markets in which users 10, 20 communicate trades, trade interests, trade instructions, trading-related information, and/or trade confirmations via other electronic means (e.g., hybrid platforms, Request For Quote (RFQ) electronic tools, combination of voice, text and electronic means, etc.); and/or those markets in which exchanges 30, Central Limit Order Books (CLOBs) 30 of exchanges 30, or the like, automatically perform matching of bids and offers via matching algorithms and automatically execute trade orders (e.g., when price levels match to form binding trades). Furthermore, as used in the present disclosure, an "indicative price", or the like, includes, but is not limited to, bids, offers, trades, and/or trading information that are derived, extracted, identified, obtained, and/or otherwise received from voice communications/channels (e.g., a digital or analog telephone or voice call, VoIP call, voice message sent via instant/text messaging, video calls, etc.) and/or textual communications/channels (e.g., instant/text messaging, email, transcribed text from video and/or audio communications, text extracted from other sources, text in one language translated from communications in another language, text generated via OCR or other image processing methods, or the like, etc.). Furthermore, as used in the present disclosure, a "live price", or the like, includes, but is not limited to, bids, offers, trades, and/or trading information initiated, by users 10, 20, directly on the processing platform 150 that can be aggressed (i.e., actionable), by other users 10, 20, directly on the processing platform 150. Furthermore, as used in the present disclosure, an "external price", or the like, includes, but is not limited to, orders, requests-for-quote (RFQs), bids, offers, trades, benchmarks, and/or trading information that are derived, extracted, identified, obtained, and/or otherwise received from information sources 30, including, but not limited to, those that match bid/offers and execute trades to form binding trades. Such information sources 30 may include, but are not limited to, an exchange 30, central limit order book (CLOB) 30, electronic matching engines or trading platforms 30, and/or any other centralized trading source 30 and/or centralized trading information source 30. Furthermore, as used in the present disclosure, live prices and external prices may be collectively referred to as "non-indicative prices". Furthermore, as used in the present disclosure, the term "trading information", "trade information", or the like, includes, but is not limited to, information pertaining to one or more of the following: indicative prices, live prices, firm prices, external prices, implied prices (calculated/generated by the processing platform 150 or other sources 30 that support the generation of implied data), trades, non-indicative prices, deals, benchmarks, index values, past trades, future trades, pricing values, indications of interest (IOI), general market intelligence and/or sentiment, sources of one or more of the aforementioned information, timing (e.g., date/time stamp, etc.) of one or more of the aforementioned information, etc. Furthermore, as used in the present disclosure, "trading dates", "relevant trading dates", "contract expiries", "contract expiry", "expiry", and/or "expiries", include, but are not limited to maturity dates, expiration dates, tradable dates, delivery dates, contract dates, contract expiry dates, completion dates, settlement dates, issue dates, dated dates, call dates, value dates, odd dates, spot dates, target dates, adjustment dates, termination dates, and/or dates relevant and/or pertaining, but are not limited to distinct tradable contracts that are used for trading (e.g., financial futures, physical futures, swaps, financial forwards, physical forwards, other securities, derivatives, options, bonds, treasuries, CFDs, CDOs, CMOs, warrants, REPOs, etc.) and/or tradable contracts with a temporal component (e.g., those listed at various exchanges such as (but not limited to) NYSE, NASDQ, Chicago Mercantile Exchange, New York Mercantile Exchange, The Intercontinental Exchange's European and USA Futures exchanges, Eurex, etc. and also as detailed by industry associations such as ISDA, EFET and the like). For example, the April 2022 contract for the WTI Crude Oil product/instrument, may be referred to in the present disclosure as the April 2022 expiry, contract expiry, trading date, or the like, for the WTI Crude Oil Instrument.

Example embodiments will now be described below with reference to the accompanying figures, which form a part of the present disclosure.

Example Embodiments of a System for Managing Trades and/or Trading Information (e.g., System 100).

FIG. 1 illustrates an example embodiment of a system (e.g., system 100) for managing trading information and/or trades. The system 100 may also manage and/or process communication of and access to trading information and/or trades.

As illustrated in FIG. 1, the system 100 includes one or more processors (e.g., processor 200). The system 100 also includes one or more processing platforms 150, or the like, operated, controlled, and/or managed by an example embodiment of the processor 200. The system 100 may also include and/or communicate with one or more networks, communication channels, or the like (e.g., communication channels 40), which are used to enable communication between elements of the system 100. Communication channels 40 may include, but are not limited to, voice, video and/or audio communication channels (e.g., digital or analog voice conversations (telephony), multi-participant conference calls, one-to-many broadcasts, etc.), text-based communication channels (e.g., text chats from instant messaging platforms or social media platforms, multi-participant chat groups, one-to-one or one-to-many text broadcasts, email, etc.), or the like, where indicative prices are derived, extracted, identified, obtained, and/or otherwise received. Communication channels 40 may also include those that enable communication and/or information exchanges (e.g., non-indicative prices), directly or indirectly, with information sources 30, databases 50, representative users 10, customer users 20, one or more processors 200, and/or one or more other communication channels 40, The system 100 may also include and/or communicate with one or more databases, distributed ledgers, or the like (e.g., database 50). The system 100 is configurable or configured to communicate with one or more representative users (e.g., traders, brokers, or the like, including those who sell to, buy from, transact with, execute for, represent, manage, and/or provide trading information to customer users 20) (e.g., representative user 10) through communication channels 40 and/or via one or more processing platforms 150. The system 100 is also configurable or configured to communicate with one or more customer users (e.g., customer user 20) through communication channels 40 and/or via one or more processing platforms 150. It is to be understood in the present disclosure that a representative user 10 may be a customer user 20 to another representative user 10, and a customer user 20 may also be a representative user 10 to another customer user 20. The system 100 also includes and/or communicates with one or more other information sources including, but not limited to, exchanges, price reporting agencies (PRA), pricing curves from various data providers, other information sources, or the like (referred to herein as information sources 30 or other information sources 30), where live prices and/or external prices are derived, extracted, identified, obtained, and/or otherwise received. Although the figures may illustrate the system 100 as having one processor 200, it is to be understood that the system 100 may include more than one processor 200 without departing from the teachings of the present disclosure. Each processor 200 is configurable or configured to connect to, communicate with, and/or receive communications from one or more representative users 10, one or more customer users 20, one or more information sources 30, one or more communication channels 40, one or more databases 50, one or more processing platforms 150, and/or one or more other processors 200.

As used in the present disclosure, when applicable, a reference to a system (e.g., system 100) or processor (e.g., processor 200) may also refer to, apply to, and/or include one or more computing devices, processors, servers, systems, cloud-based computing, or the like, and/or functionality of one or more processors, computing devices, servers, systems, cloud-based computing, or the like. The system 100 and/or processor 200 (and/or its elements, as described in the present disclosure) may be any processor, server, system, device, computing device, controller, microprocessor, microcontroller, microchip, semiconductor device, or the like, configurable or configured to perform, among other things, a processing and/or managing of information, searching for information, identifying of information, data communications, and/or any one or more other actions described above and in the present disclosure. Alternatively, or in addition, the system 100 and/or processor 200 (and/or its elements, as described in the present disclosure) may include and/or be a part of a virtual machine, processor, computer, node, instance, host, or machine, including those in a networked computing environment.

As used in the present disclosure, a communication channel 40, network 40, cloud 40, or the like, may be or include a collection of devices and/or virtual machines connected by communication channels that facilitate communications between devices and allow for devices to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. A communication channel 40, network 40, cloud 40, or the like, may include, but is not limited to, computing grid systems, peer to peer systems, mesh-type systems, distributed computing environments, cloud computing environment, telephony systems, voice over IP (VoIP) systems, voice communication channels, voice broadcast channels, text-based communication channels, video communication channels, etc. Such communication channels 40, networks 40, clouds 40, or the like, may include hardware and software infrastructures configured to form a virtual organization comprised of multiple resources which may be in geographically disperse locations. Communication channel 40, network 40, cloud 40, or the like, may also refer to a communication medium between processes on the same device. Also as referred to herein, a network element, node, or server may be a device deployed to execute a program operating as a socket listener and may include software instances.

These and other elements of the system 100 will now be further described with reference to the accompanying figures.

The Processor (e.g., Processor 200).

As illustrated in at least FIG. 1, the system 100 includes one or more processors (e.g., processor 200). The processor 200 is configurable or configured to manage, among other things, trading information and/or trades, including the processing of trading information and/or trades communicated by and/or for one or more elements of the system 100. The processor 200 is also configurable or configured to manage, control, and/or operate a processing platform 150. An example embodiment of the processing platform 150 is configurable or configured to connect to and/or communicate with, either centrally or in a distributed manner, traditional, decentralized, and/or fragmented markets. An example embodiment of the processing platform 150 is also configurable or configured to receive, aggregate, and/or process trading-related information (including selectively filtering, ranking, grouping, subgrouping, and/or displaying, as further described in the present disclosure), either centrally or in a distributed manner, from traditional, decentralized, and/or fragmented markets. An example embodiment of the processing platform 150 is also configurable or configured to allow users 10, 20 to initiate and display bids, offers (or indications of interest to trade), and/or trading information for other users 10, 20 of the processing platform 150 to view trading information, to indicate an interest to trade and/or enter into agreed trades directly via the processing platform 150. An example embodiment of the processing platform 150 is also configurable or configured to allow users 10, 20 to enter into agreed trades (or express an interest or a potential interest to trade) with bids, offers, and/or trading information initiated on the processing platform 150 by other users 10, 20.

As will be further described in the present disclosure, an example embodiment of the processor 200 (e.g., the communication channel processor 210, as further described in the present disclosure) is configurable or configured to identify one or more communication channels 40, including those that facilitate communications between one or more representative users 10 (e.g., broker, trader, etc.) and one or more customer users 20 (and/or between representative users 10; and/or between customer users 20) so as to receive and process indicative prices and/or those that connect, directly or indirectly, to one or more information sources 30 (e.g., direct connection from the processor 200 to an exchange 30, CLOB 30, other external trading information sources etc.) so as to receive and process non-indicative prices. Such communications may be in any form including, but not limited to, multi-party communications (e.g., each user 10, 20 can receive and send communications; one or more representative users 10 can communicate with one or more other representative users 10; and one or more customer users 20 can communicate with one or more other customer users 20), broadcast communications (e.g., one user 10, 20 sends communications to multiple users 10, 20, and such multiple users 10, 20 can either receive only or communicate back), one-to-many communications (e.g., one user 10, 20 has multiple single communication channel connections, with each single communication channel facilitating communications with a single user 10, 20, and with each single communication channel facilitating either bi-directional communications or one-way communications), direct or indirect communications with an information source 30 (e.g., direct connection between the processor 200 (and/or processing platform 150 managed by the processor 200) and an exchange 30, CLOB 30, etc.).

Once the one or more communication channels 40 are identified, the processor 200 (e.g., the user communications processor 220, as further described in the present disclosure) is configurable or configured to receive and/or process information and/or communications communicated and/or passing through the one or more communication channels 40. For communication channels 40 that are voice communication channels (e.g., a digital or analog telephone or voice call, VoIP call, voice message sent via instant/text messaging, etc.) and/or include voice communications (e.g., a video call, video message sent via instant/text messaging, etc.), the processor 200 (e.g., the user communications processor 220, as further described in the present disclosure) is configurable or configured to perform a voice signature processing (and/or obtaining a historic or already processed voice signature) and/or is configured or configurable to identify voice speakers or sources by other means such as matching source channel identifiers with users, etc. Voice signature processing may include generating and/or obtaining a voice signature for one or more users 10, 20 who are communicating on one or more communication channels 40, including a voice signature for one or more representative users 10 and/or a voice signature for one or more customer users 20. Such voice signatures may be used to identify, from among voice communications passing through the one or more communication channels 40, voice communications from specific users (e.g., a representative user voice signature is used to identify, from among all voice communications passing through the one or more communication channels 40, representative user voice communications (or voice communications made by a representative user 10); a first customer user voice signature is used to identify, from among all voice communications passing through the one or more communication channels 40, first customer user voice communications (or voice communications made by a first customer user 20); a second customer user voice signature is used to identify, from among all voice communications passing through the one or more communication channels 40, second customer user voice communications (or voice communications made by a second customer user 20); a third customer user voice signature is used to identify, from among all voice communications passing through the one or more communication channels 40, third customer user voice communications (or voice communications made by a third customer user 20); and so on). For communication channels 40 that are directly or indirectly connected to an information source 30, the processor 200 is configurable or configured to search for, process, obtain, extract, and/or otherwise receive non-indicative prices and other trading information from such information source 30 via the communication channel 40. For example, the processor 200 is configurable or configured to obtain, among other things, external prices, relevant trading dates (e.g., expiries such as contract expiries, trading time, trading date, and/or timestamps for deals, trades, prices, orders, and other trading records, etc.), trading instrument, and/or user types for particular trading instruments from an exchange 30 and/or other information sources 30 via such communication channels 40.

After identifying voice communications made by one or more users 10, 20 (e.g., for communication channels 40 that are voice communication channels 40), the processor 200 (e.g., the categorization processor 230, as further described in the present disclosure) is configurable or configured to perform category processing. Example embodiments of category processing include the generating of one or more information payloads for one or more users 10, 20 based on, among other things, the identified voice communications (e.g., representative user voice communications, first user voice communications, second user voice communications, etc.) and predetermined categorizations. For example, for representative user voice communications, the processor 200 may be configurable or configured to generate a first representative user payload. Such first representative user payload may be generated in such a way as to include a textual representation of words from the representative user voice communications that pertain to trading actions. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a first representative user payload based on such textual communications from the representative user that pertain to trading actions. As another example, the processor 200 may be configurable or configured to generate a second representative user payload. Such second representative user payload may be generated so as to include a textual representation of words from the representative user voice communications that pertain to trading prices. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a second representative user payload based on such textual communications from the representative user that pertain to trading prices. As another example, the processor 200 may be configurable or configured to generate a third representative user payload. Such third representative user payload may be generated so as to include a textual representation of words from the representative user voice communications that pertain to trading quantities. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a third representative user payload based on such textual communications from the representative user that pertain to trading quantities. As another example, the processor 200 may be configurable or configured to generate other representative user payloads. Such other representative user payloads may be generated so as to include a textual representation of words from the representative user voice communications that pertain to other potentially relevant categories such as trading instruments, relevant trading dates (e.g., expiries such as contract expiries), user types, status of prices such as the degree of firmness, source of prices (e.g. the identity of a customer user who initiated them). In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate other representative user payloads based on such textual communications from the representative user that pertain to other potentially relevant categories such as trading instruments, relevant trading dates (e.g., expiries such as contract expiries), user types, status of prices such as the degree of firmness, source of prices (e.g. the identity of a customer user who initiated them). As another example, for first customer user voice communications, the processor 200 may be configurable or configured to generate a first first customer user payload. Such first first customer user payload may be generated in such a way as to include a textual representation of words from the first customer user voice communications that pertain to trading actions. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a first first customer user payload based on such textual communications from the first customer user that pertain to trading actions. As another example, the processor 200 may be configurable or configured to generate a second first customer user payload. Such second first customer user payload may be generated so as to include a textual representation of words from the first customer user voice communications that pertain to trading prices. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a second first customer user payload based on such textual communications from the first customer user that pertain to trading prices. As another example, the processor 200 may be configurable or configured to generate a third first customer user payload. Such third first customer user payload may be generated so as to include a textual representation of words from the first customer user voice communications that pertain to trading quantities. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a third first customer user payload based on such textual communications from the first customer user that pertain to trading quantities. As another example, the processor 200 may be configurable or configured to generate other first customer user payloads. Such other first customer user payloads may be generated so as to include a textual representation of words from the first customer user voice communications that pertain to other potentially relevant categories such as trading instruments, relevant trading dates (e.g., expiries such as contract expiries), user types, status of prices such as the degree of firmness, source of prices (e.g. the identity of a customer user who initiated them). In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate an other first customer user payload based on such textual communications from the first customer user that pertain to other potentially relevant categories such as trading instruments, relevant trading dates (e.g., expiries such as contract expiries), user types, status of prices such as the degree of firmness, source of prices (e.g. the identity of a customer user who initiated them). As another example, for second customer user voice communications, the processor 200 may be configurable or configured to generate a first second customer user payload. Such first second customer user payload may be generated in such a way as to include a textual representation of words from the second customer user voice communications that pertain to trading actions. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a first second customer user payload based on such textual communications from the second customer user that pertain to trading actions. As another example, the processor 200 may be configurable or configured to generate a second second customer user payload. Such second second customer user payload may be generated so as to include a textual representation of words from the second customer user voice communications that pertain to trading prices. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a second second customer user payload based on such textual communications from the second customer user that pertain to trading prices. As another example, the processor 200 may be configurable or configured to generate a third second customer user payload. Such third second customer user payload may be generated so as to include a textual representation of words from the second customer user voice communications that pertain to trading quantities. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a third second customer user payload based on such textual communications from the second customer user that pertain to trading quantities. As another example, the processor 200 may be configurable or configured to generate other second customer user payloads. Such other second customer user payloads may be generated so as to include a textual representation of words from the second customer user voice communications that pertain to other potentially relevant categories such as trading instruments, relevant trading dates (e.g., expiries such as contract expiries), user types, status of prices such as the degree of firmness, source of prices (e.g. the identity of a customer user who initiated them). In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate an other second customer user payload based on such textual communications from the second customer user that pertain to other potentially relevant categories such as trading instruments, relevant trading dates (e.g., expiries such as contract expiries), user types, status of prices such as the degree of firmness, source of prices (e.g. the identity of a customer user who initiated them). In yet another example, for third customer user voice communications, the processor 200 may be configurable or configured to generate a first third customer user payload. Such first third customer user payload may be generated in such a way as to include a textual representation of words from the third customer user voice communications that pertain to trading actions. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a first third customer user payload based on such textual communications from the third customer user that pertain to trading actions. As another example, the processor 200 may be configurable or configured to generate a second third customer user payload. Such second third customer user payload may be generated so as to include a textual representation of words from the third customer user voice communications that pertain to trading prices. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a second third customer user payload based on such textual communications from the third customer user that pertain to trading prices. As another example, the processor 200 may be configurable or configured to generate a third third customer user payload. Such third third customer user payload may be generated so as to include a textual representation of words from the third customer user voice communications that pertain to trading quantities. In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate a third third customer user payload based on such textual communications from the third customer user that pertain to trading quantities. As another example, the processor 200 may be configurable or configured to generate other third customer user payloads. Such other third customer user payloads may be generated so as to include a textual representation of words from the third customer user voice communications that pertain to other potentially relevant categories such as trading instruments, relevant trading dates (e.g., expiries such as contract expiries), user types, status of prices such as the degree of firmness, source of prices (e.g. the identity of a customer user who initiated them). In example embodiments where the communications are conducted via textual communications (e.g., instant/text messaging, email, transcribed text from video and/or audio communications, text extracted from other sources, text in one language translated from communications in another language, text generated via OCR or other image processing methods, or the like, etc.) (e.g., instead of or in addition to voice communications), the processor 200 is configurable or configured to generate an other third customer user payload based on such textual communications from the third customer user that pertain to other potentially relevant categories such as trading instruments, relevant trading dates (e.g., expiries such as contract expiries), user types, status of prices such as the degree of firmness, source of prices (e.g. the identity of a customer user who initiated them).

It is to be understood in the present disclosure that the generating of information payloads, including those described above and in the present disclosure, may be based on voice communications and/or textual communications and may also be based on other information sources including, but not limited to, historic information (e.g., as stored in databases 50) and/or current information (e.g., as stored in databases 50 and/or as received via networks 40 and/or communication channels 40). Information payloads may also be generated based on non-indicative prices and/or other trading information, including external prices derived, extracted, identified, requested, obtained, and/or otherwise received from other information sources 30 (e.g., exchanges 30, CLOBs 30, other external trading information sources 30, etc.) and/or live prices initiated by users 10, 20 directly on the processing platform 150. For example, the processor 200 may be configurable or configured to generate a first first exchange payload that includes information derived, extracted, identified, requested, obtained, and/or otherwise received from a first exchange 30 pertaining to trading actions. As another example, the processor 200 may be configurable or configured to generate a second first exchange payload that includes information derived, extracted, identified, requested, obtained, and/or otherwise received from the first exchange 30 pertaining to trading prices. As another example, the processor 200 may be configurable or configured to generate a third first exchange payload that includes information derived, extracted, identified, requested, obtained, and/or otherwise received from the first exchange 30 pertaining to trading quantities. As another example, the processor 200 may be configurable or configured to generate other first exchange payloads that include information derived, extracted, identified, requested, obtained, and/or otherwise received from the first exchange 30 pertaining to other potentially relevant categories such as trading instruments, relevant trading dates (e.g., expiries such as contract expiries), user types, status of prices such as the degree of firmness, source of prices, etc. Alternatively or in addition, example embodiments may bypass the generating of (or may not generate) such payloads, such as in situations when the non-indicative prices and/or other trading information are already structured, categorized, and/or easily and/or readily displayable and/or presentable, by the processor 200 (e.g., the trading record processor 260, as further described in the present disclosure) to one or more users 10, 20, as a trading record (e.g., as illustrated in FIG. 9). In this regard, example embodiments may instead provide such non-indicative prices and/or other trading information (and/or one or more parts of such trading information) to one or more of the following elements of the processor: the candidate trading record processor 240 (as further described in the present disclosure) for generating a candidate trading record based on non-indicative prices and/or other trading information received from other information sources 30; the confidence indicia processor 250 (as further described in the present disclosure) for generating a confidence indicia for the non-indicative prices, other trading information and/or candidate trading record generated based on trading information received from information sources 30; the trading record ranking processor 270 (as further described in the present disclosure) for ranking the non-indicative prices, other trading information and/or candidate trading record received and/or generated based on trading information received from information sources 30; and/or the trading record processor 260 (as further described in the present disclosure) for displaying (e.g., as illustrated in FIG. 9) via the processing platform 150, to one or more users 10, 20, the non-indicative prices, other trading information and/or candidate trading record received and/or generated based on trading information received from information sources 30.

With the processed information payloads, the processor 200 is configurable or configured to generate a plurality of candidate trading records. For example, the processor 200 (e.g., the candidate trading record processor 240, as further described in the present disclosure) may be configurable or configured to generate a candidate trading record based on a selection of one or more words from one or more of the payloads described above and in the present disclosure. As a more specific example, the processor 200 may be configurable or configured to generate a first candidate trading record based on a selection of one or more words from one or more first representative user payloads (i.e., words from representative user voice communications and/or representative user textual communications that pertain to trading actions) and/or a selection of one or more words from one or more second representative user payloads (i.e., words from the representative user voice communications and/or representative user textual communications that pertain to trading prices). Such first candidate trading record may be generated pursuant to representative user voice communications and/or representative user textual communications (e.g., a broker 10 who communicates trade information to one or more customer users 20 via voice and/or text). Alternatively or in addition, such first candidate trading record may be generated based on a selection of one or more words from one or more first representative user payloads and/or a selection of one or more words from one or more second representative user payloads and/or a selection of one or more words from one or more third representative user payloads (i.e., words from the representative user voice communications and/or representative user textual communications that pertain to trading quantities) and/or a selection of one or more words from one or more other representative user payloads (i.e., words from the representative user voice communications and/or representative user textual communications that pertain to other potentially relevant categories such as trading instruments, relevant trading dates (e.g., expiries such as contract expiries), user types, status of prices such as the degree of firmness, source of prices (e.g. the identity of a customer user who initiated them). As another more specific example, the processor 200 may be configurable or configured to generate a second candidate trading record based on a selection of one or more words from one or more first first customer user payloads (i.e., words from the first customer user voice communications and/or first customer user text communications that pertain to trading actions) and/or a selection of one or more words from one or more second first customer user payloads (i.e., words from the first customer user voice communications and/or first customer user text communications that pertain to trading prices). Such second candidate trading record may be generated pursuant to first customer user voice communications and/or first customer user text communications (e.g., a first customer user 20 who communicates trade information to one or more representative users 10 via voice and/or text). Alternatively or in addition, such second candidate trading record may be generated based on a selection of one or more words from one or more first first customer user payloads and/or a selection of one or more words from one or more second first customer user payloads and/or a selection of one or more words from one or more third first customer user payloads (i.e., words from the first customer user voice communications and/or first customer user text communications that pertain to trading quantities) and/or a selection of one or more words from one or more other first customer user payloads (i.e., words from the first customer user voice communications and/or first customer user text communications that pertain to other potentially relevant categories such as trading instruments, relevant trading dates (e.g., expiries such as contract expiries), user types, status of prices such as the degree of firmness, source of prices (e.g. the identity of a customer user who initiated them)). As another more specific example, the processor 200 may be configurable or configured to generate a third candidate trading record based on a selection of one or more words from one or more first second customer user payloads (i.e., words from the second customer user voice communications and/or second customer user text communications that pertain to trading actions) and/or a selection of one or more words from one or more second second customer user payloads (i.e., words from the second customer user voice communications and/or second customer user text communications that pertain to trading prices). Such third candidate trading record may be generated pursuant to second customer user voice communications and/or second customer user text communications (e.g., a second customer user 20 who communicates trade information to one or more representative users 10 via voice). Alternatively or in addition, such third candidate trading record may be generated based on a selection of one or more words from one or more first second customer user payloads and/or a selection of one or more words from one or more second second customer user payloads and/or a selection of one or more words from one or more third second customer user payloads (i.e., words from the second customer user voice communications and/or second customer user text communications that pertain to trading quantities) and/or a selection of one or more words from one or more other second customer user payloads (i.e., words from the second customer user voice communications and/or second customer user text communications that pertain to other potentially relevant categories such as trading instruments, relevant trading dates (e.g., expiries such as contract expiries), user types, status of prices such as the degree of firmness, source of prices (e.g. the identity of a customer user who initiated them)). As another more specific example, the processor 200 may be configurable or configured to generate a fourth candidate trading record based on a selection of one or more words from one or more first first exchange payloads (i.e., words/information derived, extracted, identified, requested, obtained, and/or otherwise received from a first exchange 30 (for external prices) or processing platform 150 (for live prices) pertaining to trading actions), second first exchange payload (i.e., information derived, extracted, identified, requested, obtained, and/or otherwise received from the first exchange 30 (for external prices) or processing platform 150 (for live prices) pertaining to trading prices), third first exchange payload (i.e., information derived, extracted, identified, requested, obtained, and/or otherwise received from the first exchange 30 (for external prices) or processing platform 150 (for live prices) pertaining to trading quantities), and/or other first exchange payload (i.e., information derived, extracted, identified, requested, obtained, and/or otherwise received from the first exchange 30 (for external prices) or processing platform 150 (for live prices) pertaining to other potentially relevant categories such as trading instruments, relevant trading dates (e.g., expiries such as contract expiries), user types, status of prices such as the degree of firmness, source of prices, etc.). Such fourth candidate trading record may be generated pursuant to non-indicative prices and/or other trading information received from other information sources 30 and/or the processing platform 150.

After generating the plurality of candidate trading records, the processor 200 (e.g., the confidence indicia processor 250, as further described in the present disclosure) is configurable or configured to generate a confidence indicia for each of the plurality of candidate trading records. In an example embodiment, the processor 200 is configurable or configured to generate a first confidence indicia for the first candidate trading record. The first confidence indicia for the first candidate trading record represents a level of confidence and/or score of one or more aspects of the first candidate trading record.

For example, the first confidence indicia for the first candidate trading record may represent a level of confidence of and/or score representing an accuracy of the first candidate trading record. As a more specific example, the first confidence indicia for the first candidate trading record may represent a level of confidence of an accuracy of the quality of the voice communication received and/or captured from the communication channel 40 used to generate the first candidate trading record. As another more specific example, the first confidence indicia for the first candidate trading record may represent a level of confidence of an accuracy of the voice signature used to generate the first candidate trading record. As another more specific example, the first confidence indicia for the first candidate trading record may represent a level of confidence of an accuracy of the categorizing used to generate the first candidate trading record. As another more specific example, the first confidence indicia for the first candidate trading record may represent a level of confidence of an accuracy of the generating of one or more of the payloads used to generate the first candidate trading record. As another more specific example, the first confidence indicia for the first candidate trading record may represent a level of confidence of an accuracy of the generating of the textual representations in the payloads used to generate the first candidate trading record. As another more specific example, the first confidence indicia for the first candidate trading record may represent a level of confidence of an accuracy of the generating of the first candidate trading record. As another more specific example, the first confidence indicia for the first candidate trading record may represent a level of confidence of an accuracy of the ranking of the first candidate trading record (e.g., relative to other candidate trading records, as further described in the present disclosure). As another more specific example, the first confidence indicia for the first candidate trading record may represent a level of confidence of an accuracy of the arranging, grouping, stacking, filtering, comparing, and/or ordering of the first candidate trading record (e.g., relative to and/or with other candidate trading records, as further described in the present disclosure).

Alternatively or in addition, the first confidence indicia for the first candidate trading record may represent a level of confidence of and/or score representing a completeness of the first candidate trading record. For example, the first confidence indicia for the first candidate trading record may represent a level of confidence of a completeness of the voice communication received and/or captured from the communication channel 40 used to generate the first candidate trading record. As another example, the first confidence indicia for the first candidate trading record may represent a level of confidence of a completeness of the voice signature used to generate the first candidate trading record. As another example, the first confidence indicia for the first candidate trading record may represent a level of confidence of a completeness of the categorizing used to generate the first candidate trading record. As another example, the first confidence indicia for the first candidate trading record may represent a level of confidence of a completeness of one or more of the payloads used to generate the first candidate trading record. As another example, the first confidence indicia for the first candidate trading record may represent a level of confidence of a completeness of the textual representations in the payloads used to generate the first candidate trading record. As another example, the first confidence indicia for the first candidate trading record may represent a level of confidence of a completeness of the information in the first candidate trading records used to generate the first candidate trading record.

Alternatively or in addition, the first confidence indicia for the first candidate trading record may represent a level of confidence and/or score pertaining to the source of the trading information used to generate the first candidate trading record (e.g., reliability, credibility, quality, accuracy, completeness, or the like, of the trading information from the source of the trading information used to generate the first candidate trading record). For example, when comparing non-indicative prices and/or other trading information from a first source (e.g., a source such as an exchange 30, CLOB 30, processing platform 150, etc.) that is always, consistently, inherently, defaulted to be, and/or considered to be more reliable, credible, accurate, complete, etc. than indicative prices and/or other trading information from a second source (e.g., a source such as voice or instant messaging (IM) communications by a broker 10), first candidate trading records generated using non-indicative prices and/or other trading information from the first source will have a higher confidence indicia than first candidate trading records generating using indicative prices and/or other trading information from the second source.

Alternatively or in addition, the first confidence indicia for the first candidate trading record may represent a level of confidence and/or score pertaining to a temporal aspect or nature of the first candidate trading record (e.g., how current, recent, relevant, updated, not outdated, or the like, is the trading information in the first candidate trading record based on a temporal aspect of the trading information, such as a time and/or date of trade, timestamp, etc.). For example, a first trading price for a particular commodity with a first timestamp (or first time of trade) just 1 minute ago will have a price that more accurately or better reflects the current fair market price of the particular commodity as compared a second trading price for the same commodity with a second timestamp (or second time of trade) of 1 hour ago. In such an example, a first candidate trading record having the first trading price and first timestamp (or first time of trade) will have a higher confidence indicia than a first candidate trading record having the second trading price and second timestamp (or second time of trade).

The processor 200 may also be configurable or configured to generate a second confidence indicia for the second candidate trading record. The second confidence indicia for the second candidate trading record represents a level of confidence and/or score of one or more aspects of the second candidate trading record.

For example, the second confidence indicia for the second candidate trading record may represent a level of confidence of and/or score representing an accuracy of the second candidate trading record. As a more specific example, the second confidence indicia for the second candidate trading record may represent a level of confidence of an accuracy of the quality of the voice communication received and/or captured from the communication channel 40 used to generate the second candidate trading record. As another more specific example, the second confidence indicia for the second candidate trading record may represent a level of confidence of an accuracy of the voice signature used to generate the second candidate trading record. As another more specific example, the second confidence indicia for the second candidate trading record may represent a level of confidence of an accuracy of the categorizing used to generate the second candidate trading record. As another more specific example, the second confidence indicia for the second candidate trading record may represent a level of confidence of an accuracy of the generating of one or more payloads used to generate the second candidate trading record. As another more specific example, the second confidence indicia for the second candidate trading record may represent a level of confidence of an accuracy of the generating of the textual representations in the payloads used to generate the second candidate trading record. As another more specific example, the second confidence indicia for the second candidate trading record may represent a level of confidence of an accuracy of the generating of the second candidate trading record. As another more specific example, the second confidence indicia for the second candidate trading record may represent a level of confidence of an accuracy of the ranking of the second candidate trading record (e.g., relative to other candidate trading records, as further described in the present disclosure). As another more specific example, the second confidence indicia for the second candidate trading record may represent a level of confidence of an accuracy of the arranging, grouping, stacking, filtering, comparing, and/or ordering of the second candidate trading record (e.g., relative to and/or with other candidate trading records, as further described in the present disclosure).

Alternatively or in addition, the second confidence indicia may represent a level of confidence of and/or score representing a completeness of the second candidate trading record. For example, the second confidence indicia for the second candidate trading record may represent a level of confidence of a completeness of the voice communication received and/or captured from the communication channel 40 used to generate the second candidate trading record. As another example, the second confidence indicia for the second candidate trading record may represent a level of confidence of a completeness of the voice signature used to generate the second candidate trading record. As another example, the second confidence indicia for the second candidate trading record may represent a level of confidence of a completeness of the categorizing used to generate the second candidate trading record. As another example, the second confidence indicia for the second candidate trading record may represent a level of confidence of a completeness of one or more of the payloads used to generate the second candidate trading record. As another example, the second confidence indicia for the second candidate trading record may represent a level of confidence of a completeness of the textual representations in the payloads used to generate the second candidate trading record. As another example, the second confidence indicia for the second candidate trading record may represent a level of confidence of a completeness of the information in the second candidate trading records used to generate the second candidate trading record.

Alternatively or in addition, the second confidence indicia for the second candidate trading record may represent a level of confidence and/or score pertaining to a source of the trading information used to generate the second candidate trading record (e.g., reliability, credibility, quality, accuracy, completeness, or the like, of the trading information from the source of the trading information used to generate the second candidate trading record). For example, when comparing non-indicative prices and/or other trading information from a first source (e.g., a source such as an exchange 30, CLOB 30, processing platform 150, etc.) that is always, consistently, inherently, defaulted to be, and/or considered to be more reliable, credible, accurate, complete, etc. than non-indicative prices and/or other trading information from a second source (e.g., a source such as voice or instant messaging (IM) communications by a broker 10), second candidate trading records generated using indicative prices and/or other trading information from the first source will have a higher confidence indicia than second candidate trading records generating using non-indicative prices and/or other trading information from the second source.

Alternatively or in addition, the second confidence indicia for the second candidate trading record may represent a level of confidence and/or score pertaining to a temporal aspect or nature of the second candidate trading record (e.g., how current, recent, relevant, updated, not outdated, or the like, is the trading information in the second candidate trading record based on a temporal aspect of the trading information, such as a time and/or date of trade, timestamp, etc.). For example, a first trading price for a particular commodity with a first timestamp (or first time of trade) just 1 minute ago will have a price that more accurately or better reflects the current fair market price of the particular commodity as compared a second trading price for the same commodity with a second timestamp (or second time of trade) of 1 hour ago. In such an example, a second candidate trading record having the first trading price and first timestamp (or first time of trade) will have a higher confidence indicia than a second candidate trading record having the second trading price and second timestamp (or second time of trade).

The processor 200 may also be configurable or configured to generate a third confidence indicia for the third candidate trading record. The third confidence indicia for the third candidate trading record represents a level of confidence and/or score of one or more aspects of the third candidate trading record.

For example, the third confidence indicia for the third candidate trading record may represent a level of confidence of and/or score representing an accuracy of the third candidate trading record. As a more specific example, the third confidence indicia for the third candidate trading record may represent a level of confidence of an accuracy of the quality of the voice communication received and/or captured from the communication channel 40 used to generate the third candidate trading record. As another more specific example, the third confidence indicia for the third candidate trading record may represent a level of confidence of an accuracy of the voice signature used to generate the third candidate trading record. As another more specific example, the third confidence indicia for the third candidate trading record may represent a level of confidence of an accuracy of the categorizing used to generate the third candidate trading record. As another more specific example, the third confidence indicia for the third candidate trading record may represent a level of confidence of an accuracy of the generating of one or more payloads used to generate the third candidate trading record. As another more specific example, the third confidence indicia for the third candidate trading record may represent a level of confidence of an accuracy of the generating of the textual representations in the payloads used to generate the third candidate trading record. As another more specific example, the third confidence indicia for the third candidate trading record may represent a level of confidence of an accuracy of the generating of the third candidate trading record. As another more specific example, the second confidence indicia for the second candidate trading record may represent a level of confidence of an accuracy of the ranking of the third candidate trading record (e.g., relative to other candidate trading records, as further described in the present disclosure). As another more specific example, the third confidence indicia for the third candidate trading record may represent a level of confidence of an accuracy of the arranging, grouping, stacking, filtering, comparing, and/or ordering of the third candidate trading record (e.g., relative to and/or with other candidate trading records, as further described in the present disclosure).

Alternatively or in addition, the third confidence indicia may represent a level of confidence of and/or score representing a completeness of the third candidate trading record. For example, the third confidence indicia for the third candidate trading record may represent a level of confidence of a completeness of the voice communication received and/or captured from the communication channel 40 used to generate the third candidate trading record. As another example, the third confidence indicia for the third candidate trading record may represent a level of confidence of a completeness of the voice signature used to generate the third candidate trading record. As another example, the third confidence indicia for the third candidate trading record may represent a level of confidence of a completeness of the categorizing used to generate the third candidate trading record. As another example, the third confidence indicia for the third candidate trading record may represent a level of confidence of a completeness of one or more of the payloads used to generate the third candidate trading record. As another example, the third confidence indicia for the third candidate trading record may represent a level of confidence of a completeness of the textual representations in the payloads used to generate the third candidate trading record. As another example, the third confidence indicia for the third candidate trading record may represent a level of confidence of a completeness of the information in the third candidate trading records used to generate the third candidate trading record.

Alternatively or in addition, the third confidence indicia for the third candidate trading record may represent a level of confidence and/or score pertaining to a source of the trading information used to generate the third candidate trading record (e.g., reliability, credibility, quality, accuracy, completeness, or the like, of the trading information from the source of the trading information used to generate the third candidate trading record). For example, when comparing non-indicative prices and/or other trading information from a first source (e.g., a source such as an exchange 30, CLOB 30, processing platform 150, etc.) that is always, consistently, inherently, defaulted to be, and/or considered to be more reliable, credible, accurate, complete, etc. than indicative prices and/or other trading information from a second source (e.g., a source such as voice or instant messaging (IM) communications by a broker 10), third candidate trading records generated using non-indicative prices and/or other trading information from the first source will have a higher confidence indicia than third candidate trading records generating using indicative prices and/or other trading information from the second source.

Alternatively or in addition, the third confidence indicia for the third candidate trading record may represent a level of confidence and/or score pertaining to a temporal aspect or nature of the third candidate trading record (e.g., how current, recent, relevant, updated, not outdated, or the like, is the trading information in the third candidate trading record based on a temporal aspect of the trading information, such as a time and/or date of trade, timestamp, etc.). For example, a first trading price for a particular commodity with a first timestamp (or first time of trade) just 1 minute ago will have a price that more accurately or better reflects the current fair market price of the particular commodity as compared a second trading price for the same commodity with a second timestamp (or second time of trade) of 1 hour ago. In such an example, a third candidate trading record having the first trading price and first timestamp (or first time of trade) will have a higher confidence indicia than a third candidate trading record having the second trading price and second timestamp (or second time of trade).

As described above and in the present disclosure, the processor 200 is configurable or configured to search, analyze, process, identify, and/or select historic information when processing trading information and/or trades. Historic information may include information on and/or pertaining to, among other things, representative users 10; customer users 20; other users; historic information from other information sources 30, including historic external prices; historic information from the processing platform 150, including historic live prices; historic trading information; historic trades; historic communications along one or more communication channels 40; historic voice signatures; historic voice signature processing; historic categorizing; historic category processing; historic information payloads; historic textual representations in payloads; historic candidate trading records; historic candidate trading record processing; historic confidence indicias; historic rankings of candidate trading records; historic groupings of trading records; historic stacking/ordering of trading records; and/or historic adjusted indicias based on user edits of candidate trading records. As used in the present disclosure, a reference to information being "historic", "historical", "previous", "previously", or the like, may be interpreted to mean, refer to, and/or pertain to information received, generated, obtained, selected, identified, and/or received on a different date and/or time and/or timestamp.

In addition to historic information, the processor 200 is configurable or configured to search, analyze, process, identify, and/or select current information when processing trading information and/or trades. Current information may include information on and/or pertaining to, among other things, representative users 10; customer users 20; other users; current information from other information sources 30, including current external prices; current information from the processing platform 150, including current live prices; current trading information; current trades; current communications passing through one or more communication channels 40; current voice signatures; current voice signature processing; current categorizing; current category processing; current information payloads; current textual representations in payloads; current candidate trading records; current candidate trading record processing; current confidence indicias; current rankings of candidate trading records; current groupings/stacking of trading records; and/or current adjusted indicias based on user edits of candidate trading records. As used in the present disclosure, a reference to information (or service requests, pricing policies, objectives, prices, time windows, etc.) being "current", "currently", "recent", "recently", or the like, may be interpreted to mean, refer to, and/or pertain to information received, generated, obtained, selected, identified, and/or received within a time window, such time window being one that spans a predetermined and/or dynamically determined amount of time before a current time.

Figure 2:
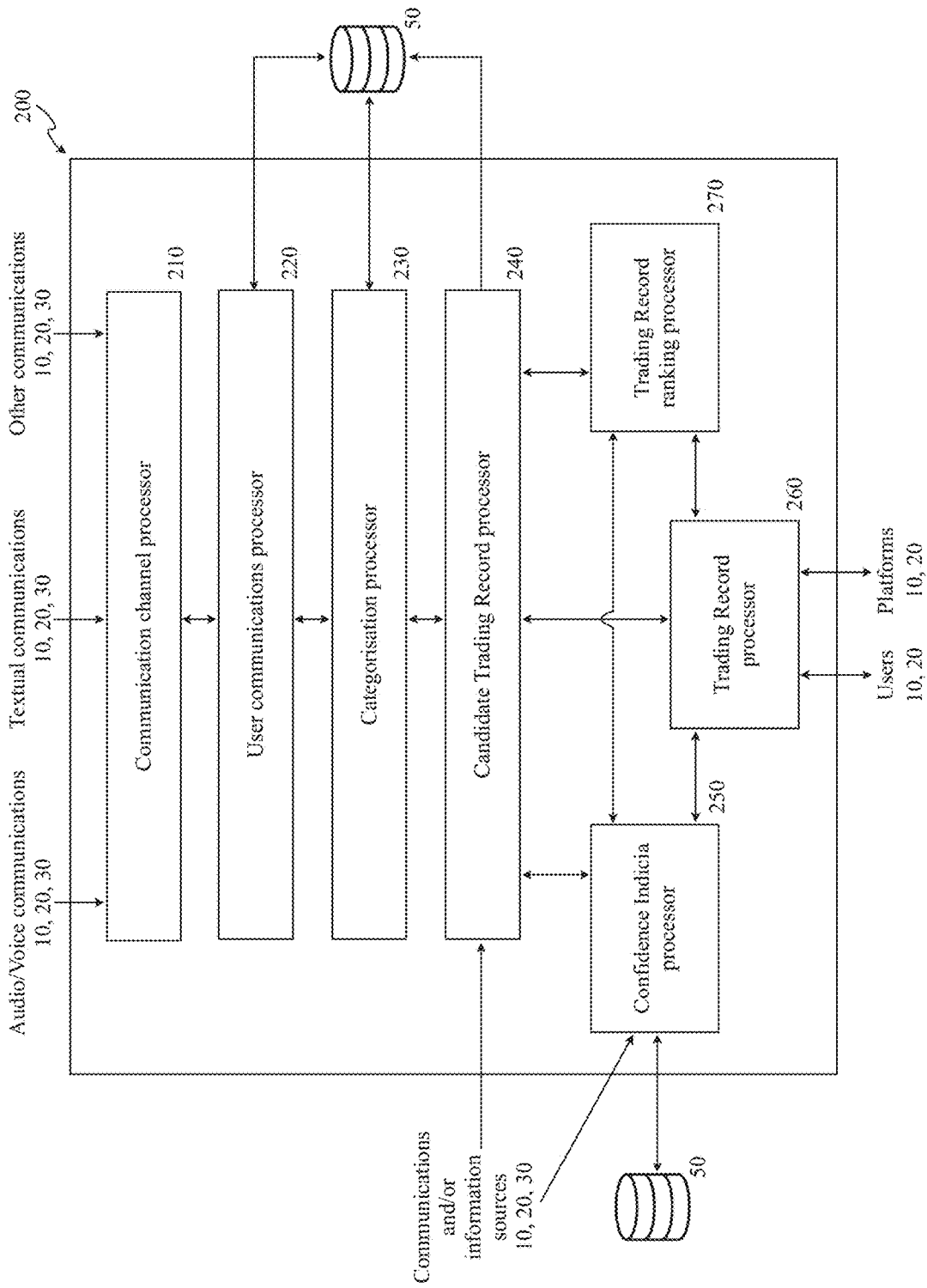
FIG. 2 is an illustration of an example embodiment of a processor for managing trading information.

To perform the processes and/or methods described above and in the present disclosure, example embodiments of the processor 200 include one or more elements. For example, as illustrated in FIG. 2, the processor 200 may include one or more communication channel processors 210. The processor 200 may also include one or more user communications processors 220. The processor 200 may also include one or more categorization processors 230. The processor 200 may also include one or more candidate trading record processors 240. The processor 200 may also include one or more confidence indicia processors 250. The processor 200 may also include one or more trading record processors 260. The processor 200 may also include one or more trading record ranking processors 270. The processor 200 may also include one or more processing platforms 150. Although the figures may illustrate one communication channel processor 210, one user communications processor 220, one categorization processor 230, one candidate trading record processor 240, one confidence indicia processor 250, one trading record processor 260, and one trading record ranking processor 270, it is to be understood that the processor 200 may include more or less than one communication channel processor 210, more or less than one user communications processor 220, more or less than one categorization processor 230, more or less than one candidate trading record processor 240, more or less than one confidence indicia processor 250, more or less than one trading record processor 260, and more or less than one trading record ranking processor 270 without departing from the teachings of the present disclosure. It is also to be understood in the present disclosure that, although the functions and/or processes performed by the processor 200 are described in the present disclosure as being performed by particular elements of the processor 200, the functions and/or processes performed by a particular element of the processor 200 may also be performed by one or more other elements and/or cooperatively performed by more than one element of the processor 200 without departing from the teachings of the present disclosure. It is also to be understood in the present disclosure that, although the functions and/or processes performed by the processor 200 are described in the present disclosure as being performed by particular elements of the processor 200, the functions and/or processes performed by two or more particular elements of the processor 200 may be combined and performed by one element of the processor 200 without departing from the teachings of the present disclosure.

These elements of the processor 200 will now be further described with reference to the accompanying figures.

The Communication Channel Processor (e.g., Communication Channel Processor 210).

As illustrated in FIG. 2, an example embodiment of the processor 200 includes one or more communication channel processors (e.g., communication channel processors 210). The communication channel processor 210 is configurable or configured to identify one or more communication channels 40, including communication channels 40 that facilitate communications by, for, and/or between users 10, 20 and/or information sources 30. The communication channel processor 210 is also configurable or configured to receive, request, obtain, pull, extract, and/or intercept (hereinafter collectively "receive", "received", "receiving", or the like) communications along one or more communication channels 40, including communication channels 40 that facilitate communications by, for, and/or between users 10, 20, information sources 30, and/or the processing platform 150. Such communication channels 40 may include, but are not limited to, voice or audio communication channels (e.g., digital or analog voice conversations (telephony), audio from video conversations or sources, multi-participant conference calls, one-to-many broadcasts, etc.), text-based communication channels (e.g., text chats from instant messaging platforms, multi-participant chat groups, one-to-many text broadcasts, etc.), or the like, where indicative prices are derived, extracted, identified, obtained, and/or otherwise received. Such communication channels 40 may also include those that enable communication and/or information exchanges, directly or indirectly, with information sources 30, processing platforms 150, databases 50, representative users 10, customer users 20, one or more processors 200, and/or one or more other communication channels 40, Such communication channels 40 may also include those that enable communications with one or more databases, distributed ledgers, or the like (e.g., database 50).

For example, the communication channel processor 210 is configurable or configured to receive audio, textual, and/or video communications by and/or for one or more representative users 10. The communication channel processor 210 may also receive information on and/or pertaining to representative users 10 including, but not limited to, name of the representative user 10, name of the company of the representative user 10 (e.g., broker name), type/category/class for the representative user 10, location of the representative user 10, the primary markets they operate in, the trading desk they belong to, their instant messaging account details (IM), their exchange memberships and clearing preferences, various pertinent phone/mobile numbers for them, their voice network providers user handle and/or connection details, their email address etc. The communication channel processor 210 is also configurable or configured to receive audio, textual, and/or video communications by and/or for one or more customer users 20. The communication channel processor 210 may also receive information pertaining to customer users 20 including, but not limited to, name of the customer user 20, name of the company of the customer user 20, type/category/class for the customer user 20, location of the customer user 20, the primary markets they operate in, the trading desk they belong to, their instant messaging account details (IM), their exchange memberships and clearing preferences, various pertinent phone/mobile numbers for them, their voice network providers user handle and/or connection details, their email address etc. The communication channel processor 210 is also configurable or configured to receive audio, textual, and/or video communications from the processing platform 150, including, but not limited to, live prices initiated, by users 10, 20, directly on the processing platform 150 that can be aggressed (i.e., actionable), by other users 10, 20, directly on the processing platform 150. The communication channel processor 210 is also configurable or configured to receive audio, textual, and/or video communications by and/or for one or more other information sources 30 including, but not limited to, exchanges 30, CLOBs 30, electronic matching engines 30, other centralized trading sources 30, other centralized trading information sources 30, or the like, where live prices and/or exchange prices are derived, extracted, identified, obtained, and/or otherwise received. The communication channel processor 210 may also receive information pertaining to information sources 30 including, but not limited to, name of the information source 30, type/category/class for the information source 30, date/time stamp (a date/time stamp, date stamp, time stamp, or the like, is/are referred to herein as a "time stamp", "timestamp", or the like) of the information from the information source 30, location of the information source 30, the vendor or network where the information source originated from (if applicable) etc. The communication channel processor 210 is also configurable or configured to communicate with one or more other processors 200, such as in situations where more than one processors 200 are performing the managing of trading information. The communication channel processor 210 is also configurable or configured to communicate with one or more databases 50 to search, retrieve, store, and/or update information. The communication channel processor 210 is also configurable or configured to communicate with one or more of the above via one or more communication channels 40. In some embodiments, the communication channel processor 210 may include and/or perform one or more of the same functions or operations as the trading record processor 260 and/or one or more other elements of the processor 200, and vice versa.

When the communication channel processor 210 identifies one or more communication channels 40 and receives communications communicated by, for, and/or between one or more users 10, 20, one or more other information sources 30, and/or one or more processing platforms 150, example embodiments of the communication channel processor 210 are configurable or configured to selectively communicate information from the received communications to one or more other elements of the processor 200. For example, the communication channel processor 210 may be configurable or configured to select potentially relevant trading-related information from voice and/or textual communications and communicate such information, directly or indirectly, to the user communication processor 220. The communication channel processor 210 may also be configurable or configured to communicate such information, directly and/or indirectly, to one or more other elements of the processor 200 including the categorization processor 230, the candidate trading record processor 240, the confidence indicia processor 250, the trading record processor 260, and/or the trading record ranking processor 270. The communication channel processor 210 may also be configurable or configured to communicate such information, directly and/or indirectly, to one or more processing platforms 150. The communication channel processor 210 may also be configurable or configured to communicate such information, directly and/or indirectly, to one or more databases 50 and/or one or more other processors 200. For communication channels 40 that are directly or indirectly connected to an information source 30, the communication channel processor 210 (and/or one or more other elements of the processor 200) is configurable or configured to search for, process, obtain, extract, and/or otherwise receive external prices and/or other trading information from such information source 30 via the communication channel 40. For example, the communication channel processor 210 is configurable or configured to obtain, among other things, latest and/or real-time trading prices, relevant trading dates (e.g., expiries such as contract expiries), trading instrument, and/or user types for particular trading instruments from the information source 30 (e.g., an exchange 30, etc.) via such communication channels 40. Such trading information (and/or one or more parts of such trading information) from information sources 30 may be provided to the categorization processor 230 (as further described in the present disclosure) for categorizing and/or for the generating of information payloads based on categories. Alternatively or in addition, such trading information (and/or one or more parts of such trading information) from information sources 30 may be provided to the candidate trading record processor 240 (as further described in the present disclosure) for generating a candidate trading record based on external prices and/or other trading information received from other information sources 30. Alternatively or in addition, such trading information (and/or one or more parts of such trading information) from information sources 30 may be provided to the confidence indicia processor 250 (as further described in the present disclosure) for generating a confidence indicia for the external prices, other trading information and/or candidate trading record generated based on trading information received from information sources 30. Alternatively or in addition, such trading information (and/or one or more parts of such trading information) from information sources 30 may be provided to the trading record ranking processor 270 (as further described in the present disclosure) for ranking the external prices, other trading information and/or candidate trading record received and/or generated based on trading information received from information sources 30. Alternatively or in addition, such trading information (and/or one or more parts of such trading information) from information sources 30 may be provided to the trading record processor 260 (as further described in the present disclosure) for displaying (e.g., as illustrated in FIG. 9) via one or more processing platforms 150, to one or more users 10, 20, the external prices, other trading information and/or candidate trading record received and/or generated based on trading information received from information sources 30. For communication channels 40 that are directly or indirectly connected to a processing platform 150, the communication channel processor 210 (and/or one or more other elements of the processor 200) is configurable or configured to search for, process, obtain, extract, and/or otherwise receive live prices and/or other trading information from the processing platform 150 via the communication channel 40. For example, the communication channel processor 210 is configurable or configured to obtain, among other things, latest and/or real-time trading prices, relevant trading dates (e.g., expiries such as contract expiries), trading instrument, and/or user types for particular trading instruments from the processing platform 150 via such communication channels 40. Such trading information (and/or one or more parts of such trading information) from processing platforms 150 may be provided to the categorization processor 230 (as further described in the present disclosure) for categorizing and/or for the generating of information payloads based on categories. Alternatively or in addition, such trading information (and/or one or more parts of such trading information) from processing platforms 150 may be provided to the candidate trading record processor 240 (as further described in the present disclosure) for generating a candidate trading record based on live prices and/or other trading information received from the processing platforms 150. Alternatively or in addition, such trading information (and/or one or more parts of such trading information) from processing platforms 150 may be provided to the confidence indicia processor 250 (as further described in the present disclosure) for generating a confidence indicia for the trading information and/or candidate trading record generated based on live prices and/or other trading information received from the processing platforms 150. Alternatively or in addition, such trading information (and/or one or more parts of such trading information) from processing platforms 150 may be provided to the trading record ranking processor 270 (as further described in the present disclosure) for ranking the live prices, other trading information and/or candidate trading record received and/or generated based on trading information received from the processing platforms 150. Alternatively or in addition, such trading information (and/or one or more parts of such trading information) from processing platforms 150 may be provided to the trading record processor 260 (as further described in the present disclosure) for displaying (e.g., as illustrated in FIG. 9) via one or more processing platforms 150, to one or more users 10, 20, the live prices, other trading information and/or candidate trading record received and/or generated based on trading information received from the processing platforms 150.

The User Communications Processor (e.g., User Communications Processor 220).

As illustrated in FIG. 2, an example embodiment of the processor 200 includes one or more user communications processors (e.g., user communications processor 220 or user communication processor 220). The user communications processor 220 is configurable or configured to analyze communications received from the communication channel processor 210, including but not limited to voice/audio, video, and/or textual communications. In analyzing such communications, the user communications processor 220 is configurable or configured to convert such communications into textual representations (e.g., for voice/audio and/or video communications), identify one or more users 10, 20 from such communications, and provide the results of such analyzing to the categorization processor 230 and/or one or more other elements of the processor 200. The user communications processor 220 includes one or more voice communication identifiers 224 for analyzing voice/audio and/or video communications. In some example embodiments, the user communications processor 220 may also include one or more voice signature processors 222 for analyzing voice/audio and/or video communications. In example embodiments where the communications received from the communication channel processor 210 is textual communication, the user communications processor 220 analyzes the textual communications (without the use of the voice signature processor 222 and voice communication identifier 224) to identify one or more users communicating such textual communications. These elements of the user communications processor 220 are further described below.

The Voice Signature Processor (e.g., Voice Signature Processor 222).

Figure 3:
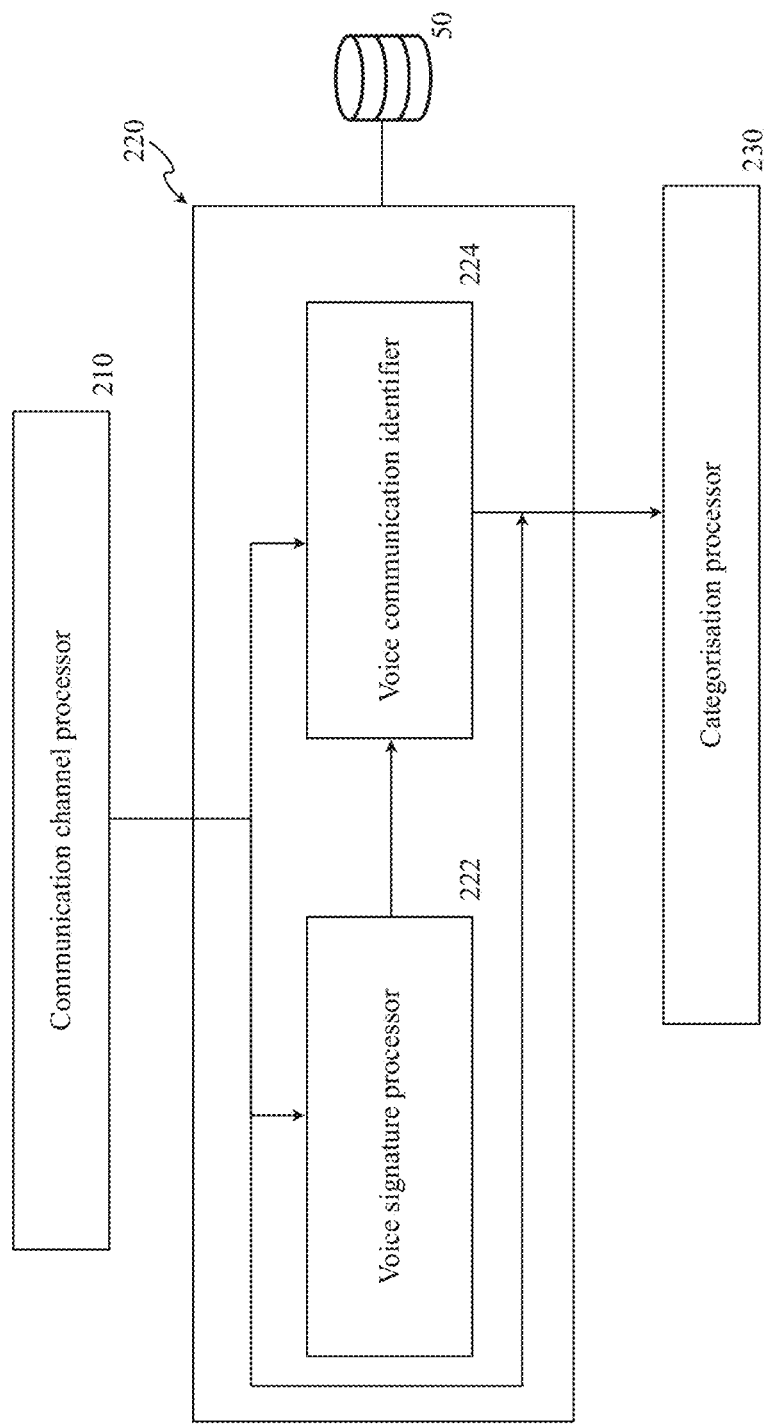
FIG. 3 is an illustration of an example embodiment of a user communications processor.

As illustrated in FIG. 3, the user communications processor 220 may include one or more voice signature processors (e.g., voice signature processor 222). The voice signature processor 222 is configurable or configured to receive one or more voice signatures for one or more users 10, 20. In an example embodiment, such voice signatures for one or more users 10, 20 are stored in and retrievable from one or more databases 50 of previously or already generated voice signatures. Alternatively or in addition, an example embodiment of the voice signature processor 222 is configurable or configured to generate one or more voice signatures for one or more users 10, 20 based on current and/or historic communications received by the communication channel processor 210.

For example, for communications between a representative user 10 (e.g., a broker 10) and a customer user 20 over one or more communication channels 40 (e.g., a 1-way or 2-way voice communication channel 40), the voice signature processor 222 is configurable or configured to receive a representative user voice signature for the representative user 10 and/or generate a representative user voice signature for the representative user 10 based on current and/or historic communications received by the communication channel processor 210. The voice signature processor 222 is also configurable or configured to receive a customer user voice signature for the customer user 20 and/or generate a customer user voice signature for the customer user 20 based on current and/or historic communications received by the communication channel processor 210.

As another example, for communications between a representative user 10 (e.g., a broker 10), a first customer user 20, and a second customer user 20 over one or more communication channels 40, the voice signature processor 222 is configurable or configured to receive a representative user voice signature for the representative user 10 and/or generate a representative user voice signature for the representative user 10 based on current and/or historic communications received by the communication channel processor 210. The voice signature processor 222 is also configurable or configured to receive a first customer user voice signature for the first customer user 20 and/or generate a first customer user voice signature for the first customer user 20 based on current and/or historic communications received by the communication channel processor 210. The voice signature processor 222 is also configurable or configured to receive a second customer user voice signature for the second customer user 20 and/or generate a second customer user voice signature for the second customer user 20 based on current and/or historic communications received by the communication channel processor 210. In examples where the communications include one or more other customer users 20, the voice signature processor 222 is also configurable or configured to receive voice signatures for such other customer users 20 and/or generate a voice signature for such other customer users 20 based on current and/or historic communications received by the communication channel processor 210.

After the voice signature processor 222 receives and/or generates the voice signature(s) based on the communications received by the communication channel processor 210, the voice signature processor 222 is configurable or configured to provide and/or make available the voice signature(s) to the voice communication identifier 224 for further processing. Alternatively or in addition, the voice signature processor 222 may be configurable or configured to cooperate with the voice communication identifier 224 to identify which particular user 10, 20 communicated particular voice communications (and/or other communications). Put differently, the voice signature processor 222 may be configurable or configured to cooperate with the voice communication identifier 224 to match, link, associate, attribute, group, and/or correlate voice communications (and/or other communications) received by the communication channel processor 210 with, to, or for particular users 10, 20.

The Voice Communication Identifier (e.g., Voice Communication Identifier 224).

As illustrated in FIG. 3, the user communications processor 220 includes one or more voice communication identifiers (e.g., voice communication identifier 224). In an example embodiment, the voice communication identifier 224 is configurable or configured to analyze communications received by the communication channel processor 210. Such analyzing includes identifying, from among communications received by the communication channel processor 210 (i.e., communications passing through one or more communication channels 40), communications made by one or more particular users 10, 20. That is, the voice communication identifier 224 is configurable or configured to match, link, associate, attribute, group, and/or correlate voice communications (and/or other communications) received by the communication channel processor 210 with, to, or for particular users 10, 20. Such identifying, matching, linking, associating, attributing, grouping, and/or correlating also includes associating a timestamp to each voice communication (e.g., each word), where such timestamp represents a date and time when the voice communication (e.g., each word) was communicated by the user 10, 20. In example embodiments where the voice signature processor 222 and/or communication channel processor 210 have not already generated a textual representation of voice/audio communications, the voice communication identifier 224 is configurable or configured to generate a textual representation of voice/audio communications.

For example, for one or more communication channels 40 in which a representative user 10 (e.g., a broker 10) communicates with a customer user 20, the voice communication identifier 224 is configurable or configured to identify, from among some or all communications passing through (which, herein also includes communicating along or via) the communication channel 40 (e.g., from among some or all voice communications), representative user voice communications (or voice communications made by the representative user 10). Such identifying may be performed using one or more representative user voice signatures for the representative user 10, including those received from and/or generated by the voice signature processor 222. Alternatively or in addition, such identifying may be derived from, among other things, static channel mapping, database mapping, names/identification/definitions of accounts, information received from third party sources and/or APIs, etc. The voice communication identifier 224 is also configurable or configured to identify, from among some or all communications passing through the communication channel 40 (e.g., from among some or all voice communications), customer user voice communications (or voice communications made by the customer user 20). Such identifying may be performed using one or more first customer user voice signatures, including those received from and/or generated by the voice signature processor 222. Alternatively or in addition, such identifying may be derived from, among other things, static channel mapping, database mapping, names/identification/definitions of accounts, information received from third party sources and/or APIs, etc.

As another example, for one or more communication channels 40 in which a representative user 10 (e.g., a broker 10) communicates with a first customer user 20 and a second customer user 20, the voice communication identifier 224 is configurable or configured to identify, from among some or all communications passing through the communication channel 40 (e.g., from among some or all voice communications), representative user voice communications (or voice communications made by the representative user 10). Such identifying may be performed using one or more representative user voice signatures for the representative user 10 received from and/or generated by the voice signature processor 222. The voice communication identifier 224 is also configurable or configured to identify, from among some or all communications passing through the communication channel 40 (e.g., from among some or all voice communications), first customer user voice communications (or voice communications made by the first customer user 20). Such identifying may be performed using one or more first customer user voice signatures received from and/or generated by the voice signature processor 222. The voice communication identifier 224 is also configurable or configured to identify, from among some or all communications passing through the communication channel 40 (e.g., from among some or all voice communications), second customer user voice communications (or voice communications made by the second customer user 20). Such identifying may be performed using one or more second customer user voice signatures received from and/or generated by the voice signature processor 222.

In yet another example, in a situation where a representative user 10 has a plurality of communication channels 40, each communication channel for communicating with a particular customer user, the user communications processor 220 is configurable or configured to identify separate representative user voice communications for the representative user 10 based on the customer users 20. As a more specific example, if a representative user 10 communicates on a first communication channel 40 with a first customer user 20 and communicates on a second communication channel 40 with a second customer user 20, the user communications processor 220 is configurable or configured to identify first customer user representative user voice communications (which are representative user voice communications with the first customer user 20 via the first communication channel 40) and second customer user representative user voice communications (which are representative user voice communications with the second customer user 20 via the second communication channel 40). It is to be understood that in situations where the representative user 10 communicates at the same time along the first and second communication channels 40 to the first and second users 20, the first customer user representative user voice communications will be the same as the second customer user representative user voice communications. However, in situations where the representative user 10 communicates a unique message to the first customer user 20 and not to the second customer user 20, then the first customer user representative user voice communications will not be the same as the second customer user representative user voice communications.

After the voice communication identifier 224 identifies communications based on the users 10, 20, the voice communication identifier 224 is configurable or configured to provide and/or make available the analyzed and identified results to the categorization processor 230.

The Categorization Processor (e.g., Categorization Processor 230).

As illustrated in FIG. 2, an example embodiment of the processor 200 includes one or more categorization processors (e.g., categorization processor 230). The categorization processor 230 is configurable or configured to analyze information received from the user communications processor 220, including communications identified or grouped based on users 10, 20. The categorization processor 230 is also configurable or configured to analyze information received from the communication channel processor 210 and/or other elements of the processor 200, including trading information searched for, processed, obtained, extracted, and/or otherwise received from one or more information sources 30 (e.g., exchanges 30, etc.) and/or one or more processing platforms 150. For example, the categorization processor 230 is configurable or configured to receive from the communication channel processor 210, among other things, non-indicative prices, including latest and/or real-time trading prices, relevant trading dates (e.g., expiries such as contract expiries), trading instrument, and/or user types for particular trading instruments from the information source 30 (e.g., an exchange 30, etc.) and/or the processing platform 150. In analyzing such communications, the categorization processor 230 is configurable or configured to categorize the identified communications into categories (e.g., trading information-related categories) and provide the results of such categorizing to the candidate trading record processor 240 and/or one or more other elements of the processor 200.

In an example embodiment, the categorization processor 230 includes one or more categorizers 231. The categorization processor 230 also includes one or more category payload generators. For example, the categorization processor 230 may include one or more trading action payload generators 232. The categorization processor 230 may also include one or more trading price payload generators 234. The categorization processor 230 may also include one or more trading quantity payload generators 236. The categorization processor 230 may also include one or more other information payload generators 238. These elements of the categorization processor 230 are further described below.

The Categorizer (e.g., Categorizer 231).

Figure 4:
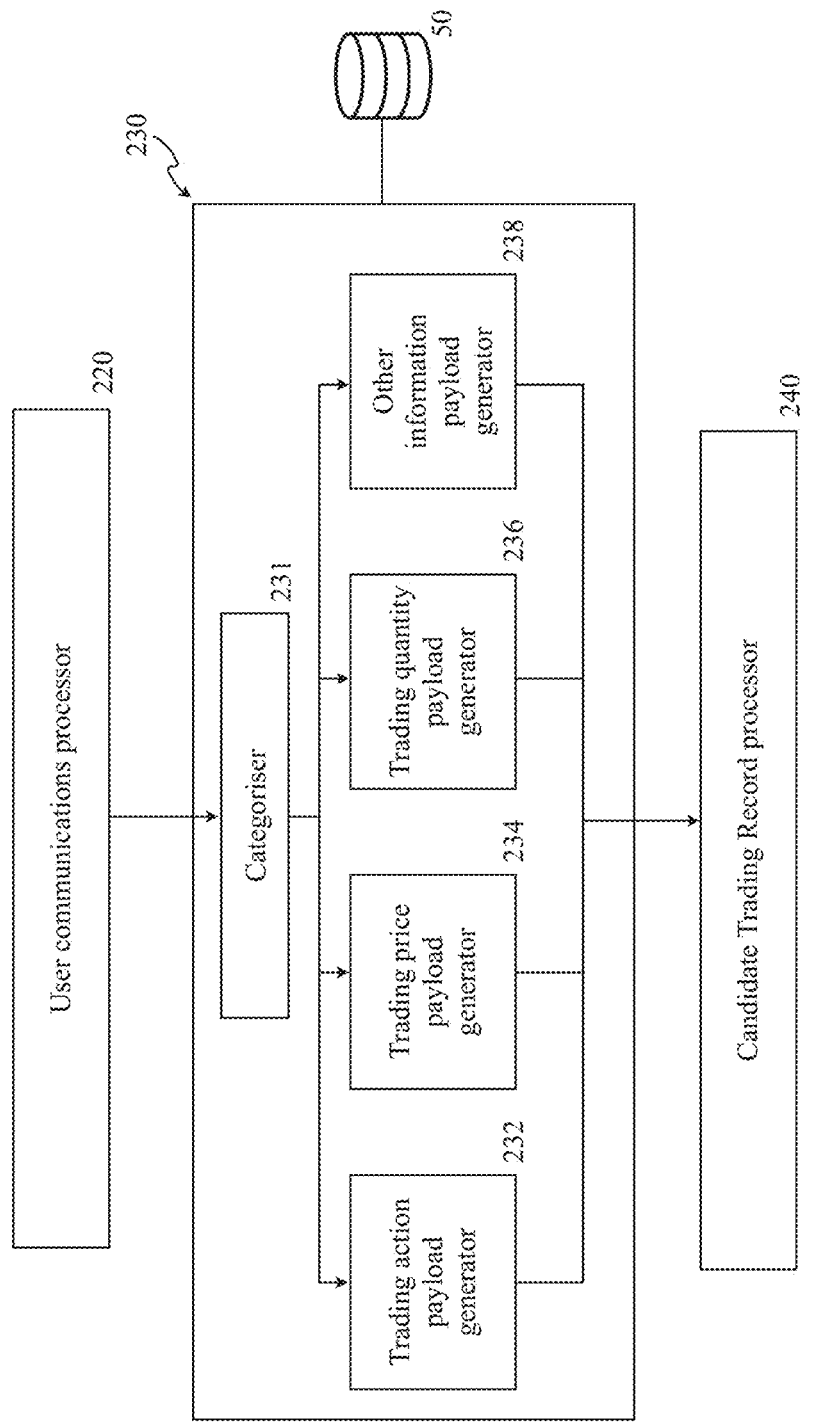
FIG. 4 is an illustration of an example embodiment of a categorization processor.

As illustrated in FIG. 4, the categorization processor 230 includes one or more categorizers (e.g., categorizers 231). The categorizer 231 is configurable or configured to receive communications that the user communications processor 220 has identified for one or more users 10, 20. For example, the categorizer 231 may receive, from the user communications processor 220, first representative user voice communications for a first representative user 10 (i.e., voice communications from a first representative user 10), second representative user voice communications for a second representative user 10 (i.e., voice communications from a second representative user 10), other representative user voice communications from one or more other representative users 10 (i.e., voice communications from one or more other representative users 10), first customer user voice communications for a first customer user 20 (i.e., voice communications from a first customer user 20), second customer user voice communications for a second customer user 20 (i.e., voice communications from a second customer user 20), and/or other customer user voice communications for one or more other customer users 20 (i.e., voice communications from other customer users 20). In example embodiments where the voice signature processor 222, communication channel processor 210, and/or voice communication identifier 224 have not already generated a textual representation of voice/audio communications, the categorizer 231 is configurable or configured to generate a textual representation of voice/audio communications.

After receiving identified communications from the user communications processor 220, the categorizer 231 is configurable or configured to perform, for each identified user 10, 20, a categorizing of one or more words from the identified communications (e.g., a grouping of one or more words, along with associated timestamps, from the identified communications that fall within specific categories). In example embodiments, such categorizing is performed using categories pertaining to trading information. Examples of potentially relevant trading information categories include, but are not limited to, user, user type (e.g. broker, trader, etc.), originating broking or trading company, action types (e.g., interests to buy at a price level, interests to sell at a price level, interests to aggress (deal) bids or offers, etc.), trading quantities, trading prices or value, trading instrument, relevant trading dates (e.g., expiries such as contract expiries, fill dates, etc.), further unique characteristics of offers and bids for physical commodities (e.g., refined and crude oil cargo properties and delivery dates), market information about trades and deals concluded elsewhere, current pricing of related instruments at various given expiries, removal of previously available bids/offers or interests to trade, etc.

In addition to trading information categories, the categorizer 231 categorizes the identified communications based on, among other things, one or more of the following: the user 10, 20 who made the communications, the user(s) 10, 20 who is/are receiving the communications, and/or a corresponding timestamp representing a date and time (or just a time) when such identified communications was made/communicated by the user 10, 20. In example embodiments, the categorizing may also be based on historic considerations, information pertaining to one or more of the users 10, 20, and/or other information sources 30. For example, in a situation where the categorizer 231 performs the categorizing but is unable to identify/categorize potentially missing information (e.g., words and/or numeric quantities) that should have been received and/or categorized along with certain other categorized communications, the categorizer 231 may be configurable or configured to search one or more databases 50 (e.g., database 50 storing historic and/or current communications, database 50 storing historic and/or current candidate trading records, database 50 storing historic and/or current selected trading records, database 50 storing historic and/or current confidence indicias, database 50 storing historic and/or current trading record ranking results, etc.) and/or search/request for historic and/or current information from one or more information sources 30 in order to supplement such missing information.

The categorizer 231 may also be configurable or configured to receive communications from the communication channel processor 210 and/or other elements of the processor 200, including non-indicative prices and/or other trading information searched for, processed, obtained, extracted, and/or otherwise received from one or more information sources 30 (e.g., exchanges 30, etc.) and/or one or more processing platforms 150. For example, the categorization processor 230 is configurable or configured to receive from the communication channel processor 210, among other things, non-indicative prices, including latest and/or real-time trading prices, relevant trading dates (e.g., expiries such as contract expiries), trading instrument, and/or user types for particular trading instruments from the information source 30 (e.g., an exchange 30, etc.) and/or the processing platform 150.

After receiving, from the communication channel processor 210, non-indicative prices and/or other trading information originating from one or more information sources 30 and/or one or more processing platforms 150, the categorizer 231 is configurable or configured to perform a categorizing of one or more pieces of information from the non-indicative prices and/or other trading information (e.g., a grouping of one or more words, along with associated timestamps, from the trading information that fall within specific categories). In example embodiments, such categorizing is performed using similar or the same categories described above (i.e., categories for information received from the user communication processor 220). Examples of potentially relevant trading information categories include, but are not limited to, name of information source 30, information source type (e.g. exchange. processing platform 150, etc.), price type (e.g., indicative prices, external price, live price, etc.), trading action types (e.g., interests to buy at a price level, interests to sell at a price level, interests to aggress (deal) bids or offers, etc.), trading quantities, trading prices or value, trading instrument, relevant trading dates (e.g., expiries such as contract expiries, fill dates, etc.), further unique characteristics of offers and bids for physical commodities (e.g., refined and crude oil cargo properties and delivery dates), market information about trades and deals concluded elsewhere, current pricing of related instruments at various given expiries, removal of previously available bids/offers or interests to trade, etc.

Example 1a—Supplementing Information Missing in Communications

As a non-limiting example, Broker A 10 has a history of providing trading information and services to a first customer user 20. The processor 200 receives and processes a voice communication from Broker A 10 that includes a buy (trading action) 100 (trading quantity of 10,000 metric tonnes) at 520 per tonne (trading price of USD 520). However, the processor 200 did not receive any communications pertaining to what is being bought (trading instrument). In such a situation, the categorizer 231 may identify that, based on a search of historic databases 50, the first customer user 20 has previously been interested in, has been configured as default or has traded, and/or received trading information for e.g. Naphtha NWE, which is currently trading around such trading prices, and accordingly supplements/adds/inserts "Naphtha NWE" into the missing trading instrument category (which may also include supplementing relevant trading dates (e.g., expiries such as contract expiries) into the missing relevant trading date category). In an example embodiment, the categorizer 231 may also associate or link the supplemented information (the Naphtha NWE) to the other categorized information (the categorized trading action of "buy", categorized trading quantity of "10,000", and categorized trading price of "520") to assist the candidate trading record processor 240 in generating a corresponding candidate trading record. Such associating may include, but is not limited to, inserting/adding/associating a timestamp to the supplemented information (the Naphtha NWE) (a timestamp that is similar/corresponding to the timestamp of the categorized trading quantity and categorized trading price); linking or associating the supplemented information (the Naphtha NWE) to the other categorized information; etc. It is to be understood in the present disclosure that the categorizer 231 is also configurable or configured to associate and/or link non-supplemented information, including associating and/or linking one or more categorized information to one or more other categorized information (e.g., associate or link "buy" (which is categorized as a trading action), "100" (which is categorized as a trading quantity), and "520" which is categorized as a trading price) together). Such linking and/or associating may also include linking and/or associating timestamps of categorized information. End of Example 1a.

Example 1b—Supplementing Information Missing in Communications

As another non-limiting example, Broker B 10 and a plurality of customer users 20, including first customer user 20 and second customer user 20, are communicating on a communication channel 40. Broker B 10 says "the bid on Naphtha NWE June is 525", followed by a few other phrases/sentences. Then 15 minutes later, Broker B 10 says "the offer for Naphtha east/west is 88", followed by "the gasoline EuroBOB August bid is 525". A few minutes later, the first customer user 20 says "sell at 525" and a few minutes after that, the second customer user 20 says "buy at 88". The processor 200 receives and processes these voice communications. However, the processor 200 did not receive any communications pertaining to what is being bought (trading instrument and expiry). In such a situation, the categorizer 231 may identify that, based on a search of historic databases 50, the first customer user 20 has previously been interested in, traded, and/or received trading information for Naphtha NWE, and accordingly supplements/adds/inserts "Naphtha NWE" into the missing trading instrument category for the categorized communications between the Broker B 10 and the first customer user 20. The categorizer 231 may further identify that, based on communications made by the Broker B 10, EuroBOB is the only trading instrument with a price close to what the second customer user has communicated (i.e., "buy at 88"), and accordingly supplements/adds/inserts "EuroBOB" into the missing trading instrument category for the categorized communications between the Broker B 10 and the second customer user 20. End of Example 1b.

It is to be understood that identified communications categorized by the categorizer 231 include, but are not limited to, voice/audio communications and/or other forms of communications. For example, in situations where a representative user 10 is communicating with a first customer user 20 via both an audio/voice communication channel 40 (e.g., a telephone call, a one-way broadcast audio signal, a two-way audio channel, a one-to-many audio channel, a many-to-one audio channel, etc.) and a text messaging channel 40 (e.g., an instant messenger application, etc.), the categorizer 231 may collectively categorize communications from both communication channels 40 as if communications from both communication channels 40 were being communicated or taking place on one communication channel 40.

After the categorizer 231 performs the categorizing of identified communications, the categorization processor 230 is configurable or configured to generate one or more information payloads. The categorization processor 230 generates the information payloads using one or more payload generators 232, 234, 236, 238, as illustrated in FIG. 4 and further described below and in the present disclosure.

The Trading Action Payload Generator (e.g., Trading Action Payload Generator 232).

In an example embodiment, the categorization processor 230 includes one or more trading action payload generators (e.g., trading action payload generator 232). The trading action payload generator 232 is configurable or configured to generate one or more information payloads, each information payload having communications by one or more users 10, 20 pertaining to trading actions. More specifically, the information payloads generated by the trading action payload generator 232 include textual representations of communicated words (e.g., words identified by the user communications processor 220 as being communicated by a user 10, 20) that have been categorized (e.g., by the categorizer 231) as being in the category of or pertaining to "trading actions" (or "trading action", "trade actions", "trade action", "trade-related actions", "trade-relation action", or the like; referred to herein as "trading actions", or the like). The information payloads generated by the trading action payload generator 232 may also include corresponding timestamps for the textual representations of communicated words. Each timestamp may represent a date and time (or just a time) when the user 10, 20 communicated such word(s) (and/or a date and time (or just a time) when the communication channel processor 210 received the communicated word(s) for the user 10, 20). The information payloads generated by the trading action payload generator 232 may also include associations and/or links to other categorized and/or supplemented information in other information payloads (e.g., pursuant to the timestamps, associations, and/or links generated by the categorizer 231 and/or any other element of the processor 200). Trading actions may include, but are not limited to, buying, selling, bidding, asking, initiating an interest to buy or sell, responding to existing bids or offers, reporting of trades concluded elsewhere, removal/cancellation of existing bids/offers and updating/changing of existing open bids/offers, etc.

Example 2a—Generating Payloads Pertaining to Trading Actions

As a non-limiting example, a communication channel 40 may be configured to facilitate voice communications between a representative user 10, a first customer user 20, a second customer user 20, and one or more other users 10, 20. Such voice communications may include voice communications by the representative user 10 to the first customer user 20 (e.g., first customer user first representative user voice communications (for trading actions), first customer user second representative user voice communications (for trading prices), first customer user third representative user voice communications (for trading quantities), and first customer user fourth representative user voice communications (for one or more other information), as further described below). Such voice communications may also include voice communications by the representative user 10 to the second customer user 20 (e.g., second customer user first representative user voice communications (for trading actions), second customer user second representative user voice communications (for trading prices), second customer user third representative user voice communications (for trading quantities), and second customer user fourth representative user voice communications (for one or more other information), as further described below). Such voice communications may also include voice communications by the first customer user 20 to the representative user 10 (e.g., representative user first customer user voice communications (for trading actions), representative user second first customer user voice communications (for trading prices), representative user third first customer user voice communications (for trading quantities), and representative user fourth first customer user voice communications (for one or more other information), as further described below). Such voice communications may also include voice communications by the second customer user 20 to the representative user 10 (e.g., representative user first second customer user voice communications (for trading actions), representative user second second customer user voice communications (for trading prices), representative user third second customer user voice communications (for trading quantities), and representative user fourth second customer user voice communications (for one or more other information), as further described below).

In this example, the trading action payload generator 232 is configurable or configured to generate user payloads for communications by the representative user 10 to the first customer user 20. More specifically, the trading action payload generator 232 is configurable or configured to generate a first customer user first representative user payload. The first customer user first representative user payload includes textual representations of words from first customer user first representative user voice communications pertaining to trading actions (i.e., voice communications identified as being communicated by the representative user 10 to the first customer user 20, and that have been categorized as or pertain to trading actions), along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading action payload generator 232 is also configurable or configured to generate user payloads for communications by the representative user 10 to the second customer user 20. More specifically, the trading action payload generator 232 is configurable or configured to generate a second customer user first representative user payload. The second customer user first representative user payload includes textual representations of words from second customer user first representative user voice communications pertaining to trading actions (i.e., voice communications identified as being communicated by the representative user 10 to the second customer user 20, and that have been categorized as or pertain to trading actions), along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading action payload generator 232 is also configurable or configured to generate user payloads for communications by the first customer user 20 to the representative user 10. More specifically, the trading action payload generator 232 is configurable or configured to generate a representative user first first customer user payload. The representative user first first customer user payload includes textual representations of words from representative user first first customer user voice communications pertaining to trading actions (i.e., voice communications identified as being communicated by the first customer user 20 to the representative user 10, and that have been categorized as or pertain to trading actions), along with corresponding timestamps and/or associations and/or links to other categorized and/or supplemented information in other information payloads (e.g., pursuant to the timestamps, associations, and/or links generated by the categorizer 231 and/or any other element of the processor 200). Furthermore, in this same example, the trading action payload generator 232 is configurable or configured to generate user payloads for communications by the second customer user 20 to the representative user 10. More specifically, the trading action payload generator 232 is configurable or configured to generate a representative user first second customer user payload. The representative user first second customer user payload includes textual representations of words from representative user first second customer user voice communications pertaining to trading actions (i.e., voice communications identified as being communicated by the second customer user 20 to the representative user 10, and that have been categorized as or pertain to trading actions), along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2a.

Example 2b—Generating Payloads Pertaining to Trading Actions

As a non-limiting example, a communication channel 40 may be configured to facilitate receiving of non-indicative prices and/or other trading information from information sources 30 (e.g., exchanges 30, CLOBs 30, etc.) and/or processing platforms 150. Such trading information may include, for example, those from a first exchange 30, a second exchange 30, a first processing platform 150, and a first price reporting agency 30.

In this example, the trading action payload generator 232 is configurable or configured to generate information source payloads for external prices and/or other trading information received from the first exchange 30. More specifically, the trading action payload generator 232 is configurable or configured to generate a first first exchange payload for external prices and/or other trading information received from the first exchange 30 pertaining to trading actions, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading action payload generator 232 is also configurable or configured to generate information source payloads for external prices and/or other trading information received from the second exchange 30. More specifically, the trading action payload generator 232 is configurable or configured to generate a first second exchange payload for external prices and/or other trading information received from the second exchange 30 pertaining to trading actions, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading action payload generator 232 is also configurable or configured to generate information source payloads for trading information received from the first live e-order 30. More specifically, the trading action payload generator 232 is configurable or configured to generate a first first live e-order payload for live prices and/or other trading information received from the first processing platform 150 pertaining to trading actions, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading action payload generator 232 is also configurable or configured to generate information source payloads for external prices and/or other trading information received from the first price reporting agency 30. More specifically, the trading action payload generator 232 is configurable or configured to generate a first first price reporting agency payload for external prices and/or other trading information received from the first price reporting agency 30 pertaining to trading actions, along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2b.

The Trading Price Payload Generator (e.g., Trading Price Payload Generator 234).

As illustrated in FIG. 4, the categorization processor 230 also includes one or more trading price payload generators (e.g., trading price payload generator 234). The trading price payload generator 234 is configurable or configured to generate one or more information payloads, each information payload having communications by one or more users 10, 20 pertaining to trading prices. More specifically, the information payloads generated by the trading price payload generator 234 include textual representations of communicated words (e.g., words identified by the user communications processor 220 as having been communicated by a user 10, 20) that have been categorized (e.g., by the categorizer 231) as being in the category of or pertaining to "trading prices" (or "trading price", "trade prices", "trade price", "trade-related prices", "trade-relation price", or the like; referred to herein as "trading prices", or the like). The information payloads generated by the trading price payload generator 234 may also include corresponding timestamps for the textual representations of communicated words. Each timestamp may represent a date and time (or just a time) when the user 10, 20 communicated such word(s) (and/or a date and time (or just a time) when the communication channel processor 210 received the communicated word(s) for the user 10, 20). The information payloads generated by the trading price payload generator 234 may also include associations and/or links to other categorized and/or supplemented information in other information payloads (e.g., pursuant to the timestamps, associations, and/or links generated by the categorizer 231 and/or any other element of the processor 200). Trading prices may include, but are not limited to, buy price, sell price, bid price, ask price, price of a deal/trade, last traded price per contract, related price, implied price, spread price, etc.

Example 2c—Generating Payloads Pertaining to Trading Prices

Continuing from Example 2a above, the trading price payload generator 234 is configurable or configured to generate user payloads for communications by the representative user 10 to the first customer user 20. More specifically, the trading price payload generator 234 is configurable or configured to generate a first customer user second representative user payload. The first customer user second representative user payload includes textual representations of words from first customer user second representative user voice communications pertaining to trading prices (i.e., voice communications identified as being communicated by the representative user 10 to the first customer user 20, and that have been categorized as or pertain to trading prices), along with corresponding timestamps and/or associations and/or links to other categorized and/or supplemented information in other information payloads (e.g., pursuant to the timestamps, associations, and/or links generated by the categorizer 231 and/or any other element of the processor 200). In this example, the trading price payload generator 234 is also configurable or configured to generate user payloads for communications by the representative user 10 to the second customer user 20. More specifically, the trading price payload generator 234 is configurable or configured to generate a second customer user second representative user payload. The second customer user second representative user payload includes textual representations of words from second customer user second representative user voice communications pertaining to trading prices (i.e., voice communications identified as being communicated by the representative user 10 to the second customer user 20, and that have been categorized as or pertain to trading prices), along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading price payload generator 234 is also configurable or configured to generate user payloads for communications by the first customer user 20 to the representative user 10. More specifically, the trading price payload generator 234 is configurable or configured to generate a representative user second first customer user payload. The representative user second first customer user payload includes textual representations of words from representative user second first customer user voice communications pertaining to trading prices (i.e., voice communications identified as being communicated by the first customer user 20 to the representative user 10, and that have been categorized as or pertain to trading prices), along with corresponding timestamps and/or associations and/or links to other categorized and/or supplemented information in other information payloads (e.g., pursuant to the timestamps, associations, and/or links generated by the categorizer 231 and/or any other element of the processor 200). Furthermore, in this same example, the trading price payload generator 234 is configurable or configured to generate user payloads for communications by the second customer user 20 to the representative user 10. More specifically, the trading price payload generator 234 is configurable or configured to generate a representative user second second customer user payload. The representative user second second customer user payload includes textual representations of words from representative user second second customer user voice communications pertaining to trading prices (i.e., voice communications identified as being communicated by the second customer user 20 to the representative user 10, and that have been categorized as or pertain to trading prices), along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2c.

Example 2d—Generating Payloads Pertaining to Trading Prices

Continuing from Example 2b above, the trading price payload generator 234 is configurable or configured to generate information source payloads for external prices and/or other trading information received from the first exchange 30. More specifically, the trading price payload generator 234 is configurable or configured to generate a second first exchange payload for external prices and/or other trading information received from the first exchange 30 pertaining to trading prices, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading price payload generator 234 is also configurable or configured to generate information source payloads for external prices and/or other trading information received from the second exchange 30. More specifically, the trading price payload generator 234 is configurable or configured to generate a second second exchange payload for external prices and/or other trading information received from the second exchange 30 pertaining to trading prices, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading price payload generator 234 is also configurable or configured to generate information source payloads for live prices and/or other trading information received from the first processing platform 150. More specifically, the trading price payload generator 234 is configurable or configured to generate a second first live e-order payload for live prices and/or other trading information received from the first processing platform 150 pertaining to trading prices, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading price payload generator 234 is also configurable or configured to generate information source payloads for external prices and/or other trading information received from the first price reporting agency 30. More specifically, the trading price payload generator 234 is configurable or configured to generate a second first price reporting agency payload for external prices and/or other trading information received from the first price reporting agency 30 pertaining to trading prices, along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2d.

The Trading Quantity Payload Generator (e.g., Trading Quantity Payload Generator 236).

In an example embodiment, the categorization processor 230 may also include one or more trading quantity payload generators (e.g., trading quantity payload generator 236). The trading quantity payload generator 236 is configurable or configured to generate one or more information payloads, each information payload having communications by one or more users 10, 20 pertaining to trading quantities. More specifically, the information payloads generated by the trading quantity payload generator 236 include textual representations of communicated words (e.g., words identified by the user communications processor 220 as being communicated by a user 10, 20) that have been categorized (e.g., by the categorizer 231) as being in the category of or pertaining to "trading quantities" (or "trading quantity", "trade quantities", "trade quantity", "trade-related quantities", "trade-relation quantity", or the like; referred to herein as "trading quantities", or the like). The information payloads generated by the trading quantity payload generator 236 may also include corresponding timestamps for the textual representations of communicated words. Each timestamp may represent a date and time (or just a time) when the user 10, 20 communicated such word(s) (and/or a date and time (or just a time) when the communication channel processor 210 received the communicated word(s) for the user 10, 20). The information payloads generated by the trading quantity payload generator 236 may also include associations and/or links to other categorized and/or supplemented information in other information payloads (e.g., pursuant to the timestamps, associations, and/or links generated by the categorizer 231 and/or any other element of the processor 200). Trading quantities may include, but are not limited to, quantities of any tradeable form of value, which may be expressed as whole numbers, fractions, and/or decimals.

Example 2e—Generating Payloads Pertaining to Trading Quantities

Continuing from Examples 2a and 2c above, the trading quantity payload generator 236 is configurable or configured to generate user payloads for communications by the representative user 10 to the first customer user 20. More specifically, the trading quantity payload generator 236 is configurable or configured to generate a first customer user third representative user payload. The first customer user third representative user payload includes textual representations of words from first customer user third representative user voice communications pertaining to trading quantities (i.e., voice communications identified as being communicated by the representative user 10 to the first customer user 20, and that have been categorized as or pertain to trading quantities), along with corresponding timestamps and/or associations and/or links to other categorized and/or supplemented information in other information payloads (e.g., pursuant to the timestamps, associations, and/or links generated by the categorizer 231 and/or any other element of the processor 200). In this example, the trading quantity payload generator 236 is also configurable or configured to generate user payloads for communications by the representative user 10 to the second customer user 20. More specifically, the trading quantity payload generator 236 is configurable or configured to generate a second customer user third representative user payload. The second customer user third representative user payload includes textual representations of words from second customer user third representative user voice communications pertaining to trading quantities (i.e., voice communications identified as being communicated by the representative user 10 to the second customer user 20, and that have been categorized as or pertain to trading quantities), along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading quantity payload generator 236 is also configurable or configured to generate user payloads for communications by the first customer user 20 to the representative user 10. More specifically, the trading quantity payload generator 236 is configurable or configured to generate a representative user third first customer user payload. The representative user third first customer user payload includes textual representations of words from representative user third first customer user voice communications pertaining to trading quantities (i.e., voice communications identified as being communicated by the first customer user 20 to the representative user 10, and that have been categorized as or pertain to trading quantities), along with corresponding timestamps and/or associations and/or links to other categorized and/or supplemented information in other information payloads (e.g., pursuant to the timestamps, associations, and/or links generated by the categorizer 231 and/or any other element of the processor 200). Furthermore, in this same example, the trading quantity payload generator 236 is configurable or configured to generate user payloads for communications by the second customer user 20 to the representative user 10. More specifically, the trading quantity payload generator 236 is configurable or configured to generate a representative user third second customer user payload. The representative user third second customer user payload includes textual representations of words from representative user third second customer user voice communications pertaining to trading quantities (i.e., voice communications identified as being communicated by the second customer user 20 to the representative user 10, and that have been categorized as or pertain to trading quantities), along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2e.

Example 2f—Generating Payloads Pertaining to Trading Quantities

Continuing from Examples 2b and 2d above, the trading quantity payload generator 236 is configurable or configured to generate information source payloads for external prices and/or other trading information received from the first exchange 30. More specifically, the trading quantity payload generator 236 is configurable or configured to generate a third first exchange payload for external prices and/or other trading information received from the first exchange 30 pertaining to trading quantities, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading quantity payload generator 236 is also configurable or configured to generate information source payloads for external prices and/or other trading information received from the second exchange 30. More specifically, the trading quantity payload generator 236 is configurable or configured to generate a third second exchange payload for external prices and/or other trading information received from the second exchange 30 pertaining to trading quantities, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading quantity payload generator 236 is also configurable or configured to generate information source payloads for live prices and/or other trading information received from the first processing platform 150. More specifically, the trading quantity payload generator 236 is configurable or configured to generate a third first live e-order payload for live prices and/or other trading information received from the first processing platform 150 pertaining to trading quantities, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the trading quantity payload generator 236 is also configurable or configured to generate information source payloads for external prices and/or other trading information received from the first price reporting agency 30. More specifically, the trading quantity payload generator 236 is configurable or configured to generate a third first price reporting agency payload for external prices and/or other trading information received from the first price reporting agency 30 pertaining to trading quantities, along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2f The Other Information Payload Generators (e.g., Other Information Payload Generators 238).

In an example embodiment, the categorization processor 230 may also include one or more other information payload generators (e.g., other information payload generator 238). The other information payload generator 238 is configurable or configured to generate one or more information payloads, each information payload having communications by one or more users 10, 20 pertaining to other information (e.g., trading instruments, relevant trading dates (e.g., expiries such as contract expiries), user types, status of prices (e.g., degree of firmness), source of prices (e.g. the identity of a customer user who initiated them)). More specifically, the information payloads generated by the other information payload generator 238 include textual representations of communicated words (e.g., words identified by the user communications processor 220 as being communicated by a user 10, 20) that have been categorized (e.g., by the categorizer 231) as being in other categories including, but not limited to, "trading instruments", "relevant trading dates", "user types", "status of prices", "source of prices", etc.

(referred to herein as "other information", or the like). The information payloads generated by the other information payload generator 238 may also include corresponding timestamps for the textual representations of communicated words. Each timestamp may represent a date and time (or just a time) when the user 10, 20 communicated such word(s) (and/or a date and time (or just a time) when the communication channel processor 210 received the communicated word(s) for the user 10, 20). The information payloads generated by the other information payload generator 238 may also include associations and/or links to other categorized and/or supplemented information in other information payloads (e.g., pursuant to the timestamps, associations, and/or links generated by the categorizer 231 and/or any other element of the processor 200). Other information may include, but are not limited to, trading instruments, relevant trading dates (e.g., expiries such as contract expiries), user types, status of prices (e.g., degree of firmness), source of prices (e.g. the identity of a customer user who initiated them), etc.

Example 2g—Generating Payloads Pertaining to Other Information

Continuing from Example 2a above, the other information payload generator 238 is configurable or configured to generate user payloads for communications by the representative user 10 to the first customer user 20. More specifically, the other information payload generator 238 is configurable or configured to generate a first customer user fourth representative user payload. The first customer user fourth representative user payload includes textual representations of words from first customer user fourth representative user voice communications pertaining to other information (i.e., voice communications identified as being communicated by the representative user 10 to the first customer user 20, and that have been categorized as or pertain to other information), along with corresponding timestamps and/or associations and/or links to other categorized and/or supplemented information in other information payloads (e.g., pursuant to the timestamps, associations, and/or links generated by the categorizer 231 and/or any other element of the processor 200). In this example, the other information payload generator 238 is also configurable or configured to generate user payloads for communications by the representative user 10 to the second customer user 20. More specifically, the other information payload generator 238 is configurable or configured to generate a second customer user fourth representative user payload. The second customer user fourth representative user payload includes textual representations of words from second customer user fourth representative user voice communications pertaining to other information (i.e., voice communications identified as being communicated by the representative user 10 to the second customer user 20, and that have been categorized as or pertain to other information), along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the other information payload generator 238 is also configurable or configured to generate user payloads for communications by the first customer user 20 to the representative user 10. More specifically, the other information payload generator 238 is configurable or configured to generate a representative user fourth first customer user payload. The representative user fourth first customer user payload includes textual representations of words from representative user fourth first customer user voice communications pertaining to other information (i.e., voice communications identified as being communicated by the first customer user 20 to the representative user 10, and that have been categorized as or pertain to other information), along with corresponding timestamps and/or associations and/or links to other categorized and/or supplemented information in other information payloads (e.g., pursuant to the timestamps, associations, and/or links generated by the categorizer 231 and/or any other element of the processor 200). Furthermore, in this same example, the other information payload generator 238 is configurable or configured to generate user payloads for communications by the second customer user 20 to the representative user 10. More specifically, the other information payload generator 238 is configurable or configured to generate a representative user fourth second customer user payload. The representative user fourth second customer user payload includes textual representations of words from representative user fourth second customer user voice communications pertaining to other information (i.e., voice communications identified as being communicated by the second customer user 20 to the representative user 10, and that have been categorized as or pertain to other information), along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2g.

Example 2h—Generating Payloads Pertaining to Other Information

Continuing from Examples 2b, 2d, and 2f above, the other information payload generator 238 is configurable or configured to generate information source payloads for external prices and/or other trading information received from the first exchange 30. More specifically, the other information payload generator 238 is configurable or configured to generate a fourth first exchange payload for external prices and/or other trading information received from the first exchange 30 pertaining to other information (e.g., trading instruments, relevant trading dates, user types, status of prices, source of prices, etc., as described above and in the present disclosure), along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the other information payload generator 238 is also configurable or configured to generate information source payloads for external prices and/or other trading information received from the second exchange 30. More specifically, the other information payload generator 238 is configurable or configured to generate a fourth second exchange payload for external prices and/or other trading information received from the second exchange 30 pertaining to other information, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the other information payload generator 238 is also configurable or configured to generate information source payloads for live prices and/or other trading information received from the first processing platform 150. More specifically, the other information payload generator 238 is configurable or configured to generate a fourth first live e-order payload for live prices and/or other trading information received from the first processing platform 150 pertaining to other information, along with corresponding timestamps and/or associations and/or links to other categorized and/or supplemented information in other information payloads (e.g., pursuant to the timestamps, associations, and/or links generated by the categorizer 231 and/or any other element of the processor 200). In this same example, the other information payload generator 238 is also configurable or configured to generate information source payloads for external prices and/or other trading information received from the first price reporting agency 30. More specifically, the other information payload generator 238 is configurable or configured to generate a fourth first price reporting agency payload for external prices and/or other trading information received from the first price reporting agency 30 pertaining to other information, along with corresponding timestamps and/or associations and/or links to other categorized and/or supplemented information in other information payloads (e.g., pursuant to the timestamps, associations, and/or links generated by the categorizer 231 and/or any other element of the processor 200). End of Example 2h.

The Candidate Trading Record Processor (e.g., Candidate Trading Record Processor 240).

As illustrated in FIG. 2, an example embodiment of the processor 200 includes one or more candidate trading record processors (e.g., candidate trading record processor 240). The candidate trading record processor 240 is configurable or configured to analyze categorized information (e.g., as categorized by the categorizer 231) and information payloads (e.g., as generated by the trading action payload generator 232, the trading price payload generator 234, the trading quantity payload generator 236, and/or the other information payload generator 238). The candidate trading record processor 240 is also configurable or configured to receive information from the communication channel processor 210 and/or user communication processor 220. In analyzing such categorized information and information payloads, the candidate trading record processor 240 is configurable or configured to generate one or more candidate trading records. The candidate trading record processor 240 then provides such candidate trading records to the confidence indicia processor 250 and/or one or more other elements of the processor 200 (e.g., the trading record ranking processor 270 and/or the trading record processor 260).

In an example embodiment, the candidate trading record processor 240 generates each candidate trading record by selecting one or more categorized information from one or more information payloads. The selection of one or more of the categorized information may be based on one or more considerations including, but not limited to, the corresponding timestamp for each categorized information; the user 10, 20 who communicated the categorized information; the user(s) 10, 20 who is/are the recipient of the categorized information; supplemented information (e.g., by the categorizer 231); links and/or associations generated by the categorizer 231 and/or one or more other elements of the processor 200; historic and/or current communications; historic and/or current candidate trading records; historic and/or current selected trading records; historic and/or current confidence indicias; historic and/or current trading record ranking results; historic and/or current information from one or more information sources 30; etc. For example, the candidate trading record processor 240 may generate candidate trading records from voice communications by selecting one or more categorized information from one or more information payloads, including, but not limited to, those described above and in the present disclosure (e.g., first customer user first representative user payload, first customer user second representative user payload, first customer user third representative user payload, first customer user fourth representative user payload, second customer user first representative user payload, second customer user second representative user payload, second customer user third representative user payload, second customer user fourth representative user payload, representative user first first customer user payload, representative user second first customer user payload, representative user third, first customer user payload, representative user fourth first customer user payload, representative user first second customer user payload, representative user second second customer user payload, representative user third second customer user payload, and/or representative user fourth second customer user payload). As another example, the candidate trading record processor 240 may generate candidate trading records from trading information received from information sources 30 (e.g., exchanges 30, CLOB 30, etc.) or processing platforms 150 by selecting one or more categorized information from one or more information payloads, including, but not limited to, those described above and in the present disclosure (e.g., first first exchange payload, second first exchange payload, third first exchange payload, fourth first exchange payload, first second exchange payload, second second exchange payload, third second exchange payload, fourth second exchange payload, first first live e-order payload, second first live e-order payload, third first live e-order payload, fourth first live e-order payload, first first price reporting agency payload, second first price reporting agency payload, third first price reporting agency payload, and/or fourth first price reporting agency payload). As an example, a representative user 10 communicating with a customer user 20 communicates (e.g., a voice and/or textual communication) a phrase "July 21 Dubai Crude" starting at time t1, followed by another phrase "how was your day, did you catch the game last night" starting at time t2 (t2>t1), followed by another phrase "I'll buy 55" starting at time t3 (t3>t2). In such an example, the categorization processor 230 is configurable or configured to categorize each of the words in the three phrases and also perform associations and/or links based on one or more considerations, as described above and in the present disclosure. The candidate trading record processor 240 is then configurable or configured to generate a candidate trading record of bid for USD 55 for the July 2021 expiry of the Dubai Crude instrument based on such association and/or link performed by the categorization processor 230. As another example, a representative user 10 communicating with a customer user 20 communicates (e.g., a voice and/or textual communication) a phrase "bidding 55" starting at time t1, followed by another phrase "how was your day, did you catch the game last night" starting at time t2 (t2>t1), followed by another phrase "for July Dubai Crude" starting at time t3 (t3>t2). In such an example, the categorization processor 230 is configurable or configured to categorize each of the words in the three phrases and also perform associations and/or links based on one or more considerations, as described above and in the present disclosure. The candidate trading record processor 240 is then configurable or configured to generate a candidate trading record of bid for USD 55 for the July 2021 expiry of the Dubai Crude instrument based on such association and/or link performed by the categorization processor 230. As another example, a representative user 10 and a customer user 20 communicates with one another (e.g., a voice and/or textual communication) and the customer user 20 communicates the phrase "what have you got for July 21 Dubai Crude" starting at time t1. The representative user 10 then communicates phrase "how was your day, did you catch the game last night" starting at time t2 (t2>t1), followed by phrase "I'm bidding 55" starting at time t3 (t3>t2). In such an example, the categorization processor 230 is configurable or configured to categorize each of the words in the three phrases from the two users 10, 20 and also perform associations and/or links based on one or more considerations, as described above and in the present disclosure. The candidate trading record processor 240 is then configurable or configured to generate a candidate trading record of bid for USD 55 for the July 2021 expiry of the Dubai Crude instrument based on such association and/or link performed by the categorization processor 230. As another example, a representative user 10 communicating with a customer user 20 communicates (e.g., a voice and/or textual communication) the phrase "July 21 Dubai Crude 54.50 bid" starting at time t1, followed by another phrase "how was your day, did you catch the game last night" starting at time t2 (t2>t1), followed by another phrase "August Dubai Crude now selling 57.10" starting at time t3 (t3>t2), followed by another phrase "September Oman Crude 53.15 bid" starting at time t4 (t4>t3), followed by another phrase "buy 55 now" starting at time t5 (t5>t4). In such an example, the categorization processor 230 is configurable or configured to categorize each of the words in the five phrases and also perform associations and/or links based on one or more considerations, as described above and in the present disclosure. For example, the categorization processor 230 may identify one or more trading instruments and/or relevant trading dates/expiries in the processed phrases. Alternatively or in addition, the candidate trading record processor 240 may also perform a search for previously communicated, current, reference, external, live and/or real-time prices for the one or more trading instruments and/or trading dates identified to identify one or more trading instruments and/or trading dates having a previously communicated, current, reference, external, live and/or real-time price that is close to or matches the price or prices in the last phrase where an identifiable reference to an instrument and/or a trading date is not stated. The candidate trading record processor 240 is then configurable or configured to generate the following candidate trading records in sequence: a bid of USD 54.50 for the July expiry of the Dubai Crude instrument, an offer of USD 57.10 for the August expiry of the Dubai Crude instrument, a bid of USD 53.15 for the September expiry of the Oman Crude instrument, and a bid for USD 55 for the July 2021 expiry of the Dubai Crude instrument based on association/s and/or link/s performed by the categorization processor 230. As another example, a representative user 10 and a customer user 20 communicate with one another (e.g., voice and/or textual communication) via communication channel A and the customer user 20 communicates the phrase "what have you got for July 21 Dubai Crude" starting at time t1. The representative user 10 then communicates (e.g., a voice and/or textual communication) through a different communication channel B, the phrase "how was your day, did you catch the game last night" starting at time t2 (t2>t1), followed by phrase "I have a 55 bid" starting at time t3 (t3>t2). In such an example, the categorization processor 230 is configurable or configured to categorize each of the words in the three phrases from the two users 10, 20 and from across multiple communication channels and multiple modes of communication (e.g., a mix of voice and/or textual communication) and also perform associations and/or links based on one or more considerations, as described above and in the present disclosure. The candidate trading record processor 240 is then configurable or configured to generate a candidate trading record of bid for USD 55 for the July 2021 expiry of the Dubai Crude instrument based on such association and/or link performed by the categorization processor 230. As another example, a representative user 10 communicating with a customer user 20 communicates (e.g., a voice and/or textual communication) a phrase "July 21 offer −2.50, August 21 bid 340". The candidate trading record processor 240 is configurable or configured to perform one or more analysis. For example, the candidate trading record processor 240 may identify one or more default trading instruments of the representative user 10 (and/or customer user 20), which in this example may be Naphtha CIF NWE and Naphtha NWE Crack spread. Alternatively or in addition, the candidate trading record processor 240 may also perform a search for previously communicated, current, reference, external, live and/or real-time prices for one or more trading instruments to identify one or more trading instruments and contract expiry combinations having a previously communicated, current, reference, external, live and/or real-time price that is close to or matches the prices in the phrase. In an example embodiment where the candidate trading record processor 240 performs both the identifying of the default trading instrument and the searching for previously communicated, current, reference, external, live, and/or real-time price for one or more trading instruments, the candidate trading record processor 240 may be configurable or configured to select the trading instrument based on a match of both conditions. The candidate trading record processor 240 is then configurable or configured to identify the received phrase to be directed to two separate candidate trading records, and correspondingly generates a first candidate trading record of offer for USD −2.50 for the July 2021 expiry of the Naphtha NWE Crack spread instrument and a second candidate trading record of bid for USD 340 for the August 2021 expiry of the Naphtha CIF NWE instrument. As another example, a representative user 10 communicating with a customer user 20 communicates (e.g., a voice and/or textual communication) a phrase "selling jul −2.50, augee sep trades −2". The categorization processor 230 is configurable or configured to perform a matching between words found in the phrase and a list of relevant trading dates (such as contract expiries, delivery dates and the like), and may also be configurable or configured to select relevant trading dates based on this matching. The candidate trading record processor 240 is configurable or configured to perform one or more analysis. For example, the candidate trading record processor 240 may identify one or more default trading instruments of the representative user 10 (and/or customer user 20), which in this example may be Naphtha CIF NWE and Naphtha NWE Crack spread. Alternatively or in addition, the candidate trading record processor 240 may also perform a search for recently communicated, current, reference, external, live, and/or real-time prices for one or more trading dates of the one or more default trading instruments to identify one or more trading contracts (e.g. expiries or other relevant dates) having a recently communicated, current, reference, external, live, and/or real-time price that is close to or matches the prices in the phrase. In an example embodiment where the candidate trading record processor 240 performs the identifying of the default trading instrument, the identifying of the relevant trading date and the searching for a recently communicated, current, reference, external, live, and/or real-time price for one or more trading contracts, the candidate trading record processor 240 may be configurable or configured to select the trading instrument and the trading contract based on a match of the three conditions. The candidate trading record processor 240 is then configurable or configured to identify the received phrase to be directed to two separate candidate trading records, and correspondingly generates a first candidate trading record of offer for USD −2.50 for the July 2021 contract expiry of the Naphtha NWE Crack spread instrument and a second candidate trading record of a trade for USD −2 for the August 2021 vs September 2021 spread contract expiry of the Naphtha CIF NWE instrument. As another example, a representative user 10 communicating with a customer user 20 communicates (e.g., a voice and/or textual communication) the phrase "July 21 Dubai Crude 54.50 bid" starting at time t1, followed by another phrase "August Dubai Crude now selling 57.10" starting at time t2 (t2>t1), to which the customer user 20 responds (either via voice or textual communication) "55 offer here" starting at time t3 (t3>t2), to which the representative user 10 responds (either via voice or textual communication) "ok 54.75" starting at time t4 (t4>t3), to which the customer user 20 responds (either by voice or textual communication) "ok done" starting at time t5 (t5>t4), to which the representative user 10 responds (either by voice or textual communication) "thanks, done, have more to buy" starting at time t6 (t6>t5). In such an example, the categorization processor 230 is configurable or configured to categorize each of the words in the six phrases and also perform associations and/or links based on one or more considerations, as described above and in the present disclosure. For example, the categorization processor 230 may identify one or more trading instruments and/or relevant trading dates/expiries in the processed phrases. Alternatively or in addition, the candidate trading record processor 240 may also perform a search for previously communicated, current, reference, external, live and/or real-time prices for the one or more trading instruments and/or trading dates identified to identify one or more trading instruments and/or trading dates having a previously communicated, current, reference, external, live and/or real-time price that is close to or matches the price or prices in the phrases where an identifiable reference to an instrument and/or a trading date is not stated and generate candidate trading records from words that pertain to trading actions. The candidate trading record processor 240 is then configurable or configured to generate the following candidate trading records in sequence based on such association/s and/or link/s performed by the categorization processor 230 and the trading record processor 240: a bid of USD 54.50 for the July 2021 expiry of the Dubai Crude instrument where the owner/initiator of the bid is the representative user 10; an offer of USD 57.10 for the August expiry of the Dubai Crude instrument where the owner/initiator of the offer is the representative user 10; an offer of USD 55 for the July 2021 expiry of the Dubai Crude instrument where the owner/initiator of the offer is the customer user 20; a bid for USD 54.75 for the July 2021 expiry of the Dubai Crude instrument where the owner/initiator of the bid is the representative user 10; a trade of USD 54.75 for the July 2021 expiry of the Dubai Crude instrument; and an additional bid for USD 54.75 for the July 2021 expiry of the Dubai Crude instrument where the owner/initiator of the bid is the representative user 10. As another example, a representative user 10 communicating with a customer user 20 communicates (e.g., a voice and/or textual communication) the phrase "July 21 Dubai Crude 54.50 bid" starting at time t1, followed by another phrase "August Dubai Crude now selling 57.10" starting at time t2 (t2>t1), to which the customer user 20 responds (either via voice or textual communication) "55 offer here" starting at time t3 (t3>t2), to which the representative user 10 responds (either via voice or textual communication) "ok 54.75" starting at time t4 (t4>t3), to which the customer user 20 responds (either by voice or textual communication) "ok done" starting at time t5 (t5>t4), to which the representative user 10 responds (either by voice or textual communication) "thanks, done, do you want more?" starting at time t6 (t6>t5), to which the customer user 20 responds (either via voice or textual communication) "55" starting at time t7 (t7>t6), to which the representative user 10 responds (either via voice or textual communication) "that takes them out I think" starting at time t8 (t8>t7). In such an example, the categorization processor 230 is configurable or configured to categorize each of the words in the eight phrases and also perform associations and/or links based on one or more considerations, as described above and in the present disclosure. For example, the categorization processor 230 may identify one or more trading instruments and/or relevant trading dates/expiries in the processed phrases. Alternatively or in addition, the candidate trading record processor 240 may also perform a search for previously communicated, current, reference, external, live and/or real-time prices for the one or more trading instruments and/or trading dates identified to identify one or more trading instruments and/or trading dates having a previously communicated, current, reference, external, live and/or real-time price that is close to or matches the price or prices in the phrases where an identifiable reference to an instrument and/or a trading date is not stated and generate candidate trading records from words that pertain to trading actions. The candidate trading record processor 240 is then configurable or configured to generate the following candidate trading records in sequence based on such association/s and/or link/s performed by the categorization processor 230 and the trading record processor 240: a bid of USD 54.50 for the July 2021 expiry of the Dubai Crude instrument where the owner/initiator of the bid is the representative user 10; an offer of USD 57.10 for the August expiry of the Dubai Crude instrument where the owner/initiator of the offer is the representative user 10; an offer of USD 55 for the July 2021 expiry of the Dubai Crude instrument where the owner/initiator of the offer is the customer user 20; a bid for USD 54.75 for the July 2021 expiry of the Dubai Crude instrument where the owner/initiator of the bid is the representative user 10; a trade of USD 54.75 for the July 2021 expiry of the Dubai Crude instrument; and an additional offer for USD 55 for the July 2021 expiry of the Dubai Crude instrument where the owner/initiator of the offer is the customer user 20.

Example 3a—Generating Candidate Trading Records

Continuing from Example 2a, if voice communications by the representative user 10 (e.g., Broker A) to the first customer user 20 results in a first customer user first representative user payload (for trading actions) having "ask" as the trading action with timestamp t1 (e.g., 10:10:10 am), first customer user second representative user payload (for trading prices) having "522" as the trading price with timestamp t1+1 (e.g., 10:10:11 am), and first customer user fourth representative user payload (for trading instrument) having "Naphtha NWE" as the trading instrument with timestamp t1-1 (e.g., 10:10:09 am), the candidate trading record processor 240 (and/or the categorizer 231) is configurable or configured to supplement one or more missing information. For example, the candidate trading record processor 240 (and/or categorizer 231) may identify that such a price of "USD 522" for Naphtha NWE corresponds to a current or market "ask" price range with contract expiry date in "May 2020" (e.g., based on: a search of recent candidate trading records; a search of recent representative user voice communications (e.g., the Broker A may have recently provided an ask price for the contract expiry date in "May 2020"); a search of recent first customer user voice communications (e.g., the first customer user 20 may have recently asked for an ask price for the contract expiry date in "May 2020"); and/or a search of information sources 30 and/or databases 50). The candidate trading record processor 240 is then able to generate one or more candidate trading records, such as a candidate trading record of "Broker A asking USD 522 for Naphtha NWE with contract expiry date of May 2020", which may be provided to the trading record processor 260 and/or trading record ranking processor 270 to be ranked, arranged, grouped, stacked, filtered, compared, ordered, and/or otherwise displayed in chart or table format (see, for example, FIG. 10). In this example, the candidate trading record processor 240 generates a candidate trading record based on at least representative user voice communications. In generating the supplemented information (i.e., missing information of the contract expiry date in "May 2020"), the generating of the candidate trading record may also be based on one or more previous candidate trading records, previous representative user voice communications, previous first customer user voice communications, information sources 30, and/or databases 50. End of Example 3a.

Example 3b—Generating Candidate Trading Records

Referring to Example 3a, if the candidate trading record processor 240 (and/or categorizer 231) is unable to supplement one or more missing information, the candidate trading record processor 240 is configurable or configured to generate an incomplete candidate trading record as "Broker A asking USD 522 for Naphtha NWE with contract expiry date", which may be provided to the trading record processor 260 to be displayed in chart or table format (see, for example, FIG. 10). In this example, the candidate trading record processor 240 generates a candidate trading record based on at least representative user voice communications. End of Example 3b.

Example 3c—Generating Candidate Trading Records

Referring to Example 3a, if voice communications by the first customer user 20 to the representative user 10 (e.g., Broker A) results in a representative user first first customer user voice communications (for trading actions) having "buy" as the trading action with a timestamp t2 (e.g., 10:12:00 am), representative user second first customer user voice communications (for trading prices) having "522" as the trading price with timestamp t2+3 (e.g., 10:12:03 am), representative user third first customer user voice communications (for trading quantities) having "100" as the trading quantity with timestamp t2+2 (e.g., 10:12:02), and representative user fourth first customer user voice communications (for trading instrument) having "Naphtha NWE" as the trading instrument with timestamp t2+1 (e.g., 10:12:01), the candidate trading record processor 240 is configurable or configured to generate a candidate trading record of "Broker A buy 100 units Naphtha NWE at USD 522", which may be provided to the trading record processor 260 and/or trading record ranking processor 270 to be ranked, arranged, grouped, stacked, filtered, compared, ordered, and/or otherwise displayed in chart or table format (see, for example, FIG. 10). In a situation where the candidate trading record processor 240 and/or categorizer 231 is able to supplement the missing contract expiry date of "May 2020" (e.g., based on: a search of recent candidate trading records (e.g., the candidate trading record generated in Example 3a); a search of recent representative user voice communications (e.g., the Broker A may have recently provided an ask price for the contract expiry date in "May 2020"); a search of recent first customer user voice communications (e.g., the first customer user 20 may have recently asked for an ask price for the contract expiry date in "May 2020"); and/or a search of information sources 30 and/or databases 50), the candidate trading record processor 240 is then able to generate the candidate trading record "Broker A buy 100 units of Naphtha NWE contract expiry date of May 2020 at USD 522", which may be provided to the trading record processor 260 and/or trading record ranking processor 270 to be ranked, arranged, grouped, stacked, filtered, compared, ordered, and/or otherwise displayed in chart or table format (see, for example, FIG. 10). In this example, the candidate trading record processor 240 generates a candidate trading record based on at least first customer user voice communications. In generating the supplemented information (i.e., missing information of the contract expiry date in "May 2020"), the generating of the candidate trading record may also be based on one or more previous candidate trading records, previous representative user voice communications, previous first customer user voice communications, information sources 30, and/or databases 50. End of Example 3c.

Example 3d—Generating Candidate Trading Records

Referring to Example 3a, if voice communications by the first customer user 20 to the representative user 10 (e.g., Broker A) results in a representative user first first customer user voice communications (for trading actions) having "buy" as the trading action with a timestamp t2 (e.g., 10:12:00 am) and representative user second first customer user voice communications (for trading prices) having "522" as the trading price with timestamp t2+3 (e.g., 10:12:03 am), the candidate trading record processor 240 (and/or categorizer 231) is configurable or configured to perform an analysis to supplement the missing information (e.g., Naphtha NWE and contract expiry date of May 2020) based on the previous/historic candidate trading record generated by the Broker A (i.e., "Broker A asking USD 522 for Naphtha NWE with contract expiry date of May 2020"). The candidate trading record processor 240 (and/or categorizer 231) is also configurable or configured to perform an analysis to supplement missing trading quantity information based on historic considerations (e.g., default quantity, historic quantity, set quantity lots, maximum quantities, minimum quantities, etc.). The candidate trading record processor 240 is then able to generate the candidate trading record "Broker A buy 100 units of Naphtha NWE contract expiry date of May 2020 at USD 522", which may be provided to the trading record processor 260 and/or trading record ranking processor 270 to be ranked, arranged, grouped, stacked, filtered, compared, ordered, and/or otherwise displayed in chart or table format (see, for example, FIG. 10). In this example, the candidate trading record processor 240 generates a candidate trading record based on at least first customer user voice communications. In generating the supplemented information (i.e., missing information of the Naphtha NWE, 100 units, contract expiry date in "May 2020"), the generating of the candidate trading record is based on one or more previous candidate trading records, previous representative user voice communications, previous first customer user voice communications, information sources 30, and/or databases 50. End of Example 3d.

Example 3e—Generating Candidate Trading Records

Referring to Example 3a, if voice communications by the first customer user 20 to the representative user 10 (e.g., Broker A) is received by the communication channel processor 210 as an incomplete communication such as "yes", "agreed", "go ahead" or "I'll take it", the candidate trading record processor 240 (and/or categorizer 231) is configurable or configured to perform an analysis to supplement missing trading information and/or generate an entire candidate trading record (e.g., one which does not include any word(s) communicated by the first customer user 20) based on one or more considerations (as described in the present disclosure). For example, the candidate trading record processor 240 (and/or categorizer 231) is configured to perform an analysis to supplement the missing information and/or generate an entire candidate trading record based on the previous/historic candidate trading record generated by the Broker A (i.e., "Broker A asking USD 522 for Naphtha NWE with contract expiry date of May 2020"). Such previous/historic candidate trading records may also include those generated for other communication channels 40 as well (e.g., the above voice communication by the first customer user 20 to the representative user 10 is on a first voice communication channel 40 but previous communications such as an asking price communicated by the representative user 10 to the first customer user 20 was on a second communication channel 40). The candidate trading record processor 240 is then able to generate the candidate trading record "Broker A buy 100 units of Naphtha NWE contract expiry date of May 2020 at USD 522", which may be provided to the trading record processor 260 and/or trading record ranking processor 270 to be ranked, arranged, grouped, stacked, filtered, compared, ordered, and/or otherwise displayed in chart or table format (see, for example, FIG. 10). In this example, the candidate trading record processor 240 generates a candidate trading record based on at least first customer user voice communications. In generating the supplemented information (i.e., missing information being all required information for the candidate trading record), the generating of the candidate trading record may also be based on one or more previous candidate trading records, previous representative user voice communications, previous first customer user voice communications, information sources 30, and/or databases 50. End of Example 3e.

Example 3f—Generating Candidate Trading Records

Referring to Example 3a, if voice communications by the first customer user 20 to the representative user 10 (e.g., Broker A) is received by the communication channel processor 210 as an incomplete communication such as "buy August", "I'll take August", "Auggie", the candidate trading record processor 240 (and/or categorizer 231) is configurable or configured to perform an analysis to supplement missing trading information and/or generate an entire candidate trading record (e.g., one which does not include any word(s) communicated by the first customer user 20) based on one or more considerations (as described in the present disclosure). For example, the candidate trading record processor 240 (and/or categorizer 231) is configured to perform an analysis to identify "August" and "Auggie" as referring to Naphtha NWE with contract expiry date of August 2020. The candidate trading record processor 240 (and/or categorizer 231) is also configurable or configured to perform an analysis to identify the missing trading quantity information based on historic considerations (e.g., default quantity, historic quantity, set quantity lots, maximum quantities, minimum quantities, etc.). The candidate trading record processor 240 (and/or categorizer 231) is also configurable or configured to search information sources 30 for the asking price for Naphtha NWE with contract expiry date of August 2020, which may be "488". In such an example, the candidate trading record processor 240 is then able to generate the candidate trading record "Broker A buy 100 units of Naphtha NWE contract expiry date of August 2020 at USD 488", which may be provided to the trading record processor 260 and/or trading record ranking processor 270 to be ranked, arranged, grouped, stacked, filtered, compared, ordered, and/or otherwise displayed in chart or table format (see, for example, FIG. 10). In this example, the candidate trading record processor 240 generates a candidate trading record based on at least first customer user voice communications. In generating the supplemented information (i.e., missing information being all required information for the candidate trading record), the generating of the candidate trading record may also be based on one or more previous candidate trading records, previous representative user voice communications, previous first customer user voice communications, information sources 30, and/or databases 50. End of Example 3f Example 3g—Generating Candidate Trading Records In certain situations and/or trading markets, a representative user 10 may communicate with a plurality of customer users 20 via a one-to-many voice communication channel 40. For example, the representative user 10 may voice-broadcast trades and/or trading information (e.g., a bid price for a certain quantity of a certain commodity having a certain trading date) to the plurality of customer users 20. In such a situation, one or more of the plurality of customer users 20 may be located in different cities, countries, regions, or parts of the world. For example, a representative user 10 based in New York (USA) may communicate on a 1-to-30 voice communication channel 40, where a majority of the 30 customer users 20 connected to the communication channel 40 are located in different parts of the world (e.g., a customer user 20 based in Singapore, another customer user 20 based in Jakarta, another customer user 20 based in London (UK), another customer user 20 based in Paris, another customer user 20 based in Kuala Lumpur, another customer user 20 based in Bangkok, nine customer users 20 based in Chicago, five customer users 20 based in New Jersey (USA), and ten customer users 20 based in New York (USA)). In such a situation, an example embodiment of the communication channel processor 210 may be configurable or configured to receive (or extract or intercept) voice communications from the representative user 10 at several (or all) of the 30 customer user 20 locations (e.g., by "listening in" or receiving such representative user communications at the customer user 20 end). It is recognized in the present disclosure that voice communications from the representative user 10 received at one or more of the 30 locations (e.g., Jakarta) may differ from voice communications from the representative user 10 received at one or more other locations (e.g., New York) due to one or more reasons (e.g., differences in distances from the representative user 10, quality of voice communications, different telecom providers, number of different telecom networks and/or providers required for the communication between the representative user 10 and the customer user 20, number of signal repeaters and regenerators between the representative user 10 and the customer user 20, etc.) and in one or more ways (e.g., signal quality, amplitude/magnitude, cutoff frequency, noise, etc.).

In an example embodiment, the communication channel processor 210 is configurable or configured to include, incorporate, link, associate, or attach location and/or other information (e.g., city name such as Jakarta, London, Chicago, New York, etc.; GPS information; distance information, such as distance from the representative user 10 or a reference location; signal strength information; telecom network-related information; etc.) for each voice communication from the representative user 10 received by the communication channel processor 210 (i.e., received at each customer user 20 location and provided to the communication channel processor 210). An example embodiment of the candidate trading record processor 240 is then configurable or configured to generate a candidate trading record for each of the 30 representative user 10 voice communications received at each customer user 20 location and include the location and/or other information along with the candidate trading record. From the 30 candidate trading records, the candidate trading record processor 240 is then configurable or configured to select one (or more) candidate trading record to be a selected trading record (which is then provided to the trading record processor 260 for displaying to users 10, 20 in the main section (as described in the present disclosure) and/or provided to the confidence indicia processor 250 and/or trading record ranking processor 270 for further processing (as described in the present disclosure)).

In situations where one or more of the 30 candidate trading records are different from one or more other candidate trading records, the candidate trading record processor 240 is configurable or configured to select the selected trading record(s) based on one or more of the following considerations: a majority test (e.g., most number of candidate trading records that are the same will be selected as the selected trading record); and/or best history test (e.g., candidate trading record from location(s) having the most consistently good, best history, highest average, etc. of accurate results are selected, or are given the highest weight or value); and/or confidence indicia test (e.g., candidate trading record from location having best history of high (or highest) confidence indicia); and/or worst history test (e.g., candidate trading record from location(s) having the most consistently bad, worst history, lowest average, etc. of accurate results are not selected, or have the lowest weight or value); and/or closest or shortest distance test (e.g., candidate trading record from location having the closest or shortest distance from the representative user location is selected, or have the highest weight or value); and/or furthest or longest distance test (e.g., candidate trading record from location having the furthest or longest distance from the representative user location is not selected, or have the lowest weight or value); etc.

In situations where all 30 candidate trading records are identical, any one of the candidate trading records may be selected as the selected trading record (or one candidate trading record is selected using one or more of the above considerations such as closest distance from representative user location, best history of accurate results, etc.). End of Example 3g.

The Confidence Indicia Processor (e.g., Confidence Indicia Processor 250).

As illustrated in FIG. 2, the processor 200 includes one or more confidence indicia processors (e.g., confidence indicia processor 250). The confidence indicia processor 250 is configurable or configured to, among other things, generate a confidence indicia (e.g., an indication, measure, quantification, and/or qualification of a level of confidence, etc.) for each candidate trading record generated by the candidate trading record processor 240.

In an example embodiment, the confidence indicia generated by the confidence indicia processor 250 represents a level of confidence and/or score of one or more aspects of and/or pertaining to a candidate trading record including, but not limited to: a level of confidence and/or score representing an accuracy of one or more aspects of the candidate trading record; and/or a level of confidence and/or score representing a completeness of one or more aspects of the candidate trading record; and/or a level of confidence and/or score representing one or more aspects of a source of the trading information used to generate the candidate trading record; and/or a level of confidence and/or score representing one or more temporal aspects or temporal nature of the candidate trading record.

Confidence Indicia Based on a Level of Confidence of Accuracy.

The confidence indicia for each candidate trading record may represent and/or be based on and/or include a consideration of a level of confidence and/or score representing an accuracy of the quality of the voice communication received and/or obtained from the communication channel 40. Alternatively or in addition, the confidence indicia for each candidate trading record may represent and/or be based on and/or include a consideration of a level of confidence and/or score representing an accuracy of one or more generated voice signatures used for generating the candidate trading record. Alternatively or in addition, the confidence indicia for each candidate trading record may represent and/or be based on and/or include a consideration of a level of confidence and/or score representing an accuracy of one or more generated textual representations of the words used for generating the candidate trading record. Alternatively or in addition, the confidence indicia for each candidate trading record may represent and/or be based on and/or include a consideration of a level of confidence and/or score representing an accuracy of the categorizing of one or more words used for generating the candidate trading record. Alternatively or in addition, the confidence indicia for each candidate trading record may represent and/or be based on and/or include a consideration of a level of confidence and/or score representing an accuracy of one or more generated information payloads used for generating the candidate trading record. Alternatively or in addition, the confidence indicia for each candidate trading record may represent and/or be based on and/or include a consideration of a level of confidence and/or score representing an accuracy of the selecting of one or more words from one or more information payloads used for generating the candidate trading record. Alternatively or in addition, the confidence indicia for each candidate trading record may represent and/or be based on and/or include a consideration of a level of confidence and/or score representing an accuracy of the timestamp of the one or more words in the information payloads used for generating the candidate trading record. Alternatively or in addition, the confidence indicia for each candidate trading record may represent and/or be based on and/or include a consideration of a level of confidence and/or score representing an accuracy of generated supplemented words (e.g., words generated to supplement missing words) used for generating the candidate trading record. Alternatively or in addition, the confidence indicia for each candidate trading record may represent and/or be based on and/or include a consideration of a level of confidence and/or score representing an accuracy of linking and/or associating categorized and/or supplemented words to other categorized and/or supplemented words, which were used for generating the candidate trading record; and/or a level of confidence of an accuracy of linking and/or associating one or more words in the information payloads to one or more other words in one or more other information payloads. Alternatively or in addition, the confidence indicia for each candidate trading record may represent and/or be based on and/or include a consideration of a level of confidence and/or score representing an accuracy of the ranking of the candidate trading record (e.g., relative to other candidate trading records, as further described in the present disclosure). As another example, the confidence indicia for each candidate trading record may represent and/or be based on and/or include a consideration of a level of confidence and/or score representing an accuracy of the arranging, grouping, stacking, filtering, comparing, and/or ordering of the candidate trading record (e.g., relative to and/or with other candidate trading records, as further described in the present disclosure).

Confidence Indicia Based on a Level of Confidence of Completeness.

The confidence indicia for each candidate trading record may represent and/or be based on and/or include a consideration of a level of confidence and/or score representing a completeness of the voice communication received and/or otherwise obtained from the communication channel 40 used to generate the candidate trading record. Alternatively or in addition, the confidence indicia for each candidate trading record may represent and/or be based on and/or include a consideration of a level of confidence and/or score representing a completeness of one or more generated voice signatures used for generating the candidate trading record. Alternatively or in addition, the confidence indicia for each candidate trading record may represent and/or be based on and/or include a consideration of a level of confidence and/or score representing a completeness of one or more generated textual representations of the words used for generating the candidate trading record. Alternatively or in addition, the confidence indicia for each candidate trading record may represent and/or be based on and/or include a consideration of a level of confidence and/or score representing a completeness of the categorizing of one or more words used for generating the candidate trading record. Alternatively or in addition, the confidence indicia for each candidate trading record may represent and/or be based on and/or include a consideration of a level of confidence and/or score representing a completeness of one or more generated information payloads used for generating the candidate trading record. Alternatively or in addition, the confidence indicia for each candidate trading record may represent and/or be based on and/or include a consideration of a level of confidence and/or score representing a completeness of the words selected and/or selectable from one or more information payloads used for generating the candidate trading record. Alternatively or in addition, the confidence indicia for each candidate trading record may represent and/or be based on and/or include a consideration of a level of confidence and/or score representing a completeness of the timestamp of the one or more words in the information payloads used for generating the candidate trading record. Alternatively or in addition, the confidence indicia for each candidate trading record may represent and/or be based on and/or include a consideration of a level of confidence and/or score representing a completeness of generated supplemented words (e.g., words generated to supplement missing words) used for generating the candidate trading record. Alternatively or in addition, the confidence indicia for each candidate trading record may represent and/or be based on and/or include a consideration of a level of confidence and/or score representing a completeness of linking and/or associating categorized and/or supplemented words to other categorized and/or supplemented words, which were used for generating the candidate trading record; and/or a level of confidence of a completeness of linking and/or associating one or more words in the information payloads to one or more other words in one or more other information payloads. Alternatively or in addition, the confidence indicia for each candidate trading record may represent and/or be based on and/or include a consideration of a level of confidence and/or score representing a completeness of the ranking of the candidate trading record (e.g., relative to other candidate trading records, as further described in the present disclosure). As another example, the confidence indicia for each candidate trading record may represent and/or be based on and/or include a consideration of a level of confidence and/or score representing a completeness of the arranging, grouping, stacking, filtering, comparing, and/or ordering of the candidate trading record (e.g., relative to and/or with other candidate trading records, as further described in the present disclosure).

Confidence Indicia Based on a Level of Confidence of a Source of the Trading Information.

The confidence indicia for each candidate trading record may represent and/or be based on and/or include a consideration of a level of confidence and/or score representing the source of the trading information used to generate the candidate trading record (e.g., reliability, credibility, quality, accuracy, completeness, and/or the like, of the source of the trading information that is used to generate the candidate trading information; and/or reliability, credibility, quality, accuracy, completeness, and/or the like, of the trading information received from the source).

Confidence Indicia Based on a Level of Confidence of a Temporal Aspect or Temporal Nature of the Trading Information and/or Candidate Trading Record.

The confidence indicia for each candidate trading record may represent and/or be based on and/or include a consideration of a level of confidence and/or score representing a temporal aspect or temporal nature of the trading information used to generate the candidate trading record (e.g., how current, recent, relevant, updated, not outdated, and/or the like, is the trading information in the candidate trading record; which may be based on a temporal aspect of the trading information, such as a time and/or date of trade, real-time or delayed nature of the trading information, timestamp, etc.). In an example embodiment, new, additional, updated, adjusted, replacement, and/or re-calculated confidence indicias for one or more candidate trading records (and/or selected trading records) may be generated and/or re-generated (e.g., if a confidence indicia was already previously generated for the candidate trading record (or selected trading record)) either periodically, continuously, intermittently, and/or dynamically (e.g., upon the occurrence of an event, such as upon receiving one or more other/newer (e.g., more recent timestamp) candidate trading records (or selected trading records); upon an expiry such as a contract expiry; upon a comparison with one or more other candidate trading records (or selected trading records), etc.). Such generating and/or re-generating enables the updating, adjusting, re-calculating, re-assessing, re-scoring, re-ranking, re-grouping, and/or the like, of one or more confidence indicias for one or more candidate trading records (and/or selected trading records) based on, among other things, date/time considerations and/or relative to one or more other candidate trading records (and/or selected trading records). It is recognized in the present disclosure that such generating and/or re-generating of confidence indicias for one or more candidate trading record (and/or selected trading record), either periodically, continuously, intermittently, and/or dynamically, enables the analyzing, ranking, grouping, subgrouping, and/or displaying (e.g., to users, and/or sharing to one or more other processors, platforms, and/or the like) relevant, up-to-date, real-time (or near real-time), and accurate trading records.

In an example embodiment, the confidence indicia processor 250 includes one or more candidate trading record selectors 252. The confidence indicia processor 250 also includes one or more confidence indicia generators 254. The confidence indicia processor 250 may also include one or more threshold confidence indicia generators 256. The confidence indicia processor 250 also includes one or more confidence indicia comparators 258. These elements of the confidence indicia processor 250 are further described below.

The Candidate Trading Record Selector (e.g., Candidate Trading Record Selector 252).

Figure 5:
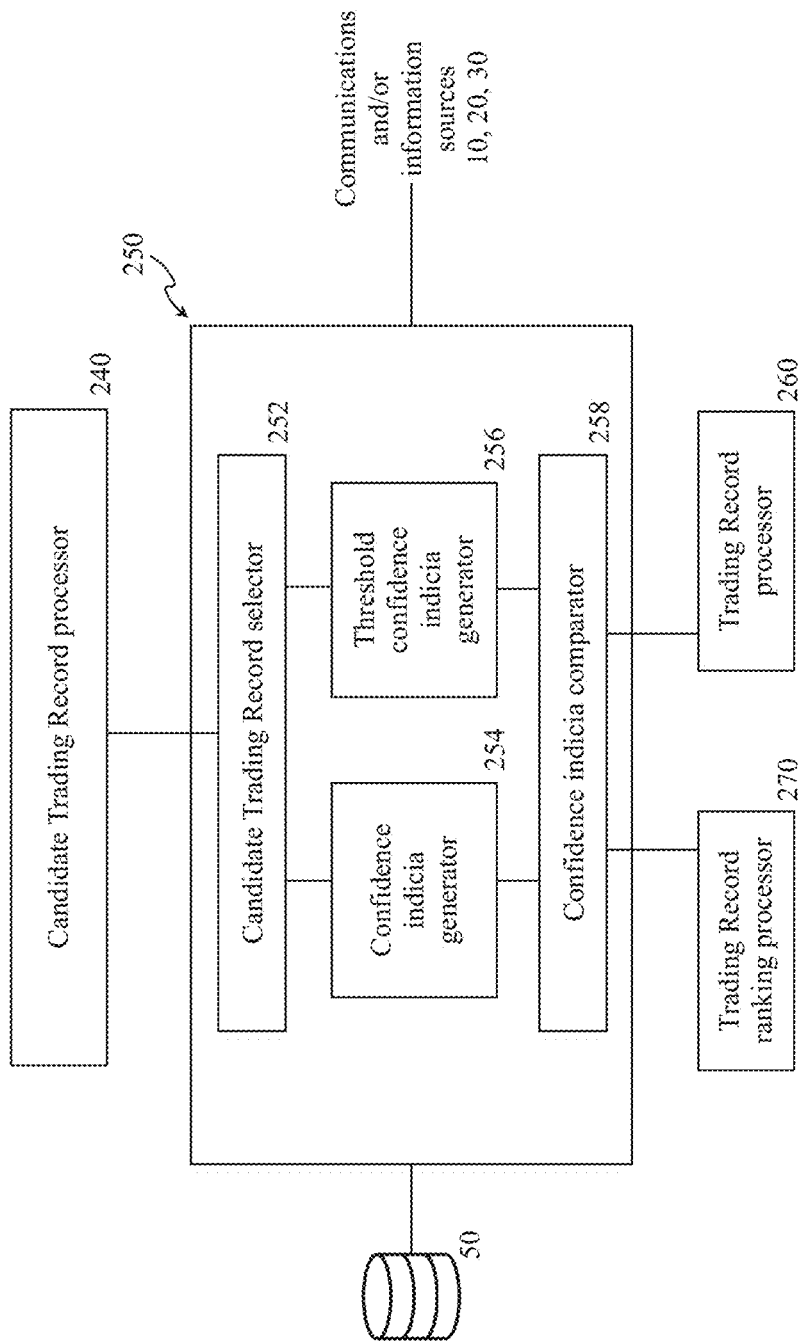
FIG. 5 is an illustration of an example embodiment of a confidence indicia processor.

As illustrated in FIG. 5, the confidence indicia processor 250 includes one or more candidate trading record selectors (e.g., candidate trading record selector 252). The candidate trading record selector 252 is configurable or configured to receive candidate trading records generated by the candidate trading record processor 240. Once received, the candidate trading record selector 252 is configurable or configured to select one or more candidate trading records for further processing by the confidence indicia generator 254. In an example embodiment, the candidate trading record selector 252 may select candidate trading records that meet certain minimum conditions, such as a minimum degree of accuracy, minimum degree of completeness (and/or sufficiency of information), certain source(s) of trading information, and/or certain period(s) of time. For example, if a candidate trading record only includes a trading action (e.g., buy) and a price (e.g., USD 150), such an incomplete candidate trading record may not meet a minimum degree of completeness. As another example, if a candidate trading record includes trading information for a trade that occurred 5 days ago, such a candidate trading record may exceed the maximum period of time (e.g., recentness).

In situations where the candidate trading record selector 252 determines that a candidate trading record will not be selected for further processing by the confidence indicia generator 254, such candidate trading record may be provided to the trading record processor 260 (or discarded or not displayed to users 10, 20 at all). The trading record processor 260 may be configurable or configured to display such candidate trading record to users 10, 20 (e.g., users 10, 20 who have access and/or subscribe to a service, website, application, or the like, that receives and displays trading information from the trading record processor 260) in a separate section or category (e.g., a "Confirm to Screen" section, "Incomplete Trading Records" section, "Potentially Inaccurate Trading Records" section, "Insufficient Accuracy" section, "Trading Records Requiring Further Confirmation" section, or the like; referred to herein as the "Confirm to Screen" section, or the like). In an example embodiment, the "Confirm to Screen" section is a section, category, or the like, that displays: trading records that have not been selected for further processing by the confidence indicia generator 254; trading records that are incomplete; and/or trading records that do not meet a minimum threshold of accuracy and/or completeness (e.g., below a threshold confidence indicia (as generated by the threshold confidence indicia generator 256), as further described below and in the present disclosure) (any such trading records referred to herein as "inadequate trading records", or the like). In an example embodiment, the "Confirm to Screen" section is an editable section, that is, a section that allows one or more users 10, 20 to confirm as is (e.g., no editing), delete or edit inadequate trading records that are displayed in such section (and/or vote on, approve, disapprove, discard, etc. such trading records). It is recognized in the present disclosure that allowing inadequate trading records displayed in the "Confirm to Screen" section to be confirmed as is (e.g., no editing), deleted or edited by users 10, 20 enables such users 10, 20 who may know more about details/background of such trading record to amend/edit/append/delete the trading record to be more accurate and/or complete and/or discarded.

In an example embodiment, the processor 200 may handle inadequate trading records that have been edited by user(s) 10, 20 after being displayed in the "Confirm to Screen" section (referred to herein as "user-edited trading records", "edited trading records", or the like) in one or more of the following ways: provide the user-edited trading record back to the candidate trading record selector 252 to perform a check whether the user-edited trading record will be selected for further processing by the confidence indicia generator 254 (in which case, the user-edited trading record may also be referred to as a candidate trading record); provide the user-edited trading record directly to the confidence indicia generator 254 for further processing (in which case, the user-edited trading record may also be referred to as a candidate trading record); provide the user-edited trading record directly to the trading record ranking processor 270 to be ranked and/or grouped before being displayed in a "main section"; or provide the user-edited trading record directly to the trading record processor 260 for displaying in the main section. As used in the present disclosure, a "main section" may refer to one or more sections, as displayed by the trading record processor 260, that displays only trading records that meet a minimum threshold or level of accuracy and/or completeness (e.g., above a threshold confidence indicia (as generated by the threshold confidence indicia generator 256)); see, for example, FIG. 10.

The Confidence Indicia Generator (e.g., Confidence Indicia Generator 254).

As illustrated in FIG. 5, the confidence indicia processor 250 includes one or more confidence indicia generators (e.g., confidence indicia generator 254). The confidence indicia generator 254 is configurable or configured to receive candidate trading records selected by the candidate trading record selector 252 (e.g., candidate trading records that meet a minimum degree of completeness; candidate trading records that are not inadequate trading records; etc.). In some example embodiments, the confidence indicia generator 254 is also configurable or configured to receive user-edited trading records (e.g., trading records that have been edited by a user 10, 20 pursuant to being displayed in a Confirm to Screen, as described above and in the present disclosure).

The confidence indicia generator 254 is then configurable or configured to generate a confidence indicia for each candidate trading record received by the confidence indicia generator 254. The confidence indicia generated by the confidence indicia processor 250 represents a level or degree of confidence of one or more aspects of and/or pertaining to a candidate trading record including, but not limited to, a level of confidence of and/or score representing an accuracy of one or more aspects of the candidate trading record (or "accuracy-based considerations"); and/or a level of confidence of and/or score representing a completeness of one or more aspects of the candidate trading record (or "completeness-based considerations"); and/or a level of confidence of and/or score representing one or more aspects of a source of the trading information used to generate the candidate trading record (or "source-based considerations"); and/or a level of confidence of and/or score representing one or more temporal aspects or temporal nature of the candidate trading record (or "temporal-based considerations"). The confidence indicia processor 250 is configurable or configured to generate a confidence indicia for each candidate trading record based on one or more considerations including, but not limited to, one or more of the following: a comparison with outright or known data/information (e.g., live interests to trade, live prices, information from exchanges and other trading platforms, daily closing prices and ranges, published benchmark prices, private prices submitted to other information sources 30 by representative users 10); and/or an accuracy of voice signatures used in generating the candidate trading record; and/or an accuracy of textual representations of voice communications used in generating the candidate trading record; and/or an accuracy of categorized words and/or the categorizing of words used in generating the candidate trading record; and/or an accuracy of information payloads used in generating the candidate trading record; and/or an accuracy of words selected from information payloads (and/or the selecting of words from information payloads) used in generating the candidate trading record; and/or an accuracy of timestamps used in generating the candidate trading record; and/or an accuracy of supplemented words used in generating the candidate trading record.

In an example embodiment, the confidence indicia generator 254 is configurable or configured to communicate with and/or cooperate with the user communications processor 220 to determine an accuracy of one or more of the voice signatures used for generating the candidate trading record. In such an example embodiment, the generating of a confidence indicia for the candidate trading record may be based at least in part on and/or include an accuracy-based consideration, or more specifically, a consideration of the accuracy of one or more of the voice signatures (and/or a level of confidence of and/or score representing an accuracy of one or more of the voice signatures).

In addition to or alternatively, the confidence indicia generator 254 is configurable or configured to communicate with and/or cooperate with the candidate trading record processor 240 to determine a completeness of the candidate trading record. In such an example embodiment, the generating of a confidence indicia for the candidate trading record may be based at least in part on and/or include a completeness-based consideration, or more specifically, a consideration of the completeness of information in the candidate trading record.

In addition to or alternatively, the confidence indicia generator 254 is configurable or configured to communicate with and/or cooperate with the user communications processor 220 (and/or categorization processor 230 and/or candidate trading record processor 240, whichever performs the generating of textual representations from voice communications, as described in the present disclosure) to determine an accuracy of one or more of the textual representations of the voice communications used for generating the candidate trading record. In such an example embodiment, the generating of a confidence indicia for the candidate trading record may be based at least in part on and/or include an accuracy-based consideration, or more specifically, a consideration of the accuracy of one or more of the textual representations of the voice communications (and/or a level of confidence of and/or score representing an accuracy of one or more of the textual representations of the voice communications).

In addition to or alternatively, the confidence indicia generator 254 is configurable or configured to communicate with and/or cooperate with the communication channel processor 210 (and/or categorization processor 230 and/or candidate trading record processor 240) to determine the source of the trading information used to generate the candidate trading record. In such an example embodiment, the generating of a confidence indicia for the candidate trading record may be based at least in part on and/or include a source-based consideration, or more specifically, a consideration of the source of the trading information used to generate the candidate trading record. For example, when comparing trading information received from a first source (e.g., non-indicative prices and/or other trading information from a source such as an exchange 30, CLOB 30, processing platform 150, etc.) that is always, consistently, inherently, defaulted to be, known to be, and/or considered to be more reliable, credible, accurate, complete, actionable etc. than trading information received from a second source (e.g., indicative prices and/or other information from a source such as voice communications by a broker 10), it is recognized that candidate trading records generated using trading information from the first source will, in general, have a higher confidence indicia than candidate trading records generating using trading information from the second source.

In addition to or alternatively, the confidence indicia generator 254 is configurable or configured to communicate with and/or cooperate with the communication channel processor 210 (and/or categorization processor 230 and/or candidate trading record processor 240) to determine a temporal aspect and/or temporal nature of the trading information used to generate the candidate trading record. In such an example embodiment, the generating of a confidence indicia for the candidate trading record may be based at least in part on and/or include a temporal-based consideration, or more specifically, a consideration of the temporal aspect and/or temporal nature of the trading information used to generate the candidate trading record. For example, for trading prices received from a same and/or substantively similar source (e.g., same or substantively similar score or level of confidence for the component of the confidence indicia that is based on a consideration of the source of the trading information, as described in the previous paragraph and in the present disclosure), a first trading price for a particular commodity with a first timestamp (or first time of execution of the trade) just 1 minute ago will have a price that more accurately or better reflects the current fair market price of the particular commodity as compared a second trading price for the same commodity with a second timestamp (or second time of execution of the trade) of 1 hour ago. In such an example, a candidate trading record having the first trading price and first timestamp (or first time of execution of the trade) will have a higher confidence indicia than a candidate trading record having the second trading price and second timestamp (or second time of execution of the trade). In example embodiments, the confidence indicia generator 254 is configurable or configured to generate and/or re-generate new, additional, updated, adjusted, replacement, and/or re-calculated confidence indicias for one or more candidate trading records (and/or selected trading records), either periodically, continuously, intermittently, and/or dynamically (e.g., upon the occurrence of an event, such as upon receiving one or more other/newer (e.g., more recent timestamp) candidate trading records (or selected trading records); upon an expiry such as a contract expiry; upon a comparison with one or more other candidate trading records (or selected trading records), etc.). Such generating and/or regenerating may be performed by the confidence indicia generator 254 when a confidence indicia was already previously generated for the candidate trading record (or selected trading record). It is recognized in the present disclosure that such generating and/or re-generating enables the confidence indicia generator 254 to update, adjust, re-calculate, re-assess, re-score, re-rank, re-group, and/or the like, one or more confidence indicias for one or more candidate trading records (and/or selected trading records) based on, among other things, date/time considerations and/or relative to one or more other candidate trading records (and/or selected trading records). For example, upon receiving a first candidate trading record at a first date/time, the confidence indicia generator 254 generates a confidence indicia (referred to in this example as the first first confidence indicia) for the first candidate trading record. Upon receiving a second candidate trading record at a second date/time (e.g., after the first date/time), the confidence indicia generator 254 generates a confidence indicia (referred to in this example as the first second confidence indicia) for the second candidate trading record. Also upon receiving the second candidate trading record at the second date/time, the confidence indicia generator 254 generates (or re-generates) a confidence indicia (referred to in this example as the second first confidence indicia) for the first candidate trading record (which may still be a candidate trading record, or which may have been selected as a selected trading record, as described in the present disclosure). It is recognized in the present disclosure that such generating and/or re-generating of confidence indicias for one or more candidate trading record (and/or selected trading record) periodically, continuously, intermittently, and/or dynamically enables one or more elements of the processor 200 to analyze, rank, group, subgroup, and/or display (to users and/or share to one or more other processors) relevant, up-to-date, real-time (or near real-time), and accurate trading records.

Example embodiments are not limited to only periodic, continuous, intermittent, and/or dynamic generating and/or re-generating of confidence indicias for candidate trading records. As a non-limiting example, threshold confidence indicias (e.g., threshold values of confidence indicias generated by the threshold confidence indicia generator 256, as described in the present disclosure) may be generated and/or re-generated periodically, continuously, intermittently, and/or dynamically each time a confidence indicia of a candidate trading record is generated and/or re-generated. Alternatively or in addition, threshold confidence indicias may be selectively generated based on selection, preferences, profile, user type (representative user or customer user or other types of users), user permissions, user connection type, viewing and/or transaction history (e.g., overall history, recent history, daily history, etc.), etc. of the user 10, 20. For example, the processor 200 may be configurable or configured to enable users 10, 20 to selectively control the threshold confidence indicias (and/or one or more aspects, weighting, and/or criteria of the threshold confidence indicia), either directly (e.g., tuning of the threshold confidence indicia) or indirectly (e.g., modifying weightings and/or relevant time window, information accuracy, information completeness, and/or relevant source of information), generated by the threshold confidence indicia generator 256. More specifically, the processor 200 is configured to enable the user 10, 20 to selectively adjust, control, and/or prioritize the weight, value, priority, relevancy, and/or importance of one or more aspects of the confidence indicia and/or threshold confidence indicia. As described in the present disclosure, such aspects may include, but are not limited to, temporal aspects, source aspects, accuracy aspects, and completeness aspects. For example, if a user 10, 20 selects to adjust the relevancy of the temporal aspect, such as adjusting the relevancy or prioritization of trading records received within a specific period of time, then one or more elements of the processor 200 are configurable or configured to: re-calculate/re-generate the confidence indicias of the trading records (and/or candidate trading records) based on such temporal relevancy adjustment; and/or re-calculate/re-generate the threshold confidence indicias that are used to compare with the confidence indicias (and/or the re-calculated/re-generated confidence indicias).

In addition to or alternatively, the confidence indicia generator 254 is configurable or configured to communicate with and/or cooperate with the categorization processor 230 to determine an accuracy of one or more of the categorized words used for generating the candidate trading record. In such an example embodiment, the generating of a confidence indicia for the candidate trading record may be based at least in part on and/or include an accuracy-based consideration, or more specifically, a consideration of the accuracy of one or more of the categorized words (and/or a level of confidence of and/or score representing an accuracy of one or more of the categorized words).

In addition to or alternatively, the confidence indicia generator 254 is configurable or configured to communicate with and/or cooperate with the categorization processor 230 to determine an accuracy of one or more of the information payloads used for generating the candidate trading record. In such an example embodiment, the generating of a confidence indicia for the candidate trading record may be based at least in part on and/or include an accuracy-based consideration, or more specifically, a consideration of the accuracy of one or more of the information payloads (and/or a level of confidence of and/or score representing an accuracy of one or more of the information payloads).

In addition to or alternatively, the confidence indicia generator 254 is configurable or configured to communicate with and/or cooperate with the candidate trading record processor 240 to determine an accuracy of the selecting of one or more words from one or more information payloads used for generating the candidate trading record. In such an example embodiment, the generating of a confidence indicia for the candidate trading record may be based at least in part on and/or include an accuracy-based consideration, or more specifically, a consideration of the accuracy of the selecting of one or more of the words from one or more information payloads (and/or a level of confidence of and/or score representing an accuracy of the selecting of one or more of the words from one or more information payloads).

In addition to or alternatively, the confidence indicia generator 254 is configurable or configured to communicate with and/or cooperate with the user communications processor 220 to determine an accuracy of one or more of the timestamps used for generating the candidate trading record. In such an example embodiment, the generating of a confidence indicia for the candidate trading record may be based at least in part on and/or include an accuracy-based consideration, or more specifically, a consideration of the accuracy of one or more of the timestamps (and/or a level of confidence of and/or score representing an accuracy of one or more of the timestamps).

In addition to or alternatively, the confidence indicia generator 254 is configurable or configured to communicate with and/or cooperate with the categorization processor 230 and/or candidate trading record processor 240 to determine an accuracy of one or more of the supplemented words (if any) used for generating the candidate trading record. In such an example embodiment, the generating of a confidence indicia for the candidate trading record may be based at least in part on and/or include an accuracy-based consideration, or more specifically, a consideration of the accuracy of one or more of the supplemented words (and/or a level of confidence of and/or score representing an accuracy of one or more of the supplemented words).

In addition to or alternatively, the confidence indicia generator 254 is configurable or configured to communicate with and/or cooperate with the categorization processor 230 and/or candidate trading record processor 240 to determine an accuracy of one or more of the links and/or associations of categorized and/or supplemented words to other categorized and/or supplemented words used for generating the candidate trading record. In such an example embodiment, the generating of a confidence indicia for the candidate trading record may be based at least in part on and/or include an accuracy-based consideration, or more specifically, a consideration of the accuracy of one or more such links and/or associations (and/or a level of confidence of and/or score representing an accuracy of such links and/or associations).

In addition to or alternatively, the confidence indicia generator 254 is configurable or configured to communicate with and/or cooperate with the categorization processor 230 and/or candidate trading record processor 240 to determine an accuracy of one or more links and/or associations of words in one or more information payloads to words in one or more other information payloads used for generating the candidate trading record. In such an example embodiment, the generating of a confidence indicia for the candidate trading record may be based at least in part on and/or include an accuracy-based consideration, or more specifically, a consideration of the accuracy of such links and/or associations (and/or a level of confidence of and/or score representing an accuracy of such links and/or associations).

In addition to or alternatively, the confidence indicia generator 254 is configurable or configured to communicate with and/or cooperate with the categorization processor 230 and/or candidate trading record processor 240 to determine an accuracy of the selection of the candidate trading record by the candidate trading record selector 252. In such an example embodiment, the generating of a confidence indicia for the candidate trading record may be based at least in part on and/or include an accuracy-based consideration, or more specifically, a consideration of the accuracy of such selecting of the candidate trading record by the candidate trading record selector 252 (and/or a level of confidence of and/or score representing an accuracy of such selecting of the candidate trading record).

It is recognized in the present disclosure that one or more of the above conditions/considerations (e.g., accuracy-based considerations, completeness-based considerations, source-based considerations, and/or temporal-based considerations) for generating a confidence indicia for each candidate trading record may be weighted, valued, and/or prioritized the same or differently as compared to one or more of the other conditions/considerations. Alternatively, all of the above conditions/considerations may be weighted, valued, and/or prioritized equally in other example embodiments. In example embodiments, the weighting, value, and/or prioritizing of one or more of the above conditions/considerations (e.g., accuracy-based considerations, completeness-based considerations, source-based considerations, and/or temporal-based considerations) may be dynamically determined by one or more elements of the processor 200 (e.g., the confidence indicia generator 254). Alternatively or in addition, the weighting, value, and/or prioritizing of one or more of the above conditions/considerations (e.g., accuracy-based considerations, completeness-based considerations, source-based considerations, and/or temporal-based considerations) may be selectively adjusted, controlled, and/or prioritized by the user 10, 20, or by the user's type or by their permissions, as described in the present disclosure.

After the confidence indicia generator 254 generates a confidence indicia for a candidate trading record, the confidence indicia is provided to the confidence indicia comparator 258. As will be further described below and in the present disclosure, the confidence indicia comparator 258 compares the confidence indicia for the candidate trading record with a threshold confidence indicia, and provides the candidate trading record to the trading record ranking processor 270 for: (i) ranking and/or grouping prior to being displayed in the main section (e.g., when the confidence indicia is greater than or equal to the threshold confidence indicia), or (ii) displaying in the Confirm to Screen as an inadequate trading record to allow users 10, 20 to confirm as is (e.g., no editing), delete or edit (e.g., when the confidence indicia is less than the threshold confidence indicia).

The Threshold Confidence Indicia Generator (e.g., Threshold Confidence Indicia Generator 256).

As illustrated in FIG. 5, the confidence indicia processor 250 may include one or more threshold confidence indicia generators (e.g., threshold confidence indicia generator 256). The threshold confidence indicia generator 256 is configurable or configured to generate one or more threshold confidence indicias. The threshold confidence indicias may be generated by the threshold confidence indicia generator 256 in one or more or a plurality of ways.

For example, the threshold confidence indicia generator 256 may receive an instruction or request from the confidence indicia comparator 258 (and/or the candidate trading record selector 252 and/or the confidence indicia generator 254 and/or one or more other elements of the processor 200) to generate a threshold confidence indicia or provide a predetermined, already generated, or default threshold confidence indicia to the confidence indicia comparator 258.

Alternatively or in addition, the threshold confidence indicia generator 256 may dynamically generate a threshold confidence indicia for each candidate trading record based on one or more of the following: (1) based on the candidate trading record selected by the candidate trading record selector 252 (e.g., candidate trading records that meet a minimum degree of completeness; candidate trading records that are not inadequate trading records; etc.); and/or (2) based on user-edited trading records (e.g., trading records that have been edited by a user 10, 20 pursuant to being displayed in a Confirm to Screen, as described above and in the present disclosure); and/or (3) based on the confidence indicia generated by the confidence indicia generator 254 for the candidate trading record. The threshold confidence indicia generator 256 may then provide the threshold confidence indicia to the confidence indicia comparator 258.

As an example, for a first candidate trading record that is more complete (i.e., less missing information) than a second candidate trading record, the threshold confidence indicia generator 256 may dynamically generate a lower threshold confidence indicia for the first candidate trading record as compared to the second candidate trading record. As another example, if a first candidate trading record has a low confidence score for a word in a relevant information payload (e.g., trading action) as compared to a second candidate trading record that has a low confidence score for a word in a less relevant information payload (e.g., user type), the threshold confidence indicia generator 256 may dynamically generate a higher threshold confidence indicia for the first candidate trading record as compared to the second candidate trading record.

In example embodiments, the threshold confidence indicia generator 256 may generate and/or re-generate the threshold confidence indicias periodically, continuously, intermittently, and/or dynamically each time a confidence indicia of a candidate trading record is generated and/or re-generated. Alternatively or in addition, threshold confidence indicias may be selectively generated based on selection, preferences, profile, user type (representative user or customer user or other types of users), user permissions, user connection type, viewing and/or transaction history (e.g., overall history, recent history, daily history, etc.), etc. of the user 10, 20. For example, the threshold confidence indicia generator 256 and/or one or more elements of the processor 200 may be configurable or configured to enable users 10, 20 to selectively control the threshold confidence indicias (and/or one or more aspects, weighting, and/or criteria of the threshold confidence indicia), either directly (e.g., user 10, 20 enabled to tune the threshold confidence indicia) or indirectly (e.g., user 10, 20 enabled to modify weightings, values, and/or priorities for the temporal considerations, accuracy considerations, completeness considerations, and/or source considerations), generated by the threshold confidence indicia generator 256. As a more specific non-limiting example, the processor 200 may, based on a default setting (e.g., as a default, which uses default or standard threshold confidence indicias), display to a particular user 10, 20 via the processing platform 150 a total of 10 selected trading records/prices on the user's screen (i.e., the 10 selected trading records have sufficiently high confidence indicia that exceed the threshold confidence indicia, as described in the present disclosure). These 10 selected trading records/prices may be selected trading records with 5 indicative prices from 2 hours ago, 2 indicative prices from 20 minutes ago, 1 live price (or non-indicative price) from yesterday, and 2 live prices (or non-indicative prices) from 1.5 hours ago. In such an example, one or more elements of the processor 200 is configured to enable the user 10, 20 to selectively adjust, control, and/or prioritize the relevancy or importance of one or more aspects of the confidence indicia and/or threshold confidence indicia. As described in the present disclosure, such aspects may include, but are not limited to, temporal aspects, source aspects, accuracy aspects, and completeness aspects. In this example, if the user 10, 20 selects to adjust the relevancy of the temporal aspect, such as adjusting the relevancy or prioritization of trading records received within the last 1 hour to be higher, then the confidence indicia generator 254 and/or one or more elements of the processor 200 are configurable or configured to re-calculate/re-generate the confidence indicias of the trading records (and/or candidate trading records) based on such temporal relevancy adjustment. Alternatively or in addition, example embodiments of the threshold confidence indicia generator 256 may also re-calculate/re-generate the threshold confidence indicias that are used to compare with the confidence indicias (and/or the re-calculated/re-generated confidence indicias). Such selective adjusting, controlling, and/or prioritizing by the user 10, 20 results in: the lowering of the confidence indicia for trading records (and/or candidate trading records) that are older than 1 hour (for situations where the confidence indicia is re-calculated/re-generated); and/or the comparing of the confidence indicia (or re-calculated/re-generated confidence indicia) of trading records (and/or candidate trading records) against a re-generated threshold confidence indicia (e.g., a threshold confidence indicia which gives more weight to temporal aspects, such as giving more weight to trading records (and/or candidate trading records) that have been received within 1 hour ago and/or giving less weight to trading records (and/or candidate trading records) that have been received over 1 hour ago). In such an example, it is recognized that trading records with live prices (or non-indicative prices) from today that are older than 1 hour ago may still qualify (i.e., its confidence indicia (or re-generated/re-calculated confidence indicia) may still exceed the threshold confidence indicia (or re-generated/re-calculated threshold confidence indicia)) and therefore will be displayed to the user 10, 20 by the processing platform 150 due to its source aspect of the confidence indicia (i.e., the information is coming from a more reliable source that provides non-indicative prices). However, in such an example, trading records with live prices (or non-indicative prices) from yesterday may not qualify (i.e., its confidence indicia (or re-generated/re-calculated confidence indicia) may not exceed the threshold confidence indicia (or re-generated/re-calculated threshold confidence indicia)) as the contribution to the temporal aspect of the confidence indicia will be very low (from yesterday), and therefore will not be displayed to the user 10, 20 by the processing platform 150. In this example, such a user-selective adjusting or prioritization of the temporal aspects of the trading records to be biased to those within the last 1 hour may result in the following trading records displayed to the user 10, 20 by the processing platform 150: the 2 indicative prices from 20 minutes ago and the 2 live prices from 1.5 hours ago.

After the threshold confidence indicia generator 256 selects, generates, or dynamically generates a threshold confidence indicia, the threshold confidence indicia generator 256 provides the threshold confidence indicia to the confidence indicia comparator 258 for use in comparing with one or more confidence indicias of one or more the candidate trading record.

The Confidence Indicia Comparator (e.g., Confidence Indicia Comparator 258).

As illustrated in FIG. 5, the confidence indicia processor 250 may include one or more confidence indicia comparators 258 (e.g., confidence indicia comparator 258). The confidence indicia comparator 258 is configurable or configured to receive candidate trading records from the candidate trading record selector 252 (and/or from the confidence indicia generator 254 and/or the threshold confidence indicia generator 256). The confidence indicia comparator 258 is also configurable or configured to receive one or more confidence indicias for each of the received candidate trading records. The confidence indicia comparator 258 is also configurable or configured to receive one or more threshold confidence indicias for each of the candidate trading records from the threshold confidence indicia generator 256 (e.g., default threshold confidence indicia, pre-selected threshold confidence indicia, selected threshold confidence indicia, dynamically generated threshold confidence indicia, and/or user selected threshold confidence indicia, as described above and in the present disclosure).

In an example embodiment, the confidence indicia comparator 258 is configurable or configured to select one or more trading records (each referred to herein as a "selected trading record", or the like) from among the received candidate trading records based on the confidence indicia and the threshold confidence indicia. More specifically, for each candidate trading record, when the confidence indicia of the candidate trading record is greater than or equal to the threshold confidence indicia, the confidence indicia comparator 258 provides the candidate trading record to the trading record processor 260 for displaying in the main section (e.g., via the processing platform 150). On the other hand, when the confidence indicia of the candidate trading record is less than the threshold confidence indicia, the confidence indicia comparator 258 either provides the candidate trading record to the trading record processor 260 for displaying in the Confirm to Screen section or discards the candidate trading record. In example embodiments where the confidence indicia for one or more candidate trading records (and/or selected trading records) are generated and/or re-generated periodically, continuously, intermittently, and/or dynamically, the confidence indicia comparator 258 is configurable or configured to compare such generated and/or re-generated confidence indicias with the threshold confidence indicia (as described above and in the present disclosure, including threshold confidence indicias that are generated and/or re-generated periodically, continuously, intermittently, dynamically, and/or upon user selection (selectively adjusted, controlled, and/or prioritized by the user 10, 20)), to determine whether or not the candidate trading record (or selected trading record if the candidate trading record has been selected as a selected trading record, as described in the present disclosure) is to be displayed (or re-displayed if already displayed as a selected trading record) by the processing platform 150 to users 10, 20 in the main section.

The Trading Record Ranking Processor (e.g., Trading Record Ranking Processor 270).

As illustrated in FIG. 2, the processor 200 may include one or more trading record ranking processors (e.g., trading record ranking processor 270). The trading record ranking processor 270 is configurable or configured to receive trading records and/or candidate trading records from the candidate trading record processor 240, the confidence indicia processor 250, the trading record processor 260, and/or one or more elements of the processor 200. The trading record ranking processor 270 is then configurable or configured to rank, group, arrange, stack, filter, compare, and/or otherwise order the received trading records (and/or candidate trading records) along with, against, and/or relative to (each as applicable) other trading records (and/or other candidate trading records) based on one or more considerations. Although the present disclosure may describe the trading record ranking processor 270 receiving, ranking, grouping, arranging, stacking, filtering, comparing, and/or otherwise ordering of selected trading records (e.g., as selected by the confidence indicia comparator 258 and/or one or more elements of the processor 200), it is to be understood in the present disclosure that the trading record ranking processor 270 may also receive, rank, group, arrange, stack, filter, compare, and/or otherwise order other trading records including, but not limited to, candidate trading records and/or trading records generated and/or derived from trading information received from information sources 30 (e.g., exchanges 30, CLOBs 30, etc.) and/or processing platforms 150. Trading records and/or candidate trading records generated and/or derived from non-indicative prices and/or other trading information received from information sources 30 and/or processing platforms 150 may include those that are already structured, categorized, and/or easily and/or readily displayable and/or presentable, by the trading record processor 260 and/or one or more other elements of the processor 200, to one or more users 10, 20 as a trading record (e.g., as illustrated in FIG. 9).

In an example embodiment, the trading record ranking processor 270 receives a plurality of selected trading records from the confidence indicia comparator 258 and/or one or more other elements of the processor 200 and performs a ranking, grouping, arranging, stacking, filtering, comparing, and/or otherwise ordering of the selected trading records. The ranking, grouping, arranging, stacking, filtering, comparing, and/or ordering of the selected trading records may be performed in a plurality of ways. In example embodiments where the confidence indicia for a candidate trading record (or selected trading record) is re-generated (e.g., periodically, continuously, intermittently, and/or dynamically, as described above and in the present disclosure) and the candidate trading record (or selected trading record) is selected (or re-selected) by the confidence indicia comparator 258 (as described above and in the present disclosure), the trading record ranking processor 270 is configurable or configured to perform a re-ranking, re-grouping, re-arranging, re-stacking, re-filtering, re-comparing, and/or otherwise re-ordering of selected trading records, including newly selected trading records; re-selected trading records; those selected trading records that were previously ranked, grouped, arranged, stacked, filtered, compared, and/or otherwise ordered by the trading record ranking processor 270; and/or those selected trading records that were not previously ranked, grouped, arranged, stacked, filtered, compared, and/or otherwise ordered by the trading record ranking processor 270.

Example 4a—Based on Trading Instrument

The selected trading records may be grouped or stacked based on trading instrument. As a more specific example, selected trading records that pertain to buying, selling, bidding, and/or asking of a specific expiry of a given instrument (e.g. September 2020 Gasoline (MOPS 92)) may first be grouped or stacked together. Thereafter, the selected trading records in such grouping/stacking are then ranked, ordered, or arranged within the group/stack and displayed by the trading record processor 260 as a ranked, ordered, or arranged group/stack. Such ranking, ordering, or arranging within the group/stack may be performed in a plurality of ways. For example, the selected trading records in the group/stack may be ranked, ordered, or arranged based on one or more of the following attributes: price, quantity, time received, time sent, whether partially traded or not, price type, source of trading information, relevant date, user type, confidence indicia, physical properties of a physical commodity, delivery schedules. End of Example 4a.

Example 4b—Based on Relevant Trading Dates

Alternatively or in addition to Example 4a above, the selected trading records may be grouped or stacked based on relevant trading dates. As a more specific example, selected trading records that expire on the same date/month may first be grouped or stacked together. Thereafter, the selected trading records in such grouping/stacking are then ranked, ordered, or arranged within the group/stack and displayed by the trading record processor 260 as a ranked, ordered, or arranged group/stack. Such ranking, ordering, or arranging within the group/stack may be performed in a plurality of ways. For example, the selected trading records in the group/stack may be ranked, ordered, or arranged based on one or more of the following attributes: price, quantity, time received, time sent, timestamp, whether partially traded or not, price type, source of trading information, relevant date, user type, confidence indicia, physical properties of a physical commodity, delivery schedules, etc. End of Example 4b.

Example 4c—Based on User Types

Alternatively or in addition to Example 4a and/or Example 4b above, the selected trading records may be grouped or stacked based on user types, user companies, and user classification. As a more specific example, selected trading records that have buy, sell, bid, and/or asks from a particular broker 10 may be grouped or stacked together. Thereafter, the selected trading records in such grouping/stacking are then ranked, ordered, or arranged within the group/stack and displayed by the trading record processor 260 as a ranked, ordered, or arranged group/stack. Such ranking, ordering, or arranging within the group/stack may be performed in a plurality of ways. For example, the selected trading records in the group/stack may be ranked, ordered, or arranged based on one or more of the following attributes: price, quantity, time received, time sent, timestamp, whether partially traded or not, price type, source of trading information, relevant date, user type, confidence indicia, physical properties of a physical commodity, delivery schedules, etc. End of Example 4c.

Example 4d—Based on Source

Alternatively or in addition to Example 4a, Example 4b, and/or Example 4c above, a group/stack may include two or more selected trading records having a plurality of same attributes (e.g., selected trading records having the same trading instrument, same expiry, and same price), but generated or derived from different sources. When ranking, ordering, or arranging such selected trading records that are generated or derived from different sources within a particular group/stack, those selected trading records generated or derived from information sources 30 (e.g., exchanges 30, CLOBs 30, etc.) and/or processing platforms 150, including those with live prices and/or external prices, will be ranked, ordered, or arranged higher, above, or before those selected trading records generated or derived from user 10, 20 communications (e.g., voice and/or textual communications from or between a representative user 10 and/or customer user 20), including those with indicative prices. For example, in situations where a trading price (i.e., a non-indicative price) for a trading record generated or derived from an information source 30 and/or processing platform 150 (or a "non-indicative price trading record" or "non-indicative price candidate trading record") is equal to (or the same as) a trading price (i.e., an indicative price) for a trading record generated or derived from user 10, 20 communications (or an "indicative price trading record" or "indicative price candidate trading record"), the non-indicative price trading record (or non-indicative price candidate trading record) will be ranked, ordered, or arranged higher, above, or before the indicative price trading record (or indicative price candidate trading record). In this regard, such ranking, ordering, or arranging may be based on an example embodiment of the confidence indicia since, as described in the present disclosure, the confidence indicia represents a level of confidence and/or score pertaining to the source and temporal aspects of the trading information used to generate the selected trading record. It is recognized in the present disclosure that such ranking, ordering, or arranging selected trading records based on the source and temporal aspects of the trading information may enable those selected trading records that are readily or immediately actionable (e.g., immediately executable or tradable, including those with exchange prices or live prices) to be more readily noticeable than those selected trading records that are not readily or immediately actionable (e.g., not executable via the processor 200 or platform thereof, including those with indicative prices). This will be particularly advantageous in situations where only one (or some) selected trading record in each grouping/stacking is displayed to the user 10, 20 and the remaining selected trading records are hidden (but displayable upon expanding the view of the group/stack). End of Example 4d.

Example 4e—Based on Source

Alternatively or in addition to Example 4a, Example 4b, Example 4c, and/or Example 4d, a group/stack displayed to users 10, 20 may include one or more selected trading records for a particular trading instrument, expiry, price, etc. that was/were generated or derived from user 10, 20 communications (e.g., voice and/or textual communications from or between a representative user 10 and/or customer user 20) and accordingly includes indicative prices. Thereafter, a selected trading record may be provided to the trading record ranking processor 270 for the same trading instrument, expiry, etc., but with an external price or live price that is more favorable or attractive (i.e., a better price). As used in the present disclosure, when referring to a more favorable, more attractive, and/or better price, a better bid is a higher bid and a better ask is a lower ask). In example embodiments, the trading record ranking processor 270, trading record processor 260, and/or one or more other elements of the processor 200 is configurable or configured to remove all already generated/displayed selected trading records having indicative prices that are less favorable or attractive, including those on the other side of the stack. For example, if a grouping/stacking has an indicative bid (i.e., an indicative price) of 10 and a live offer with the price of 9 (i.e., live price) is received, then any indicative bid higher than 9 in the group/stack will be removed/deleted from the group/stack. It is recognized in the present disclosure that such removal enables users 10, 20 to be protected from buying or selling on less efficient markets (e.g., decentralized markets such as those conducted via voice communications and/or textual communications) at "off-market" prices. In this particular example, a buyer 10, 20 will be protected from paying more than the best offer and a seller 10, 20 will be able to ensure their offer is competitive with the best offer visible in the grouping/stacking. End of Example 4e.

Example 4f—Based on Temporal Aspects

Alternatively or in addition to Example 4a, Example 4b, Example 4c, Example 4d, and/or Example 4e, for a group/stack having more than one selected trading record generated or derived from user 10, 20 communications (e.g., voice and/or textual communications from or between a representative user 10 and/or customer user 20; which accordingly includes an indicative price), such group/stack displayed to users 10, 20 may only display one such selected trading record (e.g., the latest one received). For example, for a group/stack already displaying a selected trading record with an indicative price received from Broker A on top of the group/stack, a newer selected trading record with a different indicative price (either higher or lower) received from Broker A will be displayed in replacement of the previous selected trading record. It is recognized in the present disclosure that replacing older selected trading records (that have indicative prices) with new selected trading records (also having indicative prices) may ensure that latest indicative prices are firstly or more noticeably displayed to users 10, 20 as compared to old/stale prices. For selected trading records having live prices or external prices, on the other hand, the ranking, ordering, or arranging may be opposite to selected trading records having indicative prices—that is, oldest selected trading records (that have live price or external price) will be placed on top (or ranked, ordered, or arranged above) newer selected trading records (also having indicative prices). End of Example 4f Example 4g—Removal of Selected Trading Records Alternatively or in addition to Example 4a, Example 4b, Example 4c, Example 4d, Example 4e, and/or Example 4f, example embodiments are configurable or configured to remove selected trading records based on one or more considerations. For example, for selected trading records generated or derived from user 10, 20 communications (e.g., voice and/or textual communications from or between a representative user 10 and/or customer user 20; which accordingly includes an indicative price), example embodiments may be configurable or configured to compare the indicative prices of such selected trading records with live prices or external prices of selected trading records generated or derived from information sources 30. In situations where the prices are different, example embodiments may remove such selected trading records having different indicative prices. As an example, a selected trading record may have an indicative price of 80 and another selected trading record in the same group/stack may have a live bid (i.e., live price) of 100 and live offer (i.e., live price) of 101. In such an example, example embodiments may lower/reduce the ranking, ordering, or arranging of such selected trading record having the indicative price of 80 or remove it altogether from the grouping/stacking. End of Example 4g.

Example 4h—Removal of Selected Trading Records

Alternatively or in addition to Example 4a, Example 4b, Example 4c, Example, 4d, Example 4e, Example 4f, and/or Example 4g, example embodiments are configurable or configured to remove selected trading records that are considered duplicate trading records (e.g., from the same source, from different sources but with same price, etc.). End of Example 4h.

In example embodiments, groups/stacks may be formed based on trading instrument. Sub-groups/sub-stacks may then be formed for one or more of the groups/stacks. Such sub-groups/sub-stacks may be formed based on relevant trading dates or contract. For each sub-group/sub-stack, trading records may be ranked, ordered, or arranged in a price stack (e.g., with colors denoting their origin) based on, among other things, the confidence indicia, a bespoke price, and/or priority sorting algorithm that takes into account relationships between the plurality of different sources and/or communication channels 40 used to generate the trading records (as described above and in the present disclosure). The ranking, ordering, or arranging may include one or more of the following: live trading prices always go higher in the sub-group/sub-stack (assuming identical pricing levels as those generated from voice and/or textual communications); grouping/stacking of live prices (if time/priority based) will be performed by displaying the oldest trading record on top and the latest trading record on the bottom; and/or grouping/ stacking of trading records generated or derived from user 10, 20 voice and/or textual communications is inverted (as compared to live prices or external prices), with the latest on top and oldest on the bottom (or removed altogether).

The Trading Record Processor (e.g., Trading Record Processor 260).

As illustrated in FIG. 2, the processor 200 may include one or more trading record processors (e.g., trading record processor 260). The trading record processor 260 is configurable or configured to communicate with a plurality of elements of the processor 200 and system 100 including, but not limited to, the candidate trading record processor 240, the confidence indicia processor 250, the trading record ranking processor 270, users 10, 20, and/or platforms 10, 20.

In an example embodiment, the trading record processor 260 is configurable or configured to receive inadequate trading records from the candidate trading record processor 240. As described in the present disclosure, inadequate trading records include trading records that have not been selected for further processing by the confidence indicia generator 254; trading records that are incomplete; and/or trading records that do not meet a minimum threshold of accuracy and/or completeness (e.g., below a threshold confidence indicia (as generated by the threshold confidence indicia generator 256), as further described below and in the present disclosure). The trading record processor 260 is configurable or configured to display such inadequate trading record to one or more users 10, 20 (e.g., users 10, 20 who have access and/or subscribe to a service, website, application, or the like, that receives and displays trading information from the trading record processor 260) and/or platform 10, 20 in a Confirm to Screen section. In an example embodiment, the Confirm to Screen section displayed by the trading record processor 260 is an editable section, which allows one or more users 10, 20 to edit the inadequate trading records (and/or vote on, approve, disapprove, discard, etc. such trading records). In an example embodiment, each user 10, 20 may be configurable or configured with default settings (and/or permissions, user types, etc.), customized settings (and/or permissions, user types, etc.), and/ or settings (and/or permissions, user types, etc.) that are dynamically adjusted based on the user 10, 20 (e.g., user activity, user history, user type, user permissions, user's manual settings, etc.). In this regard, users 10, 20 having the same settings (and/or permissions, user types, etc.) may receive the same inadequate trading records displayed in the Confirm to Screen section of the user's system (which may be a part of, in communication with, and/or connected to the processing platform 150 and/or one or more other elements of the processor 200); and users 10, 20 having different settings (and/or permissions, user types, etc.) may receive different inadequate trading records displayed in the Confirm to Screen section of the user's system.

Alternatively or in addition, the trading record processor 260 is configurable or configured to receive selected trading records from the confidence indicia processor 250 (e.g., from the confidence indicia comparator 258) and/or the candidate trading record processor 240. The trading record processor 260 is then configurable or configured to display the selected trading records to users 10, 20 and/or platforms 10, 20 in a main section (i.e., a section, as displayed by the trading record processor 260, that displays only trading records that meet a minimum threshold or level of accuracy and/or completeness (e.g., above a threshold confidence indicia (as generated by the threshold confidence indicia generator 256)), as described in the present disclosure; see, for example, FIG. 10). The trading record processor 260 may display the selected trading records in the main section based on the ranking and/or grouping performed by the trading record ranking processor 270 and/or based on the confidence indicias generated by the confidence indicia processor 250. In this regard, the rankings, groupings, and/or confidence indicias may be represented by different background colors, different font colors, different font size, different font types, symbols, numerical values (e.g., confidence scores), etc. In an example embodiment, each user 10, 20 may be configurable or configured with default settings (and/or permissions, user types, etc.), customized settings (and/or permissions, user types, etc.), and/or settings (and/or permissions, user types, etc.) that are dynamically adjusted based on the user 10, 20 (e.g., user activity, user history, user type, user permissions, user's manual settings, etc.). In this regard, users 10, 20 having the same settings (and/or permissions, user types, etc.) may receive the same selected trading records displayed in the main section of the user's system; and users 10, 20 having different settings (and/or permissions, user types, etc.) may receive different selected trading records displayed in the main section of the user's system.

The selected trading records displayed in the main section may be non-actionable (e.g., displayed as information only), actioned (e.g., an action pertaining to the trading record has already occurred), or actionable (e.g., allows a user to perform a trading action (e.g., buy, sell, bid, and/or ask) or other action (e.g., expand for more information, request more information, contact the representative user 10, etc.). Alternatively or in addition, the trading record processor 260 may also provide selected trading records to other sources 30. In example embodiments where the confidence indicia for a candidate trading record (or selected trading record) is re-generated (e.g., periodically, continuously, intermittently, and/or dynamically, as described above and in the present disclosure) and the candidate trading record (or selected trading record) is selected (or re-selected) by the confidence indicia comparator 258 (as described above and in the present disclosure), the trading record processor 260 is configurable or configured to display or re-display the selected trading records in the main section, including the displaying of newly selected trading records; re-selected trading records; and those selected trading records that were previously displayed by the trading record ranking processor 270.

Alternatively or in addition, the trading record processor 260 is configurable or configured to receive ranked and/or grouped selected trading records from the trading record ranking processor 270 and display the ranked and/or grouped selected trading records to users 10, 20 and/or platforms 10, 20 in a main section. Alternatively or in addition, the trading record processor 260 may also provide ranked and/or grouped selected trading records to other sources 30.

Example Embodiments of a Method of Managing Trades and/or Trading Information (e.g., Method 600).

Figure 6:
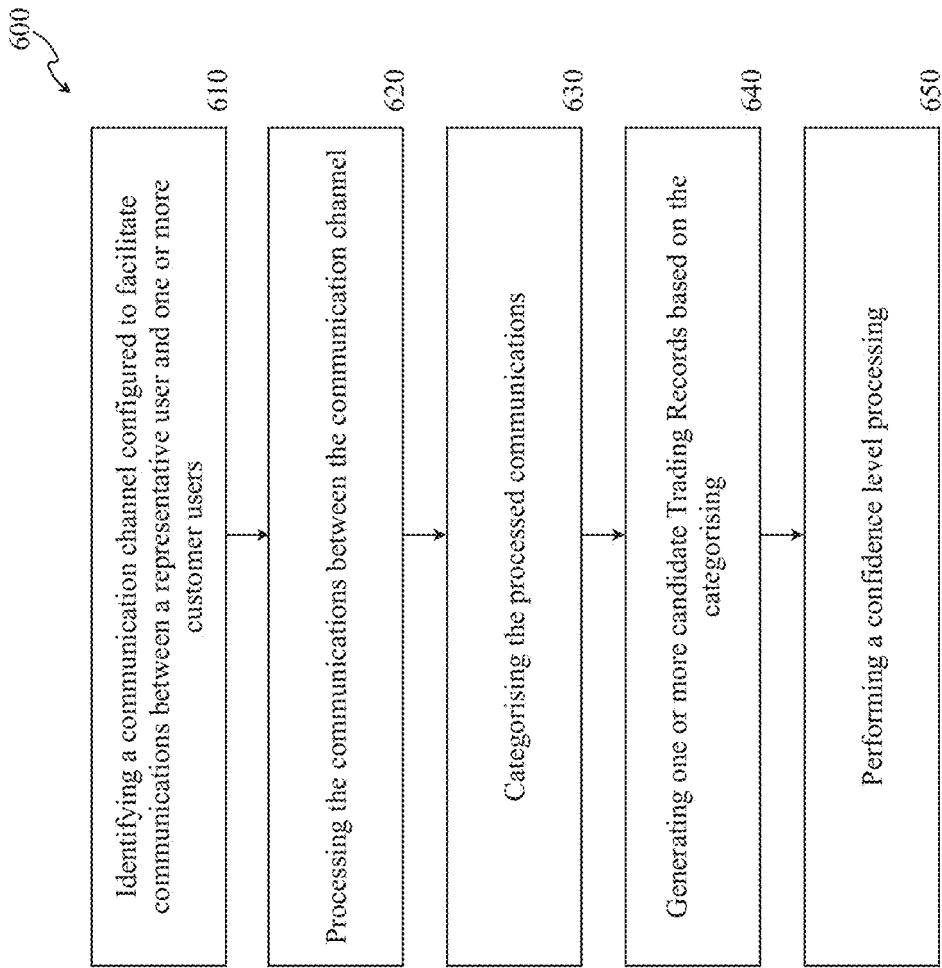
FIG. 6 is an illustration of an example embodiment of a method of managing trading information.
Figure 7:
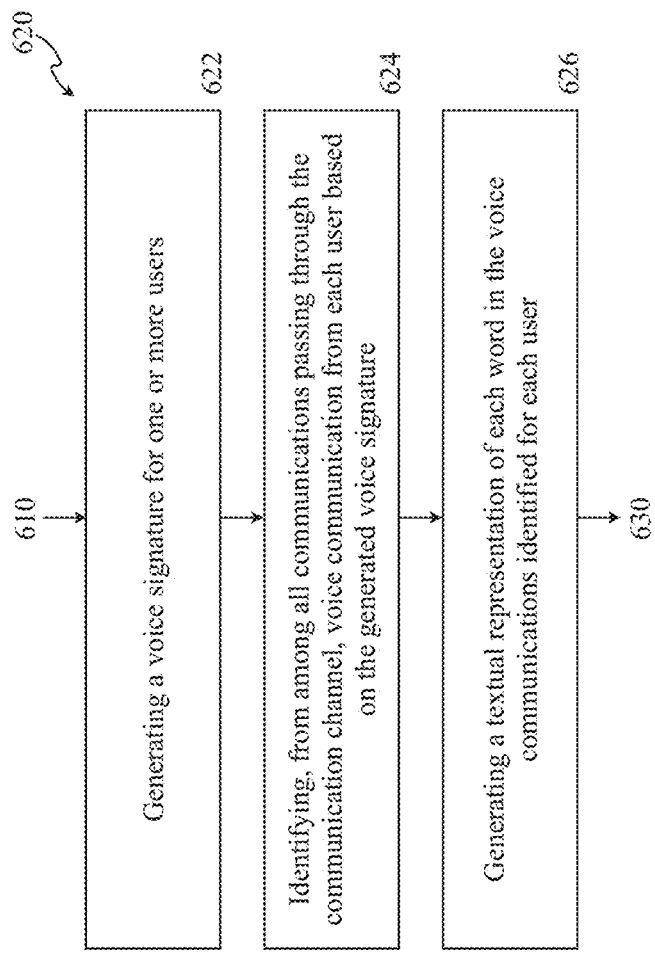
FIG. 7 is an illustration of an example embodiment of processing communications communicated on a communication channel.
Figure 8:
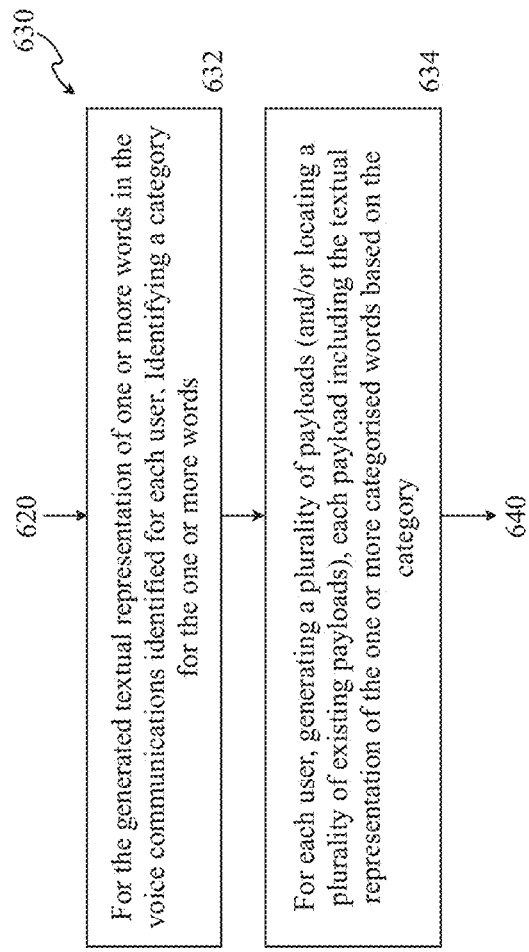
FIG. 8 is an illustration of an example embodiment of categorizing communications.

An example embodiment of a method (e.g., method 600) of managing trades and/or trading information is illustrated in FIG. 6. The method 600 includes identifying a communication channel (e.g., action 610). The communication channel may be configured to facilitate communications (e.g., voice communications, text communications, etc.) between a user (e.g., a representative user) and one or more other users (e.g., one or more customer user). The method 600 also includes processing communications (e.g., voice communications, text communications, etc.) communicated on the communication channel (e.g., action 620). The method 600 also includes categorizing the communications (e.g., action 630). The method 600 also includes generating one or more candidate trading records based on the categorizing of the communications (e.g., action 640). The method 600 also includes performing a confidence level processing for each candidate trading record (e.g., action 650).

These and other processes and/or actions of the method 600 will now be further described with reference to the accompanying figures.

Identifying a Communication Channel (e.g., Action 610).

In an example embodiment, the method of managing trades and/or trading information 600 includes identifying a communication channel (e.g., action 610). An example communication channel 40 is illustrated in FIG. 1. The communication channel may be configured to facilitate communications between users, including a representative user (e.g., a broker, trader, etc.) and one or more customer users (and/or between representative users; and/or between customer users). Such communications may be in any form including, but not limited to, multi-party voice and/or textual communications (e.g., each user can receive and send communications), broadcast voice and/or textual communications (e.g., one user sends communications to multiple users, and such multiple users can either receive only or communicate back), one-to-many voice and/or textual communications (e.g., one user has multiple single communication channel connections, with each single communication channel facilitating communications with a single user, and with each single communication channel facilitating either bi-directional communications or one-way communications), etc.

As illustrated in FIG. 2 and further described in the present disclosure, an example embodiment of the communication channel processor 210 is configurable or configured to identify one or more communication channels.

Processing the Communications Communicated on the Communication Channel (e.g., Action 620).

In an example embodiment, the method of managing trades and/or trading information 600 includes processing communications communicated on or via (or passing through) the communication channel (e.g., action 620). Such processing includes receiving, requesting, obtaining, pulling, extracting, and/or intercepting voice, video, and/or textual communications communicated on or via (or passing through) the communication channel. Such processing may also include generating a voice signature for one or more users (when communications are audio/voice and/or video communications) (e.g., action 622), identifying voice communications from each user based on the generated voice signatures (when communications are audio/voice and/or video communications) (e.g., action 624), and generating a textual representation of each word in the voice communications identified for each user (when communications are audio/voice and/or video communications) (e.g., action 626), as further described below. In example embodiments where the communications received, requested, obtained, pulled, extracted, and/or intercepted from the communication channel are textual communications, then voice-related processing will not be required. In such example embodiments, the method may include identifying the one or more users who communicated the textual communications.

As illustrated in FIGS. 2 and 3 and further described in the present disclosure, an example embodiment of the communication channel processor 210 and the user communications processor 220 are configurable or configured to perform the processing of communications communicated on one or more communication channels.

Generating a Voice Signature for One or More Users (e.g., Action 622).

For communication channels that are voice communication channels (e.g., a digital or analog telephone or voice call, VoIP call, voice message sent via instant/text messaging, etc.) and/or include voice communications (e.g., a video call, video message sent via instant/text messaging, etc.), an example embodiment of the processing of communications communicated on one or more communication channels 620 includes performing a voice signature processing (and/or obtaining a historic or already processed voice signature; and/or obtaining a voice signature from an external source; and/or not performing a voice signature processing at all, such as via text-only communications (e.g., instant messaging, etc.); and/or identify one or more users from static channel mapping, names of accounts, information received from APIs and/or external sources, etc.) of the communications communicated on the communication channel. The voice signature processing may include generating and/or obtaining a voice signature for one or more users (e.g., action 622) who are communicating on one or more communication channels, including a voice signature for one or more representative users and/or a voice signature for one or more customer users.

As illustrated in FIG. 3, an example embodiment of the voice signature processor 222 is configurable or configured to perform the voice signature processing.

Identifying Voice Communications from Each User Based on the Generated Voice Signatures (e.g., Action 624).

In an example embodiment, the processing of communications communicated on one or more communication channels 620 includes identifying voice communications from each user based on the generated voice signatures (e.g., action 624). More specifically, the voice signatures may be used to identify, from among voice communications passing through the one or more communication channels, voice communications from specific users. Example voice signatures include representative user voice signatures used to identify, from among all voice communications passing through the one or more communication channels, representative user voice communications (or voice communications made by a representative user); first customer user voice signatures used to identify, from among all voice communications passing through the one or more communication channels, first customer user voice communications (or voice communications made by a first customer user); second customer user voice signatures used to identify, from among all voice communications passing through the one or more communication channels, second customer user voice communications (or voice communications made by a second customer user); and so on).

In identifying voice communications, the method 600 may include matching, linking, associating, attributing, grouping, and/or correlating voice communications (and/or other communications) received from the communication channel with, to, or for particular users. Such identifying, matching, linking, associating, attributing, grouping, and/or correlating also includes associating a timestamp to each voice communication (e.g., each word), where such timestamp represents a date and time when the voice communication (e.g., each word) was communicated by the user. In example embodiments, action 624 may also include generating a textual representation of voice/audio communications.

As illustrated in FIG. 3, an example embodiment of the voice communication identifer 224 is configurable or configured to perform the identifying of voice communications.

Generating a Textual Representation of Each Word in the Voice Communications Identified for Each User (e.g., Action 626).

In an example embodiment, the processing of communications communicated on one or more communication channels 620 includes generating a textual representation of one or more words in the voice communications identified for each user (e.g., action 626).

Categorizing the communications (e.g., action 630).

In an example embodiment, the method of managing trades and/or trading information 600 includes categorizing the communications received from the communication channel (e.g., action 630). Such categorizing may include identifying a category for textual representations of one or more words in the communications identified for each user (e.g., action 632) and generating a plurality of payloads for each user (e.g., action 634), as further described below.

As illustrated in FIGS. 2 and 3 and further described in the present disclosure, an example embodiment of the categorization processor 230 is configurable or configured to perform the categorizing of communications communicated on one or more communication channels.

Identifying a Category for Textual Representations of One or More Words in the Communications Identified for Each User (e.g., Action 632).

In an example embodiment, the method of categorizing the communications 630 includes identifying a category for textual representations of one or more words in the communications identified for each user (e.g., action 632).

In identifying the categories for communications, the method 600 includes performing, for each identified user in the communications communicated on the communication channel, a categorizing of one or more words from the identified communications (e.g., a grouping of one or more words, along with associated timestamps, from the identified communications that fall within specific categories). In example embodiments, such categorizing is performed using categories pertaining to trading information. Potentially relevant trading information categories may include, but are not limited to, trading actions, trading quantities, trading prices, trading instruments, relevant trading dates (e.g., expiries such as contract expiries), user types, status of prices (e.g., degree of firmness), source of prices (e.g. the identity of a customer user who initiated them), etc.

In addition to trading information categories, the categorizing may include categorizing based on, among other things, one or more of the following: the user who made the communications; the user(s) who is/are receiving the communications; and/or a corresponding timestamp representing a date and time (or just a time) when such identified communications was made/communicated by the user. In example embodiments, the categorizing may also be based on historic considerations; information pertaining to one or more of the users; and/or other information sources. For example, in a situation where the categorizing is unable to identify/categorize potentially missing information (e.g., words and/or numeric quantities) that should have been received and/or categorized along with certain other categorized communications, the method 600 may include searching one or more databases (e.g., database storing historic and/or current communications, database storing historic and/or current candidate trading records, database storing historic and/or current selected trading records, database storing historic and/or current confidence indicias, database storing historic and/or current trading record ranking results, etc.) and/or searching/requesting for historic and/or current information from one or more information sources in order to supplement such missing information.

Generating a Plurality of Payloads for Each User (e.g., Action 634).

After the categorizing of identified communications, the method 600 further includes generating one or more information payloads for each user (e.g., action 634). The generating of one or more information payloads for one or more users may be based on, among other things, the identified voice communications (e.g., representative user voice communications, first user voice communications, second user voice communications, etc.) and predetermined categorizations.

For example, for representative user voice communications, the method 600 may include generating a first representative user payload. Such first representative user payload may include a textual representation of words from the representative user voice communications that pertain to the category of "trading actions", along with corresponding timestamps representing a date and time (or just a time) when the communicated word(s) from the representative user was/were received. As another example, the method 600 may include generating a second representative user payload. Such second representative user payload may include a textual representation of words from the representative user voice communications that pertain to the category of "trading prices", along with corresponding timestamps representing a date and time (or just a time) when the communicated word(s) from the representative user was/were received. As another example, the method 600 may include a third representative user payload. Such third representative user payload may include a textual representation of words from the representative user voice communications that pertain to the category of "trading quantities", along with corresponding timestamps representing a date and time (or just a time) when the communicated word(s)

from the representative user was/were received. As another example, the method 600 may include generating other representative user payloads. Such other representative user payloads may include a textual representation of words from the representative user voice communications that pertain to other potentially relevant categories such as trading instruments, relevant trading dates (e.g., expiries such as contract expiries), user types, status of prices (e.g., degree of firmness), source of prices (e.g. the identity of a customer user who initiated them), etc., along with corresponding timestamps representing a date and time (or just a time) when the communicated word(s) from the representative user was/were received.

As another example, for first customer user voice communications, the method may include generating a first first customer user payload. Such first first customer user payload may include a textual representation of words from the first customer user voice communications that pertain to the category of "trading actions", along with corresponding timestamps representing a date and time (or just a time) when the communicated word(s) from the first customer user was/were received. As another example, the method 600 may include generating a second first customer user payload. Such second first customer user payload may include a textual representation of words from the first customer user voice communications that pertain to the category of "trading prices", along with corresponding timestamps representing a date and time (or just a time) when the communicated word(s) from the first customer user was/were received. As another example, the method 600 may include generating a third first customer user payload. Such third first customer user payload may include a textual representation of words from the first customer user voice communications that pertain to the category of "trading quantities", along with corresponding timestamps representing a date and time (or just a time) when the communicated word(s) from the first customer user was/were received. As another example, the method 600 may include generating other first customer user payloads. Such other first customer user payloads may include a textual representation of words from the first customer user voice communications that pertain to other potentially relevant categories such as trading instruments, relevant trading dates (e.g., expiries such as contract expiries), user types, status of prices (e.g., degree of firmness), source of prices (e.g. the identity of a customer user who initiated them), etc., along with corresponding timestamps representing a date and time (or just a time) when the communicated word(s) from the first customer user was/were received.

As another example, for second customer user voice communications, the method 600 may include generating a first second customer user payload. Such first second customer user payload may include a textual representation of words from the second customer user voice communications that pertain to the category of "trading actions", along with corresponding timestamps representing a date and time (or just a time) when the communicated word(s) from the second user was/were received. As another example, the method 600 may include generating a second second customer user payload. Such second second customer user payload may include a textual representation of words from the second customer user voice communications that pertain to the category of "trading prices", along with corresponding timestamps representing a date and time (or just a time) when the communicated word(s) from the second customer user was/were received. As another example, the method 600 may include generating a third second customer user payload. Such third second customer user payload may include a textual representation of words from the second customer user voice communications that pertain to the category of "trading quantities", along with corresponding timestamps representing a date and time (or just a time) when the communicated word(s) from the second customer user was/were received. As another example, the method 600 may include generating other second customer user payloads. Such other second customer user payloads may include a textual representation of words from the second customer user voice communications that pertain to other potentially relevant categories such as trading instruments, relevant trading dates (e.g., expiries such as contract expiries), user types, status of prices (e.g., degree of firmness), source of prices (e.g. the identity of a customer user who initiated them), etc., along with corresponding timestamps representing a date and time (or just a time) when the communicated word(s) from the second customer user was/were received.

In yet another example, for third customer user voice communications, the method 600 may include generating a first third customer user payload. Such first third customer user payload may include a textual representation of words from the third customer user voice communications that pertain to the category of "trading actions", along with corresponding timestamps representing a date and time (or just a time) when the communicated word(s) from the third customer user was/were received. As another example, the method 600 may include generating a second third customer user payload. Such second third customer user payload may include a textual representation of words from the third customer user voice communications that pertain to the category of "trading prices", along with corresponding timestamps representing a date and time (or just a time) when the communicated word(s) from the third customer user was/were received. As another example, the method 600 may include generating a third third customer user payload. Such third third customer user payload may include a textual representation of words from the third customer user voice communications that pertain to the category of "trading quantities", along with corresponding timestamps representing a date and time (or just a time) when the communicated word(s) from the third customer user was/were received. As another example, the method 600 may include generating other third customer user payloads. Such other third customer user payloads may include a textual representation of words from the third customer user voice communications that pertain to other potentially relevant categories such as trading instruments, relevant trading dates (e.g., expiries such as contract expiries), user types, status of prices (e.g., degree of firmness), source of prices (e.g. the identity of a customer user who initiated them), etc., along with corresponding timestamps representing a date and time (or just a time) when the communicated word(s) from the third customer user was/were received.

It is to be understood in the present disclosure that the generating of information payloads, including those described above and in the present disclosure, may also be based on other information sources including, but not limited to, historic information (e.g., as stored in databases), current information (e.g., as stored in databases and/or as received via networks and/or communication channels), and/or other information sources (e.g., exchanges, price reporting agencies, live e-orders, and other information sources).

As illustrated in FIGS. 2 and 3 and further described in the present disclosure, an example embodiment of the categorization processor 230, including the categorizer 231, trading action payload generator 232, trading price payload generator 234, trading quantity payload generator 236, and other information payload generator 238, ae configurable or configured to perform the categorizing of communications communicated on one or more communication channels and generating of payloads.

Generating One or More Candidate Trading Records (e.g., Action 640).

In an example embodiment, the method of managing trades and/or trading information 600 includes generating one or more candidate trading records (e.g., action 640). The generating of each candidate trading record may be based on a selection of one or more words from one or more of the information payloads described above for action 630 and in the present disclosure. The selection of one or more of the categorized information (i.e., in each payload) may be based on one or more considerations including, but not limited to, the corresponding timestamp for each categorized information; the user who communicated the categorized information; the user(s) who is/are the recipient of the categorized information; supplemented information, as described in the present disclosure; links and/or associations, as described in the present disclosure; historic and/or current communications; historic and/or current candidate trading records; historic and/or current selected trading records; historic and/or current confidence indicias; historic and/or current trading record ranking results; historic and/or current information from one or more information sources; etc.

For example, the method 600 may include generating a first candidate trading record based on a selection of one or more words from one or more first representative user payloads (pertaining to trading actions) and/or a selection of one or more words from one or more second representative user payloads (pertaining to trading prices). Such first candidate trading record may be generated pursuant to representative user voice communications (e.g., a broker who communicates trade information to one or more customer users via voice). Alternatively or in addition, such first candidate trading record may be generated based on a selection of one or more words from one or more first representative user payloads (pertaining to trading actions) and/or a selection of one or more words from one or more second representative user payloads (pertaining to trading actions) and/or a selection of one or more words from one or more third representative user payloads (pertaining to trading quantities) and/or a selection of one or more words from one or more other representative user payloads (pertaining to other information).

As another more specific example, the method 600 may include generating a second candidate trading record based on a selection of one or more words from one or more first first customer user payloads (pertaining to trading actions) and/or a selection of one or more words from one or more second first customer user payloads (pertaining to trading prices). Such second candidate trading record may be generated pursuant to first customer user voice communications (e.g., a first customer user who communicates trade information to one or more representative users via voice). Alternatively or in addition, such second candidate trading record may be generated based on a selection of one or more words from one or more first first customer user payloads (pertaining to trading actions) and/or a selection of one or more words from one or more second first customer user payloads (pertaining to trading prices) and/or a selection of one or more words from one or more third first customer user payloads (pertaining to trading quantities) and/or a selection of one or more words from one or more other first customer user payloads (pertaining to other information).

As another more specific example, the method 600 may include generating a third candidate trading record based on a selection of one or more words from one or more first second customer user payloads (pertaining to trading actions) and/or a selection of one or more words from one or more second second customer user payloads (pertaining to trading prices). Such third candidate trading record may be generated pursuant to second customer user voice communications (e.g., a second customer user who communicates trade information to one or more representative users via voice). Alternatively or in addition, such third candidate trading record may be generated based on a selection of one or more words from one or more first second customer user payloads (pertaining to trading actions) and/or a selection of one or more words from one or more second second customer user payloads (pertaining to trading prices) and/or a selection of one or more words from one or more third second customer user payloads (pertaining to trading quantities) and/or a selection of one or more words from one or more other second customer user payloads (pertaining to other information).

As illustrated in FIG. 2 and further described in the present disclosure, an example embodiment of the candidate trading record processor 240 is configurable or configured to perform the generating of one or more candidate trading records.

Performing a Confidence Level Processing for Each Candidate Trading Record (e.g., Action 650).

In an example embodiment, the method of managing trades and/or trading information 600 includes performing a confidence level processing for each candidate trading record (e.g., action 650). The confidence level processing may include selecting one or more candidate trading records from among a plurality of candidate trading records generated. Such selecting may be based on certain minimum conditions (e.g., minimum degree of completeness).

The confidence level processing may further include, for each selected candidate trading record, generating a confidence indicia for each candidate trading record. As described in the present disclosure, the confidence indicia of a candidate trading record represents a level of confidence of and/or score representing an accuracy and/or completeness of the candidate trading record (and/or a measure or indication of an accuracy and/or completeness of the candidate trading record).

The confidence indicia for each candidate trading record may represent and/or be based on and/or include a consideration of a level of confidence and/or score representing an accuracy of the quality of the voice communication received and/or obtained from the communication channel 40. Alternatively or in addition, the confidence indicia for each candidate trading record may represent and/or be based on and/or include a consideration of a level of confidence and/or score representing an accuracy of one or more generated voice signatures used for generating the candidate trading record. Alternatively or in addition, the confidence indicia for each candidate trading record may represent and/or be based on and/or include a consideration of a level of confidence and/or score representing an accuracy of one or more generated textual representations of the words used for generating the candidate trading record. Alternatively or in addition, the confidence indicia for each candidate trading record may represent and/or be based on and/or include a consideration of a level of confidence and/or score representing an accuracy of the categorizing of one or more words used for generating the candidate trading record. Alternatively or in addition, the confidence indicia for each candidate trading record may represent and/or be based on and/or include a consideration of a level of confidence and/or score representing an accuracy of one or more generated information payloads used for generating the candidate trading record. Alternatively or in addition, the confidence indicia for each candidate trading record may represent and/or be based on and/or include a consideration of a level of confidence and/or score representing an accuracy of the selecting of one or more words from one or more information payloads used for generating the candidate trading record. Alternatively or in addition, the confidence indicia for each candidate trading record may represent and/or be based on and/or include a consideration of a level of confidence and/or score representing an accuracy of the timestamp of the one or more words in the information payloads used for generating the candidate trading record. Alternatively or in addition, the confidence indicia for each candidate trading record may represent and/or be based on and/or include a consideration of a level of confidence and/or score representing an accuracy of generated supplemented words (e.g., words generated to supplement missing words) used for generating the candidate trading record. Alternatively or in addition, the confidence indicia for each candidate trading record may represent and/or be based on and/or include a consideration of a level of confidence and/or score representing an accuracy of linking and/or associating categorized and/or supplemented words to other categorized and/or supplemented words, which were used for generating the candidate trading record; and/or a level of confidence of an accuracy of linking and/or associating one or more words in the information payloads to one or more other words in one or more other information payloads. Alternatively or in addition, the confidence indicia for each candidate trading record may represent and/or be based on and/or include a consideration of a level of confidence and/or score representing an accuracy of the ranking of the candidate trading record (e.g., relative to other candidate trading records, as further described in the present disclosure). As another example, the confidence indicia for each candidate trading record may represent and/or be based on and/or include a consideration of a level of confidence and/or score representing an accuracy of the arranging, grouping, stacking, filtering, comparing, and/or ordering of the candidate trading record (e.g., relative to and/or with other candidate trading records, as further described in the present disclosure).

The confidence indicia for each candidate trading record may represent and/or be based on and/or include a consideration of a level of confidence and/or score representing a completeness of the voice communication received and/or otherwise obtained from the communication channel 40 used to generate the candidate trading record. Alternatively or in addition, the confidence indicia for each candidate trading record may represent and/or be based on and/or include a consideration of a level of confidence and/or score representing a completeness of one or more generated voice signatures used for generating the candidate trading record. Alternatively or in addition, the confidence indicia for each candidate trading record may represent and/or be based on and/or include a consideration of a level of confidence and/or score representing a completeness of one or more generated textual representations of the words used for generating the candidate trading record. Alternatively or in addition, the confidence indicia for each candidate trading record may represent and/or be based on and/or include a consideration of a level of confidence and/or score representing a completeness of the categorizing of one or more words used for generating the candidate trading record. Alternatively or in addition, the confidence indicia for each candidate trading record may represent and/or be based on and/or include a consideration of a level of confidence and/or score representing a completeness of one or more generated information payloads used for generating the candidate trading record. Alternatively or in addition, the confidence indicia for each candidate trading record may represent and/or be based on and/or include a consideration of a level of confidence and/or score representing a completeness of the words selected and/or selectable from one or more information payloads used for generating the candidate trading record. Alternatively or in addition, the confidence indicia for each candidate trading record may represent and/or be based on and/or include a consideration of a level of confidence and/or score representing a completeness of the timestamp of the one or more words in the information payloads used for generating the candidate trading record. Alternatively or in addition, the confidence indicia for each candidate trading record may represent and/or be based on and/or include a consideration of a level of confidence and/or score representing a completeness of generated supplemented words (e.g., words generated to supplement missing words) used for generating the candidate trading record. Alternatively or in addition, the confidence indicia for each candidate trading record may represent and/or be based on and/or include a consideration of a level of confidence and/or score representing a completeness of linking and/or associating categorized and/or supplemented words to other categorized and/or supplemented words, which were used for generating the candidate trading record; and/or a level of confidence of a completeness of linking and/or associating one or more words in the information payloads to one or more other words in one or more other information payloads. Alternatively or in addition, the confidence indicia for each candidate trading record may represent and/or be based on and/or include a consideration of a level of confidence and/or score representing a completeness of the ranking of the candidate trading record (e.g., relative to other candidate trading records, as further described in the present disclosure). As another example, the confidence indicia for each candidate trading record may represent and/or be based on and/or include a consideration of a level of confidence and/or score representing a completeness of the arranging, grouping, stacking, filtering, comparing, and/or ordering of the candidate trading record (e.g., relative to and/or with other candidate trading records, as further described in the present disclosure).

The confidence indicia for each candidate trading record may represent and/or be based on and/or include a consideration of a level of confidence and/or score representing the source of the trading information used to generate the candidate trading record (e.g., reliability, credibility, quality, accuracy, completeness, and/or the like, of the source of the trading information that is used to generate the candidate trading information; and/or reliability, credibility, quality, accuracy, completeness, and/or the like, of the trading information received from the source).

The confidence indicia for each candidate trading record may represent and/or be based on and/or include a consideration of a level of confidence and/or score representing a temporal aspect or temporal nature of the trading information used to generate the candidate trading record (e.g., how current, recent, relevant, updated, not outdated, and/or the like, is the trading information in the candidate trading record; which may be based on a temporal aspect of the trading information, such as a time and/or date of trade, real-time or delayed nature of the trading information, timestamp, etc.). In an example embodiment, new, additional, updated, adjusted, replacement, and/or re-calculated confidence indicias for one or more candidate trading records (and/or selected trading records) may be generated and/or re-generated (e.g., if a confidence indicia was already previously generated for the candidate trading record (or selected trading record)) either periodically, continuously, intermittently, and/or dynamically (e.g., upon the occurrence of an event, such as upon receiving one or more other/newer (e.g., more recent timestamp) candidate trading records (or selected trading records); upon an expiry such as a contract expiry; upon a comparison with one or more other candidate trading records (or selected trading records), etc.). Such generating and/or re-generating enables the updating, adjusting, re-calculating, re-assessing, re-scoring, re-ranking, re-grouping, and/or the like, of one or more confidence indicias for one or more candidate trading records (and/or selected trading records) based on, among other things, date/time considerations and/or relative to one or more other candidate trading records (and/or selected trading records). It is recognized in the present disclosure that such generating and/or re-generating of confidence indicias for one or more candidate trading record (and/or selected trading record), either periodically, continuously, intermittently, and/or dynamically, enables the analyzing, ranking, grouping, subgrouping, and/or displaying (e.g., to users, and/or sharing to one or more other processors, platforms, and/or the like) relevant, up-to-date, real-time (or near real-time), and accurate trading records.

In an example embodiment, the method 600 may include generating a first confidence indicia for a first candidate trading record. The first confidence indicia may represent a level of confidence and/or score of the first candidate trading record. For example, the first confidence indicia may represent a level of confidence of and/or score representing an accuracy of the first candidate trading record (e.g., quality of the voice communication received and/or captured from the communication channel, accuracy of the voice signature, accuracy of the categorizing, accuracy of the generating of the payloads, accuracy of the generating of the textual representations in the payloads, accuracy of the generating of the candidate trading records, accuracy of the generating of the confidence indicias, etc.). Alternatively or in addition, the first confidence indicia may represent a level of confidence of and/or score representing a completeness of the first candidate trading record (e.g., completeness of the information in the first candidate trading record, etc.).

The method 600 may also include generating a second confidence indicia for a second candidate trading record. The second confidence indicia may represent a level of confidence and/or score of the second candidate trading record. For example, the second confidence indicia may represent a level of confidence of and/or score representing an accuracy of the second candidate trading record (e.g., quality of the voice communication received and/or captured from the communication channel, accuracy of the voice signature, accuracy of the categorizing, accuracy of the generating of the payloads, accuracy of the generating of the textual representations in the payloads, accuracy of the generating of the candidate trading records, accuracy of the generating of the confidence indicias, etc.). Alternatively or in addition, the second confidence indicia may represent a level of confidence of and/or score representing a completeness of the second candidate trading record (e.g., completeness of the information in the second candidate trading record, etc.).

The method 600 may also include generating a third confidence indicia for the third candidate trading record. The third confidence indicia may represent a level of confidence and/or score of the third candidate trading record. For example, the third confidence indicia may represent a level of confidence of and/or score representing an accuracy of the third candidate trading record (e.g., quality of the voice communication received and/or captured from the communication channel, accuracy of the voice signature, accuracy of the categorizing, accuracy of the generating of the payloads, accuracy of the generating of the textual representations in the payloads, accuracy of the generating of the candidate trading records, accuracy of the generating of the confidence indicias, etc.). Alternatively or in addition, the third confidence indicia may represent a level of confidence of and/or score representing a completeness of the third candidate trading record (e.g., completeness of the information in the third candidate trading record, etc.).

It is recognized in the present disclosure that one or more of the above conditions/considerations for generating a confidence indicia for each candidate trading record may be weighted and/or valued the same or differently as compared to one or more of the other conditions/considerations. Alternatively, all of the above conditions/considerations may be weighted or valued equally in other example embodiments. Alternatively, the weighting and/or value of one or more of the above conditions/considerations may be dynamically determined based on the candidate trading record.

After a confidence indicia is generated for a candidate trading record, the method 600 further includes generating and/or selecting a threshold confidence indicia for the candidate trading record. Such threshold confidence indicia may be a predetermined, already generated, or default threshold confidence indicia. Alternatively, the threshold confidence indicia may be dynamically generated based on one or more of the following: (1) based on the selected candidate trading record (e.g., candidate trading records that meet a minimum degree of completeness; candidate trading records that are not inadequate trading records; etc.); and/or (2) based on user-edited trading records (e.g., trading records that have been edited by a user pursuant to being displayed in a Confirm to Screen, as described above and in the present disclosure); and/or (3) based on the confidence indicia generated for the candidate trading record.

The method 600 further includes selecting one or more trading records (each a selected trading record) from among the received candidate trading records based on the confidence indicia and the threshold confidence indicia. More specifically, for each candidate trading record, when the confidence indicia of the candidate trading record is greater than or equal to the threshold confidence indicia, the candidate trading record is selected for displaying in the main section. On the other hand, when the confidence indicia of the candidate trading record is less than the threshold confidence indicia, the candidate trading record is displayed in the Confirm to Screen section (or discarded).

In situations where a candidate trading record is not selected for further processing (e.g., those that do not receive a confidence indicia; and may also include those having a confidence indicia below a threshold confidence indicia value), such candidate trading record may be displayed in the Confirm to Screen section (as described in the present disclosure) or discarded or not displayed to users at all. As described in the present disclosure, the Confirm to Screen (and the main section) may be displayed to users who have access and/or subscribe to a service, website, application, or the like, that receives and displays trading information. In this regard, the Confirm to Screen section is an editable section that allows one or more users to edit inadequate trading records that are displayed in such section (and/or vote on, approve, disapprove, discard, etc. such trading records).

In an example embodiment, the method 600 may process inadequate trading records that have been edited by user(s) after being displayed in the Confirm to Screen section (or user-edited trading records) in one or more ways. For example, the user-edited trading records may be re-checked to see whether it should be selected for further processing. The method 600 may also include generating a confidence indicia for the user-edited trading record. The method 600 may also include ranking and/or grouping the user-edited trading record before displayed the user-edited trading record in the main section (as described in the present disclosure).

As illustrated in FIGS. 2 and 5 and further described in the present disclosure, an example embodiment of the confidence indicia processor 250, including the candidate trading record selector 252, the confidence indicia generator 254, the threshold confidence indicia generator 256, and the confidence indicia comparator 258, are configurable or configured to perform the confidence level processing for each candidate trading record.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, "communication," "communicate," "connection," "connect," "call," "calling," or other similar terms should generally be construed broadly to mean a wired, wireless, and/or other form of, as applicable, connection between elements, devices, computing devices, telephones, processors, controllers, servers, networks, telephone networks, the cloud, and/or the like, which enable voice and/or data to be sent, transmitted, broadcasted, received, intercepted, acquired, and/or transferred (each as applicable).

As another example, "user," "candidate user," "selected user," "final user," or similar terms should generally be construed broadly to mean a user, either registered or unregistered, who has been selected by one or more elements of the processor (e.g., processor 150), and such user may be a selected user subject to further processing by one or more elements of the processor or a selected user who will receive an offer (e.g., via a notification) to receive distributed ledger data (e.g., digital tokens, cryptocurrency, etc.).

Also, as referred to herein, a processor, device, computing device, telephone, phone, server, gateway server, communication gateway server, and/or controller, may be any processor, computing device, and/or communication device, and may include a virtual machine, computer, node, instance, host, or machine in a networked computing environment. Also as referred to herein, a network or cloud may be or include a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

Database (or memory or storage) may comprise any collection and/or arrangement of volatile and/or non-volatile components suitable for storing data. For example, memory may comprise random access memory (RAM) devices, read-only memory (ROM) devices, magnetic storage devices, optical storage devices, solid state devices, and/or any other suitable data storage devices. In particular embodiments, database may represent, in part, computer-readable storage media on which computer instructions and/or logic are encoded. Database may represent any number of memory components within, local to, and/or accessible by a processor and/or computing device.

Various terms used herein have special meanings within the present technical field. Whether a particular term should be construed as such a "term of art" depends on the context in which that term is used. Such terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method of managing trading information, the method comprising:

identifying, by a communication channel processor, a voice communication channel between a representative user and one or more customer users, the voice communication channel being a communication channel carrying voice communications between the representative user and the one or more customer users;

receiving, by the communication channel processor, voice communications between the representative user and the one or more customer users communicated over the voice communication channel;

processing, by a user communications processor, the received voice communications between the representative user and the one or more customer users, the processing of the received voice communications including:
  transforming the received voice communications into textual representations of the received voice communications;
  selectively identifying, from among the textual representations of the received voice communications, only indicative price information, the indicative price information being textual representations of the received voice communications pertaining to trading information; and
  identifying, based on the received voice communications, an identity of the representative user and/or the one or more customer users;
establishing, by the communication channel processor, a second communication channel with an exchange, central limit order book (CLOB), electronic matching engine, electronic trading platform, centralized trading source, and/or centralized trading information source, the second communication channel being different from the voice communication channel;
receiving, by the communication channel processor, communications communicated over the second communication channel;
processing, by the user communications processor, the communications received from the second communication channel, the processing of the communications received from the second communication channel including:
  selectively identifying, from among the communications received from the second communication channel, only non-indicative price information, the non-indicative price information being communications received from the second communication channel pertaining to trading information;
categorizing, by a categorization processor, the indicative price information based on at least one or more of the following categories: source, trading action, trading price, trading quantity, and/or timestamp;
categorizing, by the categorization processor, the non-indicative price information based on at least one or more of the following categories: source, trading action, trading price, trading quantity, and/or timestamp;
generating, by a candidate trading record processor, a plurality of candidate trading records, the generating of the plurality of candidate trading records including:
  generating, from among the indicative price information, one or more indicative price candidate trading records, the one or more indicative price candidate trading records generated based on at least the categorized indicative price information, the generating of the one or more indicative price candidate trading records including:
    identifying missing indicative price information required to generate the one or more indicative price candidate trading records that were not categorized by the categorization processor, the identifying of the missing indicative price information based on the indicative price information that was categorized by the categorization processor;
    searching for historic and/or current information to obtain the identified missing indicative price information; and
    cooperating with the categorization processor to categorize the obtained missing indicative price information, wherein the one or more indicative price candidate trading records includes categorized obtained missing indicative price information; and
  generating, from among the non-indicative price information, one or more non-indicative price candidate trading records, the one or more non-indicative price candidate trading records generated based on the categorized non-indicative pricing information;
performing, by a confidence indicia processor, a confidence level processing, the confidence level processing including:
  generating a confidence indicia for each of the one or more indicative price candidate trading records, wherein each confidence indicia for each of the one or more indicative price candidate trading records represents a level of confidence and/or score of an accuracy, completeness, source, price, and/or temporal nature of the indicative price candidate trading record;
  generating a confidence indicia for each of the one or more non-indicative price candidate trading records, wherein each confidence indicia for each of the one or more non-indicative price candidate trading records represents a level of confidence and/or score of an accuracy, completeness, source, price, and/or temporal nature of the non-indicative price candidate trading record; and
  selecting selected candidate trading records from among the plurality of candidate trading records based on the generated confidence indicia;
ranking, by a trading record ranking processor, the plurality of selected candidate trading records, wherein the ranking is based on the following conditions:
  the one or more non-indicative price candidate trading records are ranked higher than the one or more indicative price candidate trading records when a trading price of the non-indicative price candidate trading record is equal to or better than a trading price of the indicative price candidate trading record;
  the one or more indicative price candidate trading records are ranked higher than the one or more non-indicative price candidate trading records when a trading price of the indicative price candidate trading record is better than a trading price of the non-indicative price candidate trading record;
  when ranking the one or more indicative price candidate trading records, the one or more indicative price candidate trading records are ranked based on the confidence indicia generated for the indicative price candidate trading record; and
  when ranking the one or more non-indicative price candidate trading records, the one or more non-indicative price candidate trading records are ranked based on the confidence indicia generated for the non-indicative price candidate trading record;
comparing a confidence indicium of a first candidate trading record with a first threshold confidence indicium;
comparing a confidence indicium of a second candidate trading record with the first threshold confidence indicium;
responsive to a determination that the confidence indicium of the first candidate trading record exceeds the first threshold confidence indicium, displaying the first candidate trading record at a first location on a graphical display;

responsive to a determination that the confidence indicium of the second candidate trading record does not exceed the first threshold confidence indicium, displaying the second candidate trading record at a second location on the graphical display, wherein the second location is different from the first location;

determining whether the representative user or the one or more customer users edited the first threshold confidence indicium; and responsive to a determination that the representative user or the one or more customer users edited the first threshold confidence indicium to arrive at a second threshold confidence indicium:

comparing the confidence indicium of the second candidate trading record with the second threshold confidence indicium; and moving the second candidate trading record from the second location to a third location on the graphical display when the confidence indicium of the second candidate trading record exceeds the second threshold confidence indicium, wherein the third location is different from the second location.

2. The method of claim 1, further comprising:
creating one or more groups for the selected candidate trading records based on one or more of the following:
trading instrument; and/or
relevant trading dates; and/or
user types; and/or
status of prices; and/or
source of prices; and
displaying the selected candidate trading records based on the groups.

3. The method of claim 2, further comprising:
creating one or more subgroups for one or more of the selected candidate trading records of one or more of the groups, wherein the one or more selected candidate trading records in each subgroup is displayed based on the ranking.

4. The method of claim 1, wherein one or more of the following apply:
the confidence level processing further comprises, for each of the indicative price candidate trading records:
comparing the confidence indicia for the indicative price candidate trading record with a first threshold confidence indicia; and
responsive to a determination that the confidence indicia for the indicative price candidate trading record is less than the first threshold confidence indicia:
displaying the indicative price candidate trading record to one or more users and allowing the one or more users to edit the indicative price candidate trading record;
wherein the first threshold confidence indicia is selectively generated based on user input, user settings, user type, and/or user permissions; and/or
the confidence level processing further comprises, for each of the indicative price candidate trading records:
comparing the confidence indicia for the indicative price candidate trading record with a first threshold confidence indicia; and
responsive to a determination that the confidence indicia for the indicative price candidate trading record is greater than the first threshold confidence indicia:
displaying the indicative price candidate trading record to one or more users;
wherein the first threshold confidence indicia is selectively generated based on user input, user settings, user type, and/or user permission; and/or
the confidence level processing further comprises, for each of the non-indicative price candidate trading records:
comparing the confidence indicia for the non-indicative price candidate trading record with a second threshold confidence indicia; and
responsive to a determination that the confidence indicia for the non-indicative price candidate trading record is greater than the second threshold confidence indicia:
displaying the non-indicative price candidate trading record to one or more users;
wherein the second threshold confidence indicia is selectively generated based on user input, user settings, user type, and/or user permission; and/or
the confidence indicia for the indicative price candidate trading record is selectively generated based on user input, user settings, user type, and/or user permissions; and/or
the confidence indicia for the non-indicative price candidate trading record is selectively generated based on user input, user settings, user type, and/or user permissions.

5. The method of claim 4, wherein one or more of the following apply:
the first threshold confidence indicia is dynamically generated; and/or
for each of the indicative price candidate trading records:
responsive to a determination that the indicative price candidate trading record has been edited by one or more of the users:
generating an adjusted confidence indicia for the edited indicative price candidate trading record, the adjusted confidence indicia for the edited indicative price candidate trading record being greater than the confidence indicia for the indicative price candidate trading record, wherein the ranking of the plurality of candidate trading records includes ranking the edited indicative price candidate trading record based on the adjusted confidence indicia for the edited indicative price candidate trading record; and/or
for each of the indicative price candidate trading records:
responsive to a determination that the indicative price candidate trading record has been edited by one or more of the users:
generating an adjusted confidence indicia for the edited indicative price candidate trading record;
comparing the adjusted confidence indicia for the edited indicative price candidate trading record with the first threshold confidence indicia; and
responsive to a determination that the adjusted confidence indicia for the edited indicative price candidate trading record is less than the first threshold confidence indicia:
displaying the edited indicative price candidate trading record to the one or more users and allowing the one or more users to edit the edited indicative price candidate trading record; and/or
responsive to a determination that the indicative price candidate trading record has been edited by one or more of the users:

generating an adjusted confidence indicia for the edited indicative price candidate trading record;

comparing the adjusted confidence indicia for the edited indicative price candidate trading record with the first threshold confidence indicia; and responsive to a determination that the adjusted confidence indicia for the edited indicative price candidate trading record is greater than the first threshold confidence indicia:

displaying the edited indicative price candidate trading record to the one or more users.

6. The method of claim 1, wherein the ranking of the plurality of candidate trading records further includes:

when a plurality of indicative price candidate trading records are generated and when a first group of indicative price candidate trading records includes a same trading instrument, same trading price, and same trading action, the first group of indicative price candidate trading records are ranked based on a temporal aspect of the indicative price candidate trading record, wherein a most recent indicative price candidate trading record from among the first group of indicative price candidate trading records has a highest ranking and an oldest indicative price candidate trading record from among the first group of indicative price candidate trading records has a lowest ranking.

7. The method of claim 1, wherein the information source is one or more of the following:

an exchange;
a central limit order book (CLOB);
an electronic matching engine;
a centralized trading source; and/or
a centralized trading information source.

8. The method of claim 1, further comprising:

removing one or more first ranked candidate trading records from among the plurality of candidate trading records that have already been ranked when:

one or more new candidate trading records are generated after the plurality of candidate trading records have been ranked; and one or more of the new candidate trading records have a trading price that is better than a trading price of the one or more first ranked candidate trading record.

9. The method of claim 1, further comprising:

removing a first indicative price candidate trading record from among the one or more indicative price candidate trading records when:

a new indicative price candidate trading record is generated after the plurality of candidate trading have been ranked; and the first indicative price candidate trading record and the new indicative price candidate trading record are both generated from indicative price information received from a same representative user.

10. The method of claim 1, wherein:

when ranking the one or more indicative price candidate trading records, a first indicative price candidate trading record is ranked higher than a second indicative price candidate trading record when the first indicative price candidate trading record is more recent than the second indicative price candidate trading record.

11. The method of claim 1, further comprising:

removing one or more first indicative price candidate trading records from among the one or more indicative price candidate trading records when:

the one or more first indicative price candidate trading records is for a first contract and for a first trading price;

one or more first non-indicative price candidate trading records is for the same first contract and for a second trading price; and the first trading price is different from the second trading price.

12. The method of claim 11, wherein the second trading price is better than the first trading price.

13. The method of claim 1, further comprising:

not removing a first indicative price candidate trading record from among the one or more indicative price candidate trading records when:

the first indicative price candidate trading record is for a first contract and for a first trading price, the first indicative price candidate trading record having a first timestamp;

a first non-indicative price candidate trading record is for the same first contract and for a second trading price, the first non-indicative price candidate trading record having a second timestamp;

the second trading price is better than the first trading price; and the first timestamp is more recent than the second timestamp.

14. The method of claim 1, wherein the ranking is further based on the following:

the one or more indicative price candidate trading records are ranked higher than the one or more non-indicative price candidate trading records when:

a trading time of the indicative price candidate trading record is more recent than a trading time of the non-indicative price candidate trading record; and a trading price of the indicative price candidate trading record is better than a trading price of the non-indicative price candidate trading record.

15. A method of managing trading information, the method comprising:

identifying, by a communication channel processor, a first communication channel between a representative user and one or more customer users, the first communication channel being a communication channel carrying voice communications between the representative user and the one or more customer users;

receiving, by the communication channel processor, voice communications between the representative user and the one or more customer users communicated over the first communication channel;

processing, by a user communications processor, the received voice communications between the representative user and the one or more customer users, the processing of the received voice communications including:

transforming the received voice communications into textual representations of the received voice communications;

selectively identifying, from among the textual representations of the received voice communications, only indicative price information, the indicative price information being textual representations of the received voice communications pertaining to trading information; and identifying, based on the received voice communications, an identity of the representative user and/or the one or more customer users;

establishing, by the communication channel processor, a second communication channel with an exchange, central limit order book (CLOB), electronic matching engine, electronic trading platform, centralized trading source, and/or centralized trading information source, the second communication channel different from the first communication channel;

receiving, by the communication channel processor, communications communicated over the second communication channel;

processing, by the user communications processor, the communications received from the second communication channel, the processing of the communications received from the second communication channel including:
  selectively identifying, from among the communications received from the second communication channel, only non-indicative price information, the non-indicative price information being communications received from the second communication channel pertaining to trading information;

categorizing, by a categorization processor, the indicative price information based on at least one or more of the following categories: source, trading action, trading price, trading quantity, and/or timestamp;

receiving and categorizing, by the categorization processor, the non-indicative price information from the second communication channel based on source, trading action, trading price, trading quantity, and/or timestamp;

generating, by a candidate trading record processor, a plurality of candidate trading records, the generating of the plurality of candidate trading records including:
  generating, from among the indicative price information, one or more indicative price candidate trading records, including a first indicative price candidate trading record, the one or more indicative price candidate trading records generated based on at least the categorized indicative price information, wherein each indicative price candidate trading record includes categorized textual representations pertaining to at least a trading action and a trading price, the generating of the one or more indicative price candidate trading records including:
    identifying missing indicative price information that were not categorized by the categorization processor, the identifying of the missing indicative price information based on the indicative price information that was categorized by the categorization processor;
    searching for historic and/or current information to obtain the identified missing indicative price information; and
    cooperating with the categorization processor to categorize the obtained missing indicative price information, wherein the one or more indicative price candidate trading records includes categorized obtained missing indicative price information; and
  generating, from among the non-indicative price information, one or more non-indicative price candidate trading records, including a first non-indicative price candidate trading record, the one or more non-indicative price candidate trading records generated based on the categorized non-indicative price information received from the second communication channel, wherein each non-indicative price candidate trading record includes categorized textual representations pertaining to a source, trading action, trading price, trading quantity, and timestamp of the non-indicative price candidate trading record;

performing, by a confidence indicia processor, a confidence level processing, the confidence level processing including:
  generating a confidence indicia for each of the plurality of candidate trading records, including a first confidence indicia for the first indicative price candidate trading record and a second confidence indicia for the first non-indicative price candidate trading record, wherein each confidence indicia represents a level of confidence and/or score of an accuracy, completeness, source, price, and/or temporal nature of the candidate trading record; and
  selecting selected candidate trading records from among the plurality of candidate trading records based on the generated confidence indicia;

creating, by a trading record processor, one or more groups for the plurality of selected candidate trading records, each of the one or more groups including one or more of the plurality of selected candidate trading records, wherein the one or more groups are created based on a type of trading instrument and/or relevant trading date identified for the selected candidate trading record;

for each of the one or more groups, performing, by a trading record ranking processor, a ranking of the one or more selected candidate trading records in the group, wherein the ranking is based on the following conditions:
  the first non-indicative price candidate trading record is ranked higher than the first indicative price candidate trading record when a trading price of the first non-indicative price candidate trading record is equal to or better than a trading price of the first indicative price candidate trading record;
  the first indicative price candidate trading record is ranked higher than the first non-indicative price candidate trading record when a trading price of the first indicative price candidate trading record is better than a trading price of the first non-indicative price candidate trading record;
  when a plurality of indicative price candidate trading records are generated, the plurality of indicative price candidate trading records are ranked based on the confidence indicia generated for each of the plurality of indicative price candidate trading records; and
  when a plurality of non-indicative price candidate trading records are generated, the plurality of non-indicative price candidate trading records are ranked based on the confidence indicia generated for each of the plurality of non-indicative price candidate trading records;

comparing a confidence indicium of a first candidate trading record with a first threshold confidence indicium;

comparing a confidence indicium of a second candidate trading record with the first threshold confidence indicium;

responsive to a determination that the confidence indicium of the first candidate trading record exceeds the first threshold confidence indicium, displaying the first candidate trading record at a first location on a graphical display;

responsive to a determination that the confidence indicium of the second candidate trading record does not exceed the first threshold confidence indicium, displaying the second candidate trading record at a second location on the graphical display, wherein the second location is different from the first location;
determining whether the representative user or the one or more customer users edited the first threshold confidence indicium; and
responsive to a determination that the representative user or the one or more customer users edited the first threshold confidence indicium to arrive at a second threshold confidence indicium:
comparing the confidence indicium of the second candidate trading record with the second threshold confidence indicium; and
moving the second candidate trading record from the second location to a third location on the graphical display when the confidence indicium of the second candidate trading record exceeds the second threshold confidence indicium, wherein the third location is different from the second location.

16. The method of claim 15, wherein one or more of the following apply:
the confidence level processing further comprises:
comparing the first confidence indicia for the first indicative price candidate trading record with a first threshold confidence indicia; and
responsive to a determination that the first confidence indicia for the first indicative price candidate trading record is less than the first threshold confidence indicia:
displaying the first indicative price candidate trading record to one or more users and allowing the one or more users to edit the first indicative price candidate trading record; and/or
the confidence level processing further comprises:
comparing the first confidence indicia for the first indicative price candidate trading record with a first threshold confidence indicia; and
responsive to a determination that the first confidence indicia for the first indicative price candidate trading record is greater than the first threshold confidence indicia:
displaying the first indicative price candidate trading record to one or more users;
wherein the first threshold confidence indicia is selectively generated based on user input, user settings, user type, and/or user permission; and/or
the confidence level processing further comprises:
comparing the second confidence indicia for the first non-indicative price candidate trading record with a second threshold confidence indicia; and
responsive to a determination that the second confidence indicia for the first non-indicative price candidate trading record is greater than the second threshold confidence indicia:
displaying the first non-indicative price candidate trading record to one or more users;
wherein the second threshold confidence indicia is selectively generated based on user input, user settings, user type, and/or user permission; and/or
the first confidence indicia is selectively generated based on user input, user settings, user type, and/or user permissions; and/or
the second confidence indicia is selectively generated based on user input, user settings, user type, and/or user permissions.

17. The method of claim 16, wherein one or more of the following apply:
the first threshold confidence indicia is dynamically generated; and/or
responsive to a determination that the first indicative price candidate trading record has been edited by one or more of the users:
generating an adjusted first confidence indicia for the edited first indicative price candidate trading record, the adjusted first confidence indicia for the edited first indicative price candidate trading record being greater than the first confidence indicia for the first indicative price candidate trading record, wherein the ranking of the plurality of candidate trading records includes ranking the edited first indicative price candidate trading record based on the adjusted first confidence indicia for the edited first indicative price candidate trading record; and/or
responsive to a determination that the first indicative price candidate trading record has been edited by one or more of the users:
generating an adjusted first confidence indicia for the edited first indicative price candidate trading record;
comparing the adjusted first confidence indicia for the edited first indicative price candidate trading record with the first threshold confidence indicia; and
responsive to a determination that the adjusted first confidence indicia for the edited first indicative price candidate trading record is less than the first threshold confidence indicia:
displaying the edited first indicative price candidate trading record to the one or more users and allowing the one or more users to edit the edited first indicative price candidate trading record; and/or
responsive to a determination that the first indicative price candidate trading record has been edited by one or more of the users:
generating an adjusted first confidence indicia for the edited first indicative price candidate trading record;
comparing the adjusted first confidence indicia for the edited first indicative price candidate trading record with the first threshold confidence indicia; and
responsive to a determination that the adjusted first confidence indicia for the edited first indicative price candidate trading record is greater than the first threshold confidence indicia:
displaying the edited first indicative price candidate trading record to the one or more users.

18. The method of claim 15, wherein the ranking of the plurality of candidate trading records further includes:
when a plurality of indicative price candidate trading records are generated and when a first group of indicative price candidate trading records includes a same trading instrument, same trading price, and same trading action, the first group of indicative price candidate trading records are ranked based on a temporal aspect of the indicative price candidate trading record, wherein a most recent indicative price candidate trading record from among the first group of indicative price candidate trading records has a highest ranking and an oldest indicative price candidate trading record from among the first group of indicative price candidate trading records has a lowest ranking.

19. The method of claim 15, wherein the information source is one or more of the following:
an exchange;
a central limit order book (CLOB);
an electronic matching engine;
a centralized trading source; and/or
a centralized trading information source.

20. The method of claim 15, further comprising:
removing a first ranked candidate trading record from among the plurality of candidate trading records that have already been ranked when:
one or more new candidate trading records are generated after the plurality of candidate trading have been ranked; and
one or more of the new candidate trading records have a trading price that is better than a trading price of the first ranked candidate trading record.

21. The method of claim 15, further comprising:
removing the first indicative price candidate trading record from among the one or more indicative price candidate trading records when:
a new indicative price candidate trading record is generated after the plurality of candidate trading have been ranked; and
the first indicative price candidate trading record and the new indicative price candidate trading record are both generated from indicative price information received from a same representative user.

22. The method of claim 15, wherein:
when ranking the one or more indicative price candidate trading records, the first indicative price candidate trading record is ranked higher than a second indicative price candidate trading record when the first indicative price candidate trading record is more recent than the second indicative price candidate trading record.

23. The method of claim 15, further comprising:
removing one or more indicative price candidate trading records from among the one or more indicative price candidate trading records when:
the one or more indicative price candidate trading records is for a first contract and for a first trading price;
the first non-indicative price candidate trading record is for the same first contract and for a second trading price; and
the first trading price is different from the second trading price.

24. The method of claim 23, wherein the second trading price is better than the first trading price.

25. The method of claim 15, further comprising:
not removing the first indicative price candidate trading record from among the one or more indicative price candidate trading records when:
the first indicative price candidate trading record is for a first contract and for a first trading price, the first indicative price candidate trading record having a first timestamp;
a first non-indicative price candidate trading record is for the same first contract and for a second trading price, the first non-indicative price candidate trading record having a second timestamp;
the second trading price is better than the first trading price; and
the first timestamp is more recent than the second timestamp.

26. The method of claim 15, wherein the ranking is further based on the following:
the first indicative price candidate trading record is ranked higher than the first non-indicative price candidate trading record when:
a trading time of the first indicative price candidate trading record is more recent than a trading time of the first non-indicative price candidate trading record; and
a trading price of the first indicative price candidate trading record is better than a trading price of the first non-indicative price candidate trading record.

27. A method of managing trading information, the method comprising:
identifying, by a communication channel processor, a first communication channel between a representative user and one or more customer users, the first communication channel being a communication channel carrying voice communications between the representative user and the one or more customer users;
receiving, by the communication channel processor, voice communications between the representative user and the one or more customer users communicated over the first communication channel;
processing, by a user communications processor, the received voice communications between the representative user and the one or more customer users, the processing of the received voice communications including:
transforming the received voice communications into textual representations of the received voice communications;
selectively identifying, from among the textual representations of the received voice communications, only indicative price information, the indicative price information being textual representations of the received voice communications pertaining to trading information; and
identifying, based on the received voice communications, an identity of the representative user and/or the one or more customer users;
establishing, by the communication channel processor, a second communication channel with an exchange, central limit order book (CLOB), electronic matching engine, electronic trading platform, centralized trading source, and/or centralized trading information source, the second communication channel different from the first communication channel;
receiving, by the communication channel processor, communications communicated over the second communication channel;
processing, by the user communications processor, the communications received from the second communication channel, the processing of the communications received from the second communication channel including:
selectively identifying, from among the communications received from the second communication channel, only non-indicative price information, the non-indicative price information being communications received from the second communication channel pertaining to trading information;
categorizing, by a categorization processor, the indicative price information based on at least one or more of the following categories: source, trading action, trading price, trading quantity, and timestamp;
receiving and categorizing, by the categorization processor, the non-indicative price information from the second communication channel based on source, trading action, trading price, trading quantity, and timestamp;

generating, by a candidate trading record processor, a plurality of candidate trading records, the generating of the plurality of candidate trading records including:

generating, from among the indicative price information, one or more indicative price candidate trading records, including a first indicative price candidate trading record, the one or more indicative price candidate trading records generated based on at least the categorized indicative price information, wherein each indicative price candidate trading record includes categorized textual representations pertaining to the trading action and trading price of the indicative price candidate trading record, the generating of the one or more indicative price candidate trading records including:

identifying missing indicative price information that were not categorized by the categorization processor, the identifying of the missing indicative price information based on the indicative price information that was categorized by the categorization processor;

searching for historic information to obtain the identified missing indicative price information, the historic information including historic voice communications between the representative user and the one or more customer users, historic indicative price candidate trading records generated based on voice communications between the representative user and the one or more customer users, historic non-indicative price candidate trading records, and/or information from a historic database; and cooperating with the categorization processor to categorize the obtained missing indicative price information, wherein the one or more indicative price candidate trading records includes categorized obtained missing indicative price information; and generating, by the candidate trading record processor, one or more non-indicative price candidate trading records, including a first non-indicative price candidate trading record, the one or more non-indicative price candidate trading records generated based on the categorized non-indicative price information received from the second communication channel, wherein each non-indicative price candidate trading record includes categorized textual representations pertaining to the source, trading action, trading price, trading quantity, and timestamp of the non-indicative price candidate trading record;

performing, by a confidence indicia processor, a confidence level processing, the confidence level processing including:

generating a confidence indicia for each of the plurality of candidate trading records, including a first confidence indicia for the first indicative price candidate trading record and a second confidence indicia for the first non-indicative price candidate trading record, wherein the first confidence indicia represents a level of confidence of an accuracy, completeness, source, price, and temporal nature of the first indicative price candidate trading record, wherein the second confidence indicia represents a level of confidence of an accuracy, completeness, source, price, and temporal nature of the first non-indicative price candidate trading record;

dynamically generating a first threshold confidence indicia;

dynamically generating a second threshold confidence indicia;

comparing the first confidence indicia for the first indicative price candidate trading record with the first threshold confidence indicia;

comparing the second confidence indicia for the first non-indicative price candidate trading record with the second threshold confidence indicia; and selecting selected candidate trading records from among the plurality of candidate trading records based on the generated confidence indicia, wherein the selected candidate trading records include the first indicative price candidate trading record when the first confidence indicia is greater than or equal to the first threshold confidence indicia, wherein the selected trading records include the first non-indicative price candidate trading record when the second confidence indicia is greater than or equal to the second threshold confidence indicia;

creating, by a trading record processor, one or more groups for the plurality of selected candidate trading records, each of the one or more groups including one or more of the plurality of selected candidate trading records, wherein the one or more groups are created based on a type of trading instrument identified for the selected candidate trading record;

for each of the one or more groups, performing, by a trading record ranking processor, a ranking of the one or more selected candidate trading records in the group, wherein the ranking is based on the following conditions:

the first non-indicative price candidate trading record is ranked higher than the first indicative price candidate trading record when a trading price of the first non-indicative price candidate trading record is equal to or better than a trading price of the first indicative price candidate trading record;

the first indicative price candidate trading record is ranked higher than the first non-indicative price candidate trading record when the trading price of the first indicative price candidate trading record is better than the trading price of the first non-indicative price candidate trading record;

when a plurality of indicative price candidate trading records are generated, the plurality of indicative price candidate trading records are ranked based on the confidence indicia generated for each of the plurality of indicative price candidate trading records; and when a plurality of non-indicative price candidate trading records are generated, the plurality of non-indicative price candidate trading records are ranked based on the confidence indicia generated for each of the plurality of non-indicative price candidate trading records;

comparing a confidence indicium of a first candidate trading record with a first threshold confidence indicium;

comparing a confidence indicium of a second candidate trading record with the first threshold confidence indicium;

responsive to a determination that the confidence indicium of the first candidate trading record exceeds the first threshold confidence indicium, displaying the first candidate trading record at a first location on a graphical display;

responsive to a determination that the confidence indicium of the second candidate trading record does not exceed the first threshold confidence indicium, displaying the second candidate trading record at a second location on the graphical display, wherein the second location is different from the first location;

determining whether the representative user or the one or more customer users edited the first threshold confidence indicium; and responsive to a determination that the representative user or the one or more customer users edited the first threshold confidence indicium to arrive at a second threshold confidence indicium:

comparing the confidence indicium of the second candidate trading record with the second threshold confidence indicium; and moving the second candidate trading record from the second location to a third location on the graphical display when the confidence indicium of the second candidate trading record exceeds the second threshold confidence indicium, wherein the third location is different from the second location.

28. The method of claim 27, wherein one or more of the following apply:

the confidence level processing further comprises:

comparing the first confidence indicia for the first indicative price candidate trading record with a first threshold confidence indicia; and responsive to a determination that the first confidence indicia for the first indicative price candidate trading record is less than the first threshold confidence indicia:

displaying the first indicative price candidate trading record to one or more users and allowing the one or more users to edit the first indicative price candidate trading record; and/or the confidence level processing further comprises:

comparing the first confidence indicia for the first indicative price candidate trading record with a first threshold confidence indicia; and responsive to a determination that the first confidence indicia for the first indicative price candidate trading record is greater than the first threshold confidence indicia:

displaying the first indicative price candidate trading record to one or more users;

wherein the first threshold confidence indicia is selectively generated based on user input, user settings, user type, and/or user permission; and/or the confidence level processing further comprises:

comparing the second confidence indicia for the first non-indicative price candidate trading record with a second threshold confidence indicia; and responsive to a determination that the second confidence indicia for the first non-indicative price candidate trading record is greater than the second threshold confidence indicia:

displaying the first non-indicative price candidate trading record to one or more users;

wherein the second threshold confidence indicia is selectively generated based on user input, user settings, user type, and/or user permission; and/or the first confidence indicia is selectively generated based on user input, user settings, user type, and/or user permissions; and/or the second confidence indicia is selectively generated based on user input, user settings, user type, and/or user permissions.

29. The method of claim 27, wherein one or more of the following apply:

the first threshold confidence indicia is dynamically generated; and/or responsive to a determination that the first indicative price candidate trading record has been edited by one or more of the users:

generating an adjusted first confidence indicia for the edited first indicative price candidate trading record, the adjusted first confidence indicia for the edited first indicative price candidate trading record being greater than the first confidence indicia for the first indicative price candidate trading record, wherein the ranking of the plurality of candidate trading records includes ranking the edited first indicative price candidate trading record based on the adjusted first confidence indicia for the edited first indicative price candidate trading record; and/or responsive to a determination that the first indicative price candidate trading record has been edited by one or more of the users:

generating an adjusted first confidence indicia for the edited first indicative price candidate trading record;

comparing the adjusted first confidence indicia for the edited first indicative price candidate trading record with the first threshold confidence indicia; and responsive to a determination that the adjusted first confidence indicia for the edited first indicative price candidate trading record is less than the first threshold confidence indicia:

displaying the edited first indicative price candidate trading record to the one or more users and allowing the one or more users to edit the edited first indicative price candidate trading record; and/or responsive to a determination that the first indicative price candidate trading record has been edited by one or more of the users:

generating an adjusted first confidence indicia for the edited first indicative price candidate trading record;

comparing the adjusted first confidence indicia for the edited first indicative price candidate trading record with the first threshold confidence indicia; and responsive to a determination that the adjusted first confidence indicia for the edited first indicative price candidate trading record is greater than the first threshold confidence indicia:

displaying the edited first indicative price candidate trading record to the one or more users.

30. The method of claim 27, wherein the ranking of the plurality of candidate trading records further includes:

when a plurality of indicative price candidate trading records are generated and when a first group of indicative price candidate trading records includes a same trading instrument, same trading price, and same trading action, the first group of indicative price candidate trading records are ranked based on a temporal aspect of the indicative price candidate trading record, wherein a most recent indicative price candidate trading record from among the first group of indicative price candidate trading records has a highest ranking and an oldest indicative price candidate trading record from among the first group of indicative price candidate trading records has a lowest ranking.

\* \* \* \* \*